United States Patent
Bondy

(10) Patent No.: US 8,402,147 B2
(45) Date of Patent: Mar. 19, 2013

(54) NOMADIC SUBSCRIBER DATA SYSTEM

(75) Inventor: William M. Bondy, Rolling Meadows, IL (US)

(73) Assignee: Apertio Limited, Bristol (GB)

( * ) Notice: Subject to any disclaimer, the term of this patent is extended or adjusted under 35 U.S.C. 154(b) by 1054 days.

(21) Appl. No.: 11/783,550

(22) Filed: Apr. 10, 2007

(65) Prior Publication Data

US 2008/0253403 A1    Oct. 16, 2008

(51) Int. Cl.
*G06F 15/16*    (2006.01)

(52) U.S. Cl. .................... 709/228; 709/203; 370/400

(58) Field of Classification Search ................. 709/228
See application file for complete search history.

(56) References Cited

U.S. PATENT DOCUMENTS

| | | | |
|---|---|---|---|
| 5,065,311 A | 11/1991 | Masai et al. | |
| 5,586,260 A | 12/1996 | Hu | |
| 5,678,045 A | 10/1997 | Bettels | |
| 5,721,918 A | 2/1998 | Nilsson et al. | |
| 5,758,343 A | 5/1998 | Vigil et al. | |
| 5,864,849 A | 1/1999 | Bohannon et al. | |
| 6,038,456 A | 3/2000 | Colby et al. | |
| 6,122,630 A | 9/2000 | Strickler et al. | |
| 6,131,120 A | 10/2000 | Reid | |
| 6,202,067 B1 | 3/2001 | Blood et al. | |
| 6,230,271 B1 | 5/2001 | Wadlow et al. | |
| 6,240,454 B1 | 5/2001 | Nepustil | |
| 6,259,705 B1 * | 7/2001 | Takahashi et al. | 370/465 |
| 6,369,840 B1 | 4/2002 | Barnett et al. | |
| 6,556,659 B1 | 4/2003 | Bowman-Amuah | |
| 6,564,295 B2 | 5/2003 | Okabayashi et al. | |
| 6,564,370 B1 | 5/2003 | Hunt | |
| 6,578,066 B1 | 6/2003 | Logan et al. | |
| 6,640,302 B1 | 10/2003 | Subramaniam et al. | |
| 6,768,452 B2 | 7/2004 | Gilkes | |
| 6,769,000 B1 | 7/2004 | Akhtar et al. | |
| 6,769,074 B2 | 7/2004 | Vaitzblit | |
| 6,823,357 B1 | 11/2004 | Du et al. | |
| 6,823,382 B2 | 11/2004 | Stone | |
| 6,868,448 B1 | 3/2005 | Gupta et al. | |
| 6,871,068 B1 | 3/2005 | O'Neill | |
| 6,950,936 B2 | 9/2005 | Subramaniam et al. | |

(Continued)

FOREIGN PATENT DOCUMENTS

| EP | 1026867 A2 | 8/2000 |
|---|---|---|
| EP | 1322094 | 6/2003 |

(Continued)

OTHER PUBLICATIONS

Vasfi Gucer, High Availability Scenarios with IBM Tivoli Workload Scheduler and IBM Tivoli Framework, 2005, IBM.

(Continued)

*Primary Examiner* — Krisna Lim
*Assistant Examiner* — Arvin Eskandarnia
(74) *Attorney, Agent, or Firm* — Squire Sanders (US) LLP

(57) ABSTRACT

A logical network directory database compliant with the X.500 standard for a directory data system is disclosed. The network directory database provides a source of subscriber and service data accessible by various control and management processes that require subscriber information. The network directory database may be extensible across various communications service providers and IT domain. Further, the disclosed network directory database may be applied to new and existing services, such as, IP Multimedia Subsystem, Unlicensed Mobile Access (UMA) and other IP services.

54 Claims, 33 Drawing Sheets

U.S. PATENT DOCUMENTS

| | | | |
|---|---|---|---|
| 6,986,060 | B1 | 1/2006 | Wong |
| 6,988,128 | B1 | 1/2006 | Alexander et al. |
| 7,016,893 | B2 | 3/2006 | Boreham et al. |
| 7,016,945 | B2 | 3/2006 | Bellaton et al. |
| 7,039,773 | B2 | 5/2006 | Hu et al. |
| 7,065,586 | B2 | 6/2006 | Ruttenberg et al. |
| 7,111,136 | B2 | 9/2006 | Yamagami |
| 7,124,101 | B1 | 10/2006 | Mikurak |
| 7,124,188 | B2 | 10/2006 | Mangipudi et al. |
| 7,136,976 | B2 | 11/2006 | Saika |
| 7,139,927 | B2 | 11/2006 | Park et al. |
| 7,194,592 | B2 * | 3/2007 | Sato ............... 711/165 |
| 7,203,732 | B2 | 4/2007 | McCabe et al. |
| 7,237,152 | B2 | 6/2007 | Chiu et al. |
| 7,315,854 | B2 | 1/2008 | Kumar |
| 7,325,040 | B2 | 1/2008 | Truong |
| 7,334,000 | B2 | 2/2008 | Chhatrapati et al. |
| 7,363,339 | B2 | 4/2008 | Delany et al. |
| 7,376,733 | B2 | 5/2008 | Connelly et al. |
| 7,428,588 | B2 | 9/2008 | Berstis et al. |
| 7,458,080 | B2 | 11/2008 | Parker et al. |
| 7,464,162 | B2 | 12/2008 | Chan |
| 7,502,927 | B2 | 3/2009 | Trostle et al. |
| 7,526,618 | B2 * | 4/2009 | Ozaki et al. .............. 711/154 |
| 7,562,075 | B2 | 7/2009 | Kumar |
| 7,590,413 | B2 | 9/2009 | May |
| 7,607,138 | B2 | 10/2009 | Donovan et al. |
| 7,620,623 | B2 | 11/2009 | Harvey |
| 7,620,630 | B2 | 11/2009 | Lloyd et al. |
| 7,640,296 | B2 | 12/2009 | Fuchs et al. |
| 7,647,307 | B2 | 1/2010 | Rowley et al. |
| 7,657,753 | B2 | 2/2010 | Sawada |
| 7,680,771 | B2 | 3/2010 | Cialini et al. |
| 7,698,433 | B2 | 4/2010 | Gallant |
| 7,756,507 | B2 | 7/2010 | Morper |
| 7,774,428 | B2 | 8/2010 | Yu |
| 7,840,588 | B2 | 11/2010 | Bell et al. |
| 7,844,577 | B2 | 11/2010 | Becker et al. |
| 7,873,696 | B2 | 1/2011 | Srinivasan et al. |
| 7,949,512 | B2 | 5/2011 | Vijayan Retnamma et al. |
| 8,041,689 | B2 | 10/2011 | Rowley |
| 8,073,777 | B2 | 12/2011 | Barry et al. |
| 2002/0035670 | A1 * | 3/2002 | Okabayashi et al. ........ 711/114 |
| 2002/0083185 | A1 * | 6/2002 | Ruttenberg et al. ........... 709/232 |
| 2003/0004773 | A1 | 1/2003 | Clark et al. |
| 2003/0009559 | A1 | 1/2003 | Ikeda |
| 2003/0036886 | A1 | 2/2003 | Stone |
| 2003/0093413 | A1 | 5/2003 | Dettinger et al. |
| 2003/0229534 | A1 | 12/2003 | Frangione et al. |
| 2004/0064351 | A1 | 4/2004 | Mikurak |
| 2005/0032527 | A1 | 2/2005 | Sheha et al. |
| 2005/0055408 | A1 | 3/2005 | Dong |
| 2005/0210000 | A1 | 9/2005 | Michard |
| 2005/0240553 | A1 | 10/2005 | Diggs et al. |
| 2006/0020613 | A1 | 1/2006 | Harvey |
| 2006/0123167 | A1 * | 6/2006 | Jeppsen et al. ................. 710/106 |
| 2006/0136448 | A1 | 6/2006 | Cialini et al. |
| 2006/0143292 | A1 * | 6/2006 | Taubenheim et al. ......... 709/225 |
| 2006/0167891 | A1 * | 7/2006 | Blaisdell et al. ................. 707/10 |
| 2006/0288115 | A1 * | 12/2006 | Neuman ....................... 709/232 |
| 2007/0100975 | A1 * | 5/2007 | Srinivasan et al. ............. 709/223 |
| 2007/0118275 | A1 | 5/2007 | Qi et al. |
| 2007/0136262 | A1 | 6/2007 | Dettinger et al. |
| 2007/0226535 | A1 * | 9/2007 | Gokhale ............................ 714/6 |
| 2007/0260834 | A1 * | 11/2007 | Kavuri et al. .................. 711/162 |
| 2007/0282861 | A1 | 12/2007 | Song et al. |
| 2008/0225718 | A1 * | 9/2008 | Raja et al. ...................... 370/235 |
| 2010/0017184 | A1 * | 1/2010 | Vijayan Retnamma et al. .............................. 703/13 |
| 2010/0153558 | A1 | 6/2010 | Kommula |

FOREIGN PATENT DOCUMENTS

| | | |
|---|---|---|
| GB | 2288042 A | 10/1995 |
| WO | WO01/33687 | 5/2001 |
| WO | WO02/075572 A1 | 9/2002 |

OTHER PUBLICATIONS

International Search Report corresponding to International Application No. PCT/EP2008/054245 dated Nov. 3, 2008.

P. Calhoun, et al. "Diameter Base Protocol," RFC 3588, Network Working Group, Sep. 2003, 129 pages.

3GPP TS 29.228, V7.5.0 (Mar. 2007), Technical Specification; 3rd Generation Partnership Project; Technical Specification Group Core Network and Terminals; IP Multimedia (IM) Subsystem Cx and Dx interfaces; Signalling Flows and message contents (Release 7), Mar. 2007, 60 pages.

3GPP TS 29.229, V7.5.0 (Mar. 2007), Technical Specification; 3rd Generation Partnership Project; Technical Specification Group Core Network and Terminals; Cx and Dx Interfaces based on the Diameter protocol; Protocol details (Release 7), Mar. 2007, 28 pages.

International Search Report corresponding to International Application No. PCT/EP2008/054243 dated Nov. 27, 2008.

International Search Report corresponding to International Application No. PCT/EP2008/054244 dated Nov. 10, 2008.

J. Sermersheim et al, "Lightweight Directory Access Protocol (LDAP): The Protocol," RFC4511, Network Working Group, Jun. 1, 2006, IETF Standard, Internet Engineering Task Force, IETF, XP015046287, 68 pp.

3GPP TR 32.808 V1.1.0 (Mar. 2007), Technical Report, 3rd Generation Partnership Project; Technical Specification Group Services and System Aspects; Telecommunication Management; Study of Common Profile Storage (CPS) Framework of User Data for Network Services and Management (Release 8), Mar. 31, 2007, XP002501745, 207 pp.

"Information Technology—Open Systems Interconnection—The Directory: Overview of concepts, models and services," X.500, Aug. 29, 2005, ITU-T Draft Study Period 2005-2008, International Telecommunication Union, Geneva, XP017405078, 28 pp.

K. Zeilenga OpenLDAP Foundation, "Lightweight Directory Access Protocol (LDAP): Directory Information Models", RFC 4512, Network Working Group, Jun. 1, 2006, XP015046289, 52 pp.

D. Byrne, et al., "Use of Aliases within LDAP", draft-byrne-ldap-alias-00.txt>, Internet-Draft IETF Standard Working Draft, Internet Engineering Task Force, Apr. 20, 1998, XP015011291, 6 pp.

* cited by examiner

PRIOR ART

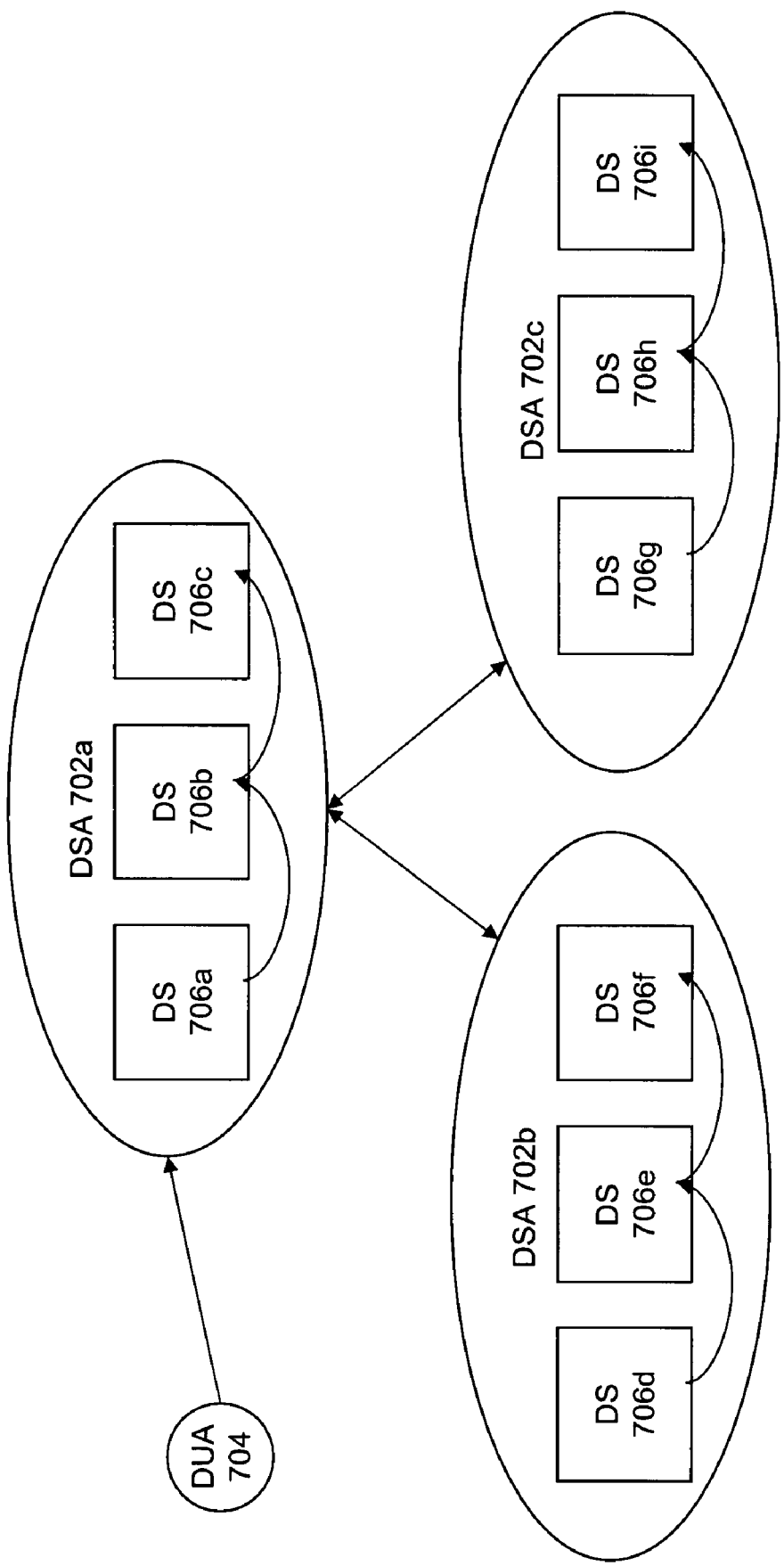

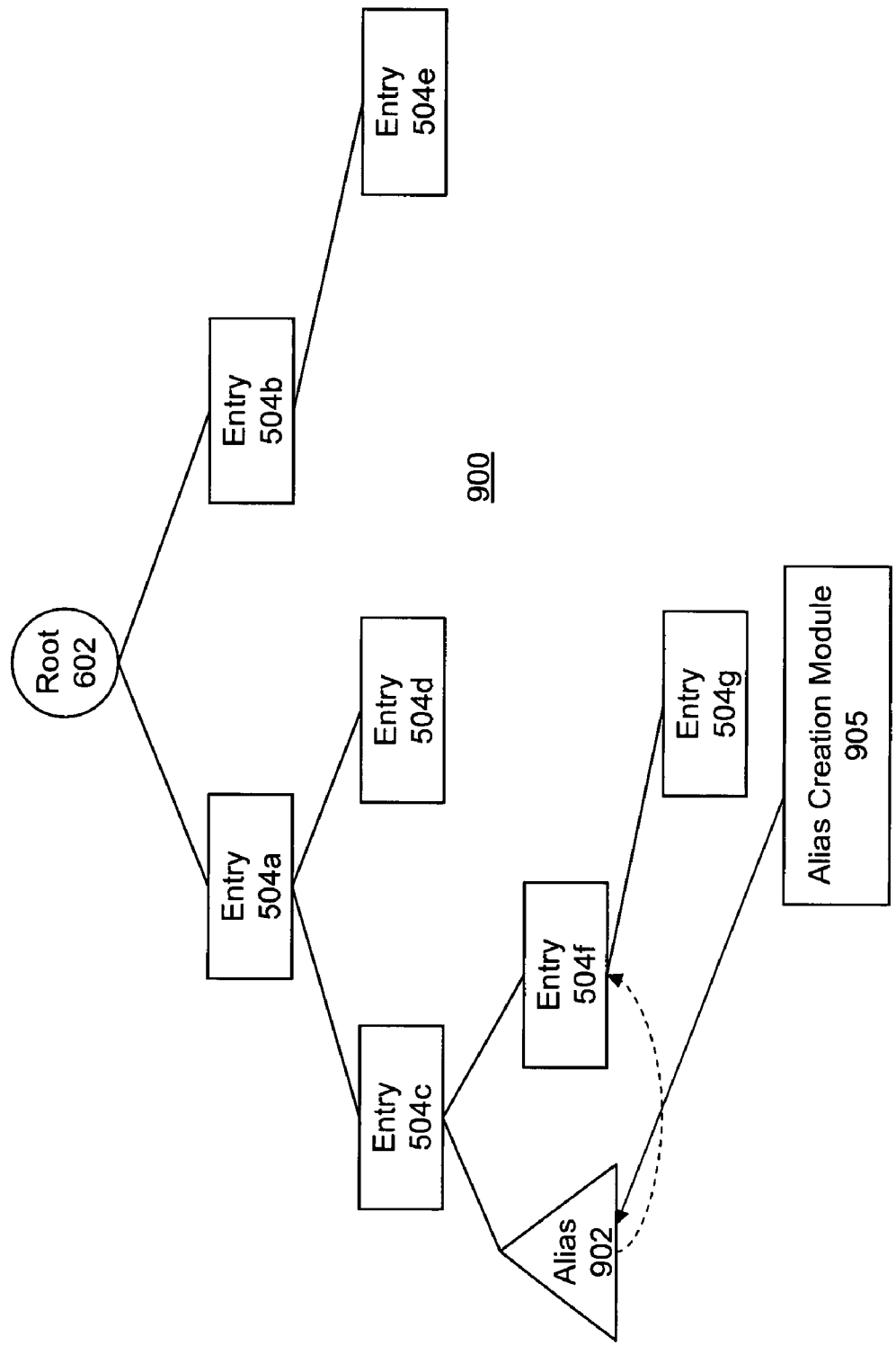

| | | |
|---|---|---|
| DSA 1302a Allowed to Participate in On-Demand Data Exchanges<br>1312a | Yes, with DSA 1302c | |
| Restrictions on DIT partitions exchangeable with DSA 1302c<br>1312b | CA, WA, OR, NV, AZ only | |
| Other restrictions<br>1312c | - No transfers of secure data<br>- No transfers exceeding 50 MB | |

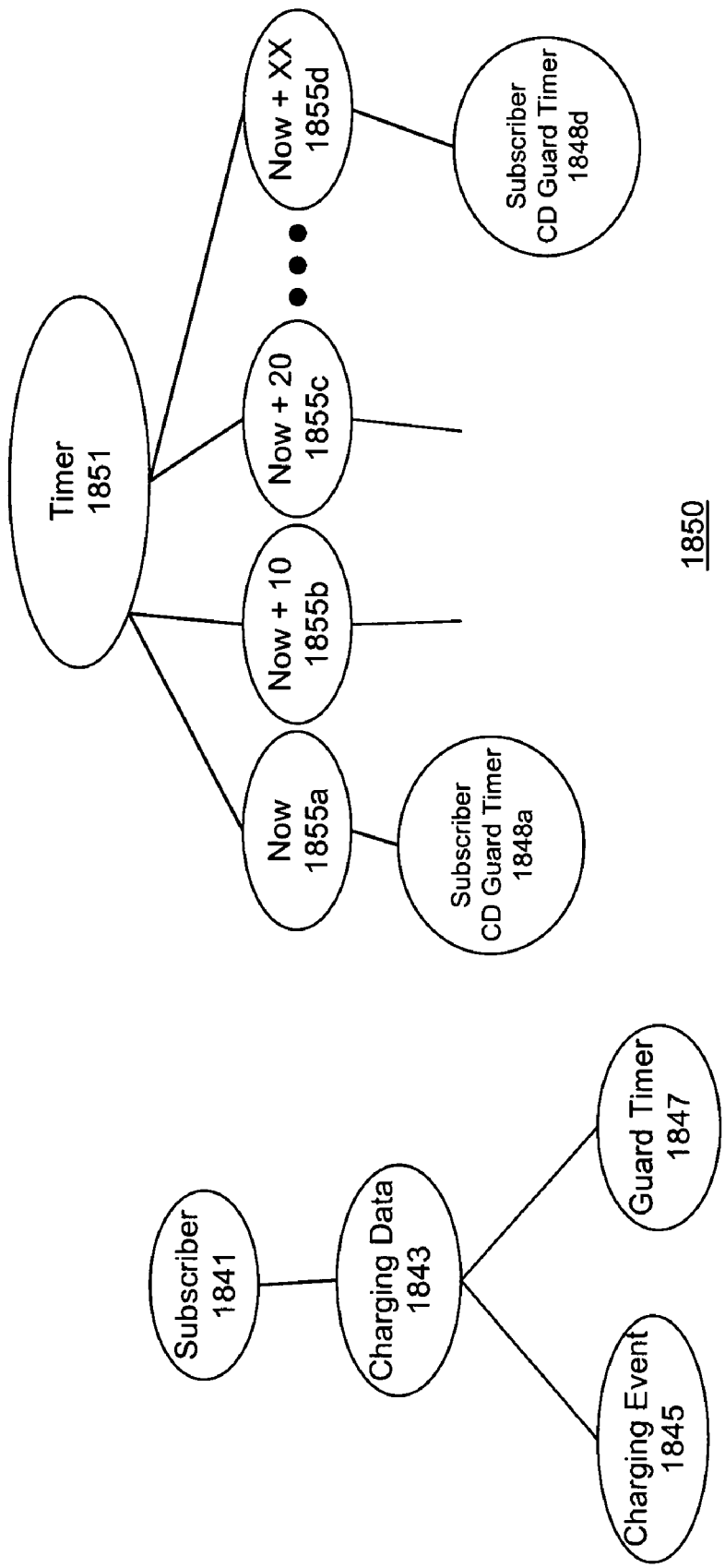

NOMADIC SUBSCRIBER DATA SYSTEM

RELATED APPLICATIONS

This application is related to U.S. patent application Ser. No. 11/783,537, filed on Apr. 10, 2007, entitled "Improved Data Access In Distributed Server Systems," naming Kevin Wakefield as inventor; U.S. patent application Ser. No. 11/783,586, filed on Apr. 10, 2007, entitled "Alias Hiding In Network Data Repositories," naming Kevin Wakefield as inventor; U.S. patent application Ser. No. 11/783,585, filed on Apr. 10, 2007, entitled "Variant Entries In Network Data Repositories," naming Kevin Wakefield as inventor; U.S. patent application Ser. No. 11/783,539, filed on Apr. 10, 2007, entitled "Adaptation In Network Data Repositories," naming Kevin Wakefield as inventor; U.S. patent application Ser. No. 11/783,550, filed on Apr. 10, 2007, entitled "Improved Sub-Tree Access Control In Network Architectures," naming Kevin Wakefield as inventor; U.S. patent application Ser. No. 11/783,549, filed on Apr. 10, 2007, entitled "Improved Journaling In Network Data Architectures," naming Kevin Wakefield as inventor; U.S. patent application Ser. No. 11/783,588, filed on Apr. 10, 2007, entitled "Indirect Methods In Network Data Repositories," naming Nick Prudden as inventor; and U.S. patent application Ser. No. 11/783,541, filed on Apr. 10, 2007, entitled "Improved Timing Device and Method," naming Nick Prudden as inventor. The contents of these applications are incorporated herein by reference in their entirety for all purposes.

FIELD

Embodiments of the invention relate to systems and methods for providing a data and services in a network. More particularly, an embodiment of the invention relate to systems and methods that enable a robust, high speed data access for use in a communications network having a large number of subscribers whose respective data may be deployed in a centralized data repository for access by various applications operating within the network.

BACKGROUND

Mobile and fixed network operators would like to transition into fully converged Communications Service Providers (CSPs). Ever-changing business strategies and the implementation of new subscriber services have resulted in operational and functional data silos within a typical CSP. Many conventional communications networks are based on an unstructured patchwork of functional overlays to a core network that was built primarily for voice traffic. Data duplication often exists in subscriber databases, service creation and provisioning processes, administration, support and billing.

Many CSPs would like to capitalize on the delivery of creative content-based services that appeal to a wide range of market segments. This new growth area has been fueled by new applications and devices, which have been tailored for multimedia services. However, there are still some firm boundaries between mobile and fixed line services because products have often been shaped around the access methods and devices rather than around the needs of subscribers.

FIG. 1 depicts a representative network architecture 100 employed by a CSP in the prior art. The network architecture 100 includes an Operations Support System (OSS)/Business Support System (BSS)/IT Domain system 102, one or more applications, such as Applications 106a-106c, and a Core Signaling Network 108. The OSS/BSS/IT Domain system 102 includes a Provisioning System 110 and a Network Management System 112. The Applications 106a-106c each comprise a Logic Portion 107a and a Data Portion 107b. The Logic Portion 107a of each Application 106a-106c accesses primarily, if not exclusively, its respective Data Portion 107b. The Data Portion 107b of each Application 106 typically resides in a database of some sort, e.g., a relational database. The Applications 106a-106c may provide, for example, a Home Location Register (HLR), a Home Subscriber Server (HSS), a Voicemail system, an Authentication, Authorization and Accounting system (AAA), Mobile Number Portability (MNP), and the like. These applications are all known in the art.

As CSPs add more and more new services to their systems, such as, an IP Multimedia Subsystem (IMS) and Unlicensed Mobile Access (UMA), they may find that generic relational database technologies are too difficult to implement because of the significant customization involved during their deployment. Subsequently, as new services and subscriber types evolve, their respective schemas may be too difficult to enhance. In other words, as the number of Applications 106a-106c grow to larger and larger numbers, the CSPs will experience more and more operational problems, such as scalability, performance, and management. These problems will increase costs and lead to operational down time, increasing costs further. Generic disk based platforms will likely prove difficult to scale, as the underlying technology imposes practical limits on access times.

Equipment vendors often have difficulty producing product feature sets that can be delivered at a price point and on a timescale that is economically viable for the CSP. As a result, the CSPs often find themselves "locked-in" to an equipment vendor who has limited interoperability with the systems of other vendors, restricting the CSP's operational flexibility and choice of equipment vendors when upgrades are needed. Furthermore, proprietary hardware tends not to scale economically, often leading to blocks of spare capacity that cannot be effectively utilized by the CSP.

Consequently, until CSPs improve upon the systems and methods that they use to deploy new applications to their networks, their businesses and their subscribers will not be able to fully utilize the modern communications networks at their disposal.

SUMMARY

The above-mentioned shortcomings, disadvantages and problems are addressed by an embodiment of the present invention, which will be understood by reading and studying the following specification.

An embodiment of the invention provides a system for improved communication of subscriber data in a communications network having a distributed subscriber data repository. The system may include a plurality of event forwarders associated with a data repository containing subscriber data such that the data repository comprises a portion of the distributed subscriber data repository, wherein each event forwarder is configured to monitor access requests for subscriber data in its data repository, determine if an access request response time exceeds a performance threshold and send a subscriber data transfer indicator to a transfer manager for each access request that exceeds the performance threshold. The system may also include a transfer manager configured to receive from the plurality of event forwarders subscriber data transfer indicators and determine for each subscriber data transfer indicator if a set of subscriber data should be transferred from a first data repository associated with an event forwarder who transmitted the subscriber data transfer indicator to a second data repository associated with the access request. The system may further include a transfer controller configured to control movement of the set of subscriber data from the first data repository to the second data repository.

An embodiment of the invention provides a method for improved communication of subscriber data in a communications network having a distributed subscriber data repository. The method calls for monitoring access requests for subscriber data in a plurality of data repositories, wherein each data repository represents a portion of the subscriber data in the distributed data repository, and wherein each data repository is monitored by an event forwarder of a plurality of event forwarders. The method further calls for determining if an access request response time for a set of subscriber data exceeds a performance threshold by an event forwarder associated with a first data repository of the plurality of data repositories, wherein the event forwarder sends a subscriber data transfer indicator to a transfer manager if the access request response time exceeds the performance threshold. The method may also call for receiving by a transfer manager the subscriber data transfer indicator and determining if the set of subscriber data should be transferred from the first data repository to a second data repository of the plurality of data repositories, wherein the second data repository is associated with the access request. The method may also call for moving the set of subscriber data from the first data repository to the second data repository under the supervision of a transfer controller when the transfer manager determines that the first set of subscriber data should by transferred from the first data repository to the second data repository.

BRIEF DESCRIPTION OF THE DRAWINGS

FIG. 7B illustrates a distributed hierarchy comprising three DSAs 702a, 702b, and 702c, according to an embodiment of the invention;

FIG. 9A depicts a DIT 900 having an Alias Entry 902, according to an embodiment of the invention;

FIG. 13C illustrates representative configuration data 1310 for a DSA participating in the Nomadic Subscriber Data System, according to an embodiment of the invention;

FIG. 18C shows a Subscriber entry 1841 from a directory, such as a directory maintained by the DSA 1831, according to an embodiment of the invention;

FIG. 18D shows a Timer 1850 having a Timer entry 1851 in a directory maintained by the DSA 1831, according to an embodiment of the invention.

DETAILED DESCRIPTION OF AN
EMBODIMENT OF THE INVENTION

Overview

Conventional mobile telecommunications networks are the result of evolution rather than revolution. As the communications market has evolved, mergers and acquisitions together with changing business strategies have resulted in operational and functional data silos within the typical Communications Service Provider (CSP). The typical network has been created from a series of functional overlays to a core network that was built primarily for voice traffic. Thus, duplication often exists in subscriber databases, service creation and provisioning processes, administration, support and billing. Many CSPs would like to rationalize and consolidate their businesses to remove this duplication so as to reduce cost, improve efficiency and ultimately improve subscriber service. At the same time, the CSPs often still need to increase capacity, add functional enhancements and replace aging infrastructure. In addition, the CSPs may also want to prepare for further convergence between voice communications and other technologies.

Figure 1:
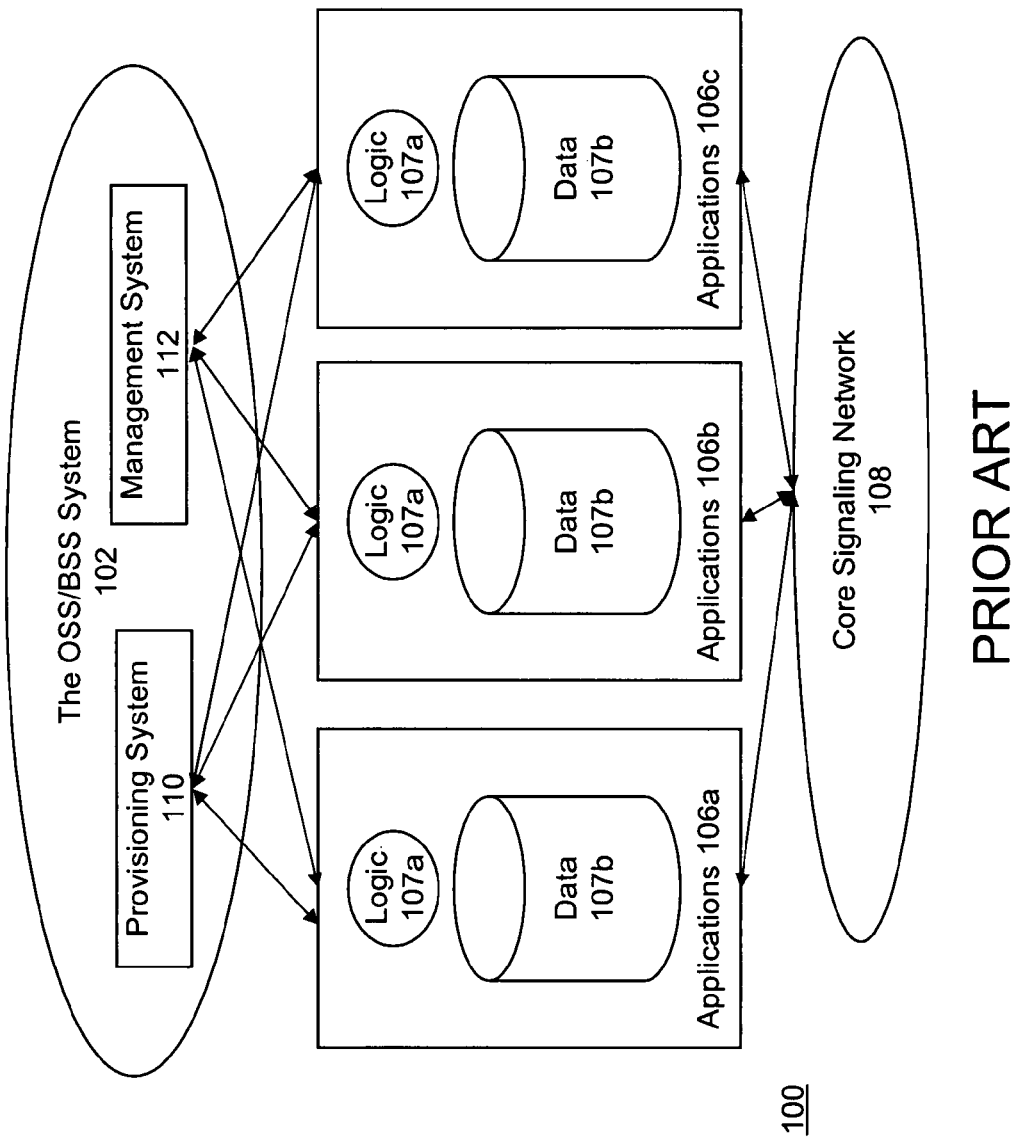
FIG. 1 depicts a representative network architecture 100 employed by a CSP in the prior art.

A new telecommunications paradigm may center on the CSP's subscribers and less on the network hardware and software themselves. Rather than the confusing and cumbersome proprietary data silos shown in FIG. 1, CSPs can move towards a new paradigm in which the system's data is open, thus allowing the network's applications to be more integrated and interoperable. Thus, this new paradigm essentially places the subscriber's data at the core of the network because accessing and sharing information should not necessarily be limited to factors such as where the subscriber is, the type of connection the subscriber has, or how the subscriber chooses to interact with the CSP. Addressing these limitations may allow the CSPs to bring together the conventional compartmentalized services into cohesive, multimedia, multi-access communications service.

Thus, embodiments of the invention may provide a single logical directory database containing a unified source of subscriber and/or service data accessible by those control and management processes that require subscriber information. The centralized data repository may allow conventional network and application databases to be combined together in a scalable, cost effective way that breaks down the separate databases found in conventional networks such as the databases shown in FIG. 1. Thus, embodiments of the invention may provide a single source of information for core network applications and across many or all domains.

By migrating to a data paradigm focused on the subscriber as the center of the CSP's operations, the CSP may achieve greater integration and interoperability. Positioning the subscriber at the center of their operations may also make it easier for CSPs to maintain accurate and complete subscriber information. The many database silos of conventional networks, such as that shown in FIG. 1, may be transformed into a single, highly scalable, high performance network directory that can be accessed by the network or business applications that need to process subscriber data.

As mentioned, embodiments of the invention may employ a single logical directory database containing a single source of subscriber and service information accessible by control and management elements that need this information. The preferred directory database employed by an embodiment of the invention is compliant with the X.500 protocol. The directory database may provide an open centralized database in compliance with the ITU-T X.500 standard for a directory data system, according to an embodiment of the invention. The directory database typically includes subscriber, service and network data as well as executable software procedures which are made available to applications via industry standard directory protocols, such as, Lightweight Directory Access Protocol (LDAP) and Directory Access Protocol (DAP) and the like, according to an embodiment of the invention.

A subscriber-centric network may enable qualitative enhancements to conventional network components, such as the Home Subscriber Server (HSS) and the Home Location Register (HLR), as well as assistance in deploying IP Multimedia Subsystem (IMS) services. Accordingly, embodiments of the invention may comprise improved HSS and/or improved HLR subsystems.

An embodiment of the invention may also provide common authentication that allows the subscriber to be identified once, typically at the point of entry to a network, and validated for a complete range of services. This procedure typically removes the need to re-authenticate the subscriber each time he attempts to use different aspects of a service.

An embodiment of the invention may further provide a scalable database solution that allows applications to leverage the same logical and scalable X.500 directory, which typically contains the information needed for most subscribers. Therefore, provisioning is typically required only once. Afterwards, applications may simply use the same data set. An embodiment of the invention may employ an X.500 directory-based database that supplies subscriber data to existing network applications and support systems.

An embodiment of the invention may operate in conjunction with a data repository of some sort, e.g., a database. Like other data repositories, data repositories used in embodiments of the invention are typically tended by a database management system (DBMS). A DBMS typically performs various high-level and low-level functions. The invention disclosed and claimed herein does not include the low-level functions conventionally performed by a DBMS. Such low-level functions include very rudimentary actions, such as the physical process of receiving a piece of data, determining a specific sector in a specific memory of a specific type, and then interacting with the memory's hardware to store the received data. The high-level DBMS components disclosed and claimed herein may interoperate with a variety of low level DBMS components. One such, low-level DBMS component is known as DirecTree™, a high performance, low-level in-memory database system, owned by Apertio Limited, the assigner of the invention disclosed herein. The structure and operations of DirecTree™ are kept as a trade secret by Apertio Limited. While embodiments of the invention may operate in conjunction with DirecTree™, this particular low-level DBMS is not part of the invention disclosed and claimed herein.

Figure 2:
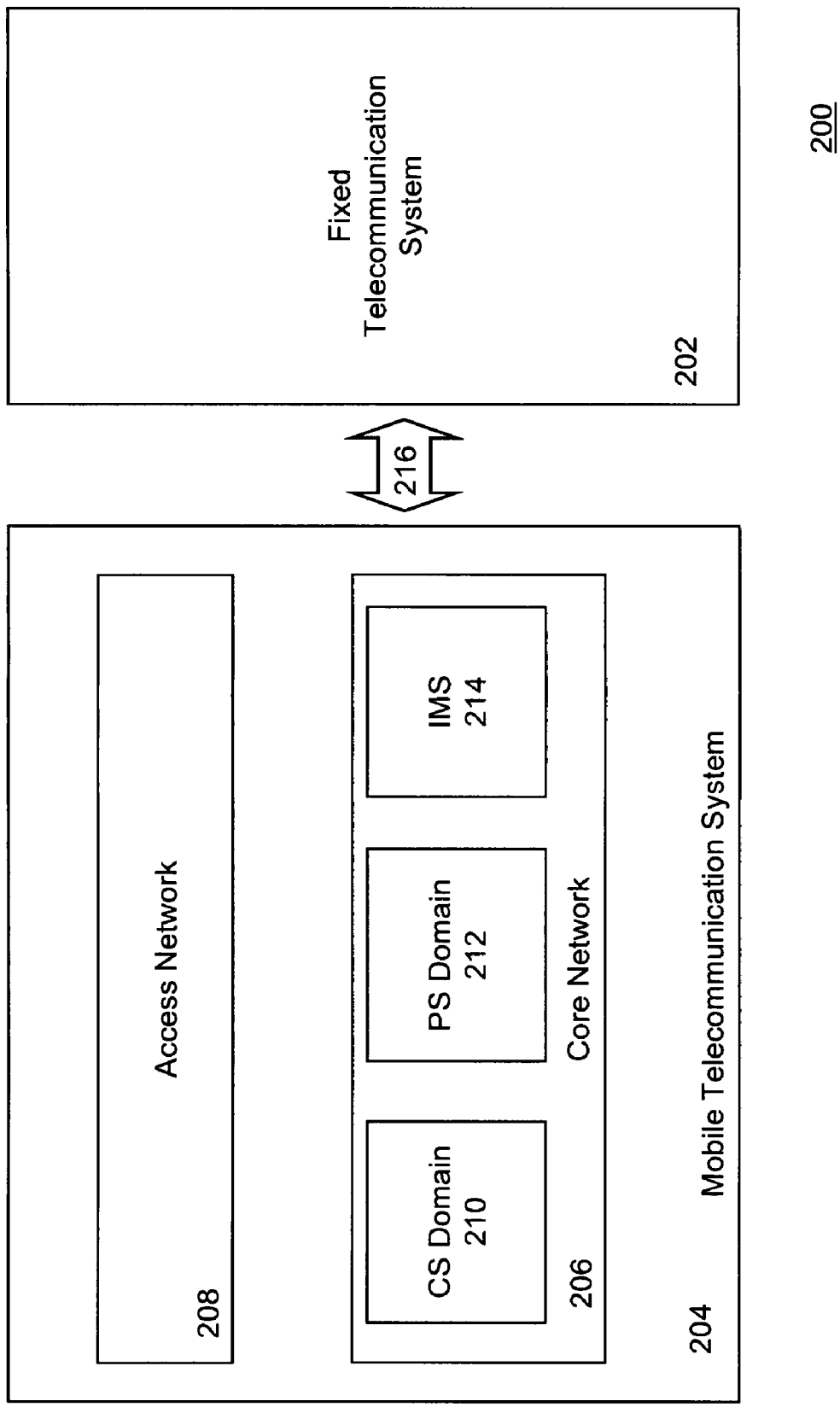
FIG. 2 is a block diagram depicting a telecommunication system 200, in which embodiments of the invention may operate therein.

FIG. 2 is a block diagram depicting a telecommunication system 200, in which embodiments of the invention may operate thereupon. The telecommunication system 200 may be functionally classified as a Fixed Telecommunication System 202 and a Mobile Telecommunication System 204. Examples of Fixed Telecommunication System 202 include the Public Switched Telephone Network (PSTN). The Mobile Telecommunication System 204 provides mobile telecommunication services, such as two parties communicating with each other via mobile handsets. The Mobile Telecommunication System 204 interfaces with the Fixed Telecommunication System 202 through functional interfaces 216 to allow, among other things, communications between mobile subscribers and fixed subscribers.

The Mobile Telecommunication System 204 is logically divided into a Core Network (CN) 206 and an Access Network (AN) 208. The CN 206 typically comprises these three domains: a Circuit Switched (CS) domain 210, a Packet Switched (PS) domain 212, and an IP Multimedia Subsystem (IMS) domain 214. These domains typically differ in the way they support subscriber traffic and comprise hardware and software systems that together perform that domain's particular technical function. For example, the PS domain 212 comprises software and hardware systems that carry out packet-switched communications, typically in accordance with a recognized telecommunications standard.

The CS domain 210 refers to hardware and software components that enable a circuit-switched-based connection that supports signaling and subscriber traffic. A CS connection typically allocates network resources at the time of connection establishment and releases these network resources at a connection release. Components typically included in the CS domain 210 are a Mobile-services Switching Center (MSC), a Gateway MSC (GMSC), an MSC Server, a CS-Media Gateway Function (CS-MGW), a GMSC Server, and an Interworking Function (IWF). The CS domain 210 and these components are known in the art.

The PS domain 212 refers to hardware and software components that enable a PS-based connection that supports signaling and subscriber traffic. A PS connection typically transports the subscriber data using autonomous concatenation of bits grouped into packets, wherein each packet can be routed independently from the other packets. The PS domain 212 typically includes components that relate to the General Packet Radio Service (GPRS), such as a Serving GPRS Support Node (SGSN) and a Gateway GPRS Support Node (GGSN). The PS domain 212 also typically includes a component for performing the Border Gateway Protocol (BGP). The PS domain 212 and these components are known in the art.

The IMS domain 214 refers to components that provide IP multimedia services, such as audio, video, text, chat, and the like, as well as combinations thereof, delivered over the PS domain 212. The IMS domain 214 typically includes components such as a Call Session Control Function (CSCF), a Media Gateway Control Function (MGCF), and a Media Gateway Function (MGF), an IMS-Media Gateway Function (IMS-MGW), a Multimedia Resource Function Controller (MRFC), a Multimedia Resource Function Processor (MRFP), a Breakout Gateway Control Function (BGCF), an Application Server (AS), and a Policy Decision Function (PDF). The IMS domain 214 and these components are known in the art.

The AN 208 typically comprises a Base Station System (BSS) configured to provide communications in accordance with a standard communications system, such as the Global System for Mobile communication (GSM) and/or the Radio Network System (RNS) for Universal Mobile Telecommunications System (UMTS). These conventional systems are known in the art.

Figure 3:
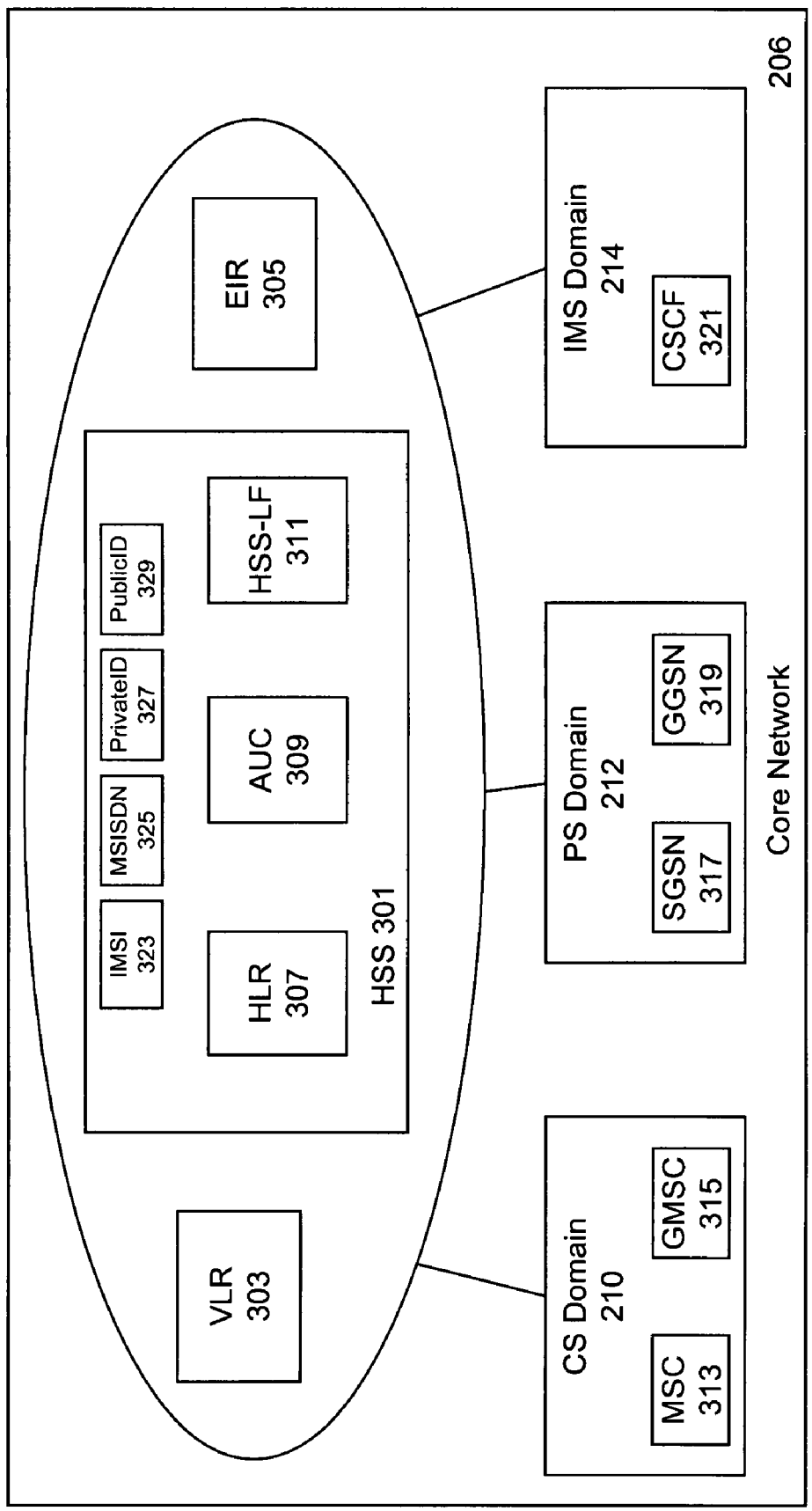
FIG. 3 is a block diagram providing further detail of a Core Network, such as the CN 206 shown in FIG. 2, with which embodiments of the invention may interoperate.

FIG. 3 is a block diagram that provides further detail for a Core Network, such as the CN 206 in the Mobile Telecommunication System 204 shown in FIG. 2, with which embodiments of the invention may operate thereupon.

As mentioned above, the CS Domain 210 typically includes an MSC area 313 and a GSMC area 315. The MSC area 313 provides a telephony exchange for circuit-switched calling, mobility management, and other services to the mobile subscribers roaming within the area served by the MSC area 313. While a single MSC area 313 is shown in FIG. 3, the CS Domain 210 would likely contain a plurality of MSC areas 313s in many implementations of the Mobile Telecommunication System 202. Among other things, the MSC area 313 provides a functional interface for call set-up in the CS domain 210 between the Fixed Telecommunication System 202 and the Mobile Telecommunication System 204 within a common numbering plan and a common routing plan. The GSMC area 315 finds the MSC area 313 that includes a subscriber who is being called. Thus, the MSC area 313 routes calls from the Fixed Telecommunication System 202 to the Mobile Telecommunication System 204, as well as routing calls within the Mobile Telecommunication System 204.

As mentioned above, the PS domain 212 typically includes an SGSN area 317 and a GGSN area 319. The SGSN area 317 provides the functional interfaces in the PS domain 212 between the Fixed Telecommunication System 202 and the Mobile Telecommunication System 204 for call set-up within a common numbering plan and a common routing plan. Thus, the SGSN area 317 performs interworking with the radio network employed in the Mobile Telecommunications System 204. The GGSN area 319 provides a gateway between a wireless network and another network, such as the Internet or a private network.

As mentioned above, the IMS domain 214 includes a Call Session Control Function (CSCF) 321. The CSCF 321 typically comprises servers and related proxies that process signaling packets in the IMS domain 214. The CSCF 321 handles a variety of functions, such as IMS registration, message inspection, subscriber authentication, policy control, bandwidth management, charging records. The CSCF 321 may employ one or more standard protocols in carrying out its functions, such as the Diameter protocol.

The CN 206 also typically includes components that interoperate with the various domains within the CN 206, such as the CS domain 210, the PS domain 212, and the IMS domain 214. These components, which are known in the art, comprise a Home Subscriber Server (HSS) 301, a Visitor Location Register (VLR) 303, and an Equipment Identity Register (EIR) 305.

The HSS 301 comprises an application responsible for maintaining information related to the subscribers of the Mobile Telecommunication System 204 shown in FIG. 2. The various domains use this information for various purposes, such as establishing calls/sessions on behalf of the subscribers. For example, the HSS 301 supports routing procedures by performing and/or ensuring the performance of steps such as authentication, authorization, accounting (AAA), naming/addressing resolution, location dependencies.

Accordingly, the HSS 301 typically maintains subscriber-related information, such as subscriber identification, numbering and addressing, subscriber security information for network access control for AAA, subscriber location information; and subscriber profile information. Conventional subscriber identifiers retained in the HSS 301 may include one or more of the following: International Mobile Subscriber Identity (IMSI) 323, Mobile Station International ISDN (MSISDN) 325 number, private identity 327, and public identity 329. Embodiments of the HSS 301 may be based on standards, such as the 3GPP standard.

The HSS 301 interfaces with the three domains (the CS domain 210, the PS domain 212, and the IMS domain 214) and impacts the functionality of these domains. Although only a single HSS 301 is shown in FIG. 3, a typical Core Network 206 might include multiple HSSes. The deployment of multiple HSSes is typically based on various factors, such as the number of the subscribers, the capacity of the hardware employed in the telecommunication system 200, and the overall organization of the telecommunication system 200.

The HSS 301 may include applications, such as a Home Location Register (HLR) 307, an Authentication Centre (AuC) 309, and an HSS Logical Functional (HSS-LF) module 311. These applications are known in the art.

The HLR 307 comprises a data repository, such as a directory, that maintains location information for a given set of subscribers. In other words, a subscriber of the telecommunication system is assigned to an HLR 307 for record purposes, such as subscriber information. The HLR 307 typically provides support to the PS domain 212 components such as the SGSN area 317 and the GGSN area 319, in order to enable subscribers to access services within the PS domain 212. Similarly, the HLR 307 provides support to the CS domain 210 components, such as the MSC area 313 and the GMSC area 315, in order to enable subscriber access to services provided by the CS domain 210 and to support services such as roaming within the CS domain 210. Although only a single HLR 307 is shown in FIG. 3, a typical Core Network 206 might include multiple HLRs.

The AuC 309 is associated with an HLR 307 and stores an identity key, such as the PrivateID 327, for each subscriber registered with the HLR 307. This identity key facilitates generation of security data for a subscriber, such as the PublicID 329. In addition, the AuC 309 may contain information related to the authentication of the IMSI 323 of the subscriber equipment and the Mobile Telecommunication System 204. Further, the AuC 309 includes information to ensure integrity and security of communication over a radio path between the mobile station (MS) and the Mobile Telecommunication System 204. Each AuC 309 typically communicates only with its associated HLR 307 over an interface usually denoted as H-interface. The HLR 307 requests the information from the AuC 309 through the H-interface, stores the information and delivers it to appropriate components in the Core Network 206 as may be required.

The HSS-LF 311 module includes functional modules that enable services such as mobility management, session establishment support, subscriber security information generation, subscriber security support, subscriber identification handling, access authorization, service authorization support, and service provisioning support The VLR 303 typically controls the MSC area 313 in the CS domain 210 and effectively controls the MSs roaming in the MSC area 313. When an MS "enters" a portion of the Mobile Telecommunication Network 204 covered by the MSC area 313, the MSC area 313 registers the MS with the VLR 303. In the registration procedure, the MSC area 313 controlling a given portion of the Mobile Telecommunication Network 204 detects the MS and provides information about the MS to the VLR 303. Having received information from the MSC area 313, the VLR 303 checks the MS' registration status. If the MS is not registered in the VLR 303, the VLR 303 requests the HLR 307 to provide information related to the MS to facilitate proper handling of calls involving the MS. VLRs are known in the art.

The information related to the MS accessed by the VLR 303 typically includes data such as the IMSI 323, the MSISDN 325, the Mobile Station Roaming Number (MSRN), the MSC area 313 where the MS has been registered, the identity of the SGSN area 317 where the MS has been registered (where the mobile network supports GPRS and provides an interface between the VLR 303 and the SGSN area 317). In an embodiment of the invention, the VLR 303 may interoperate with more than one MSC area 313.

The EIR 305 provides a logical entity which is responsible for storing the International Mobile Equipment Identities (IMEI). The equipment may be classified as "white listed," "grey listed," "black listed," or it may be unknown. In a conventional CN 206, the EIR 305 maintains at least a white list.

Subscriber-Centric Data Storage

Figure 4:
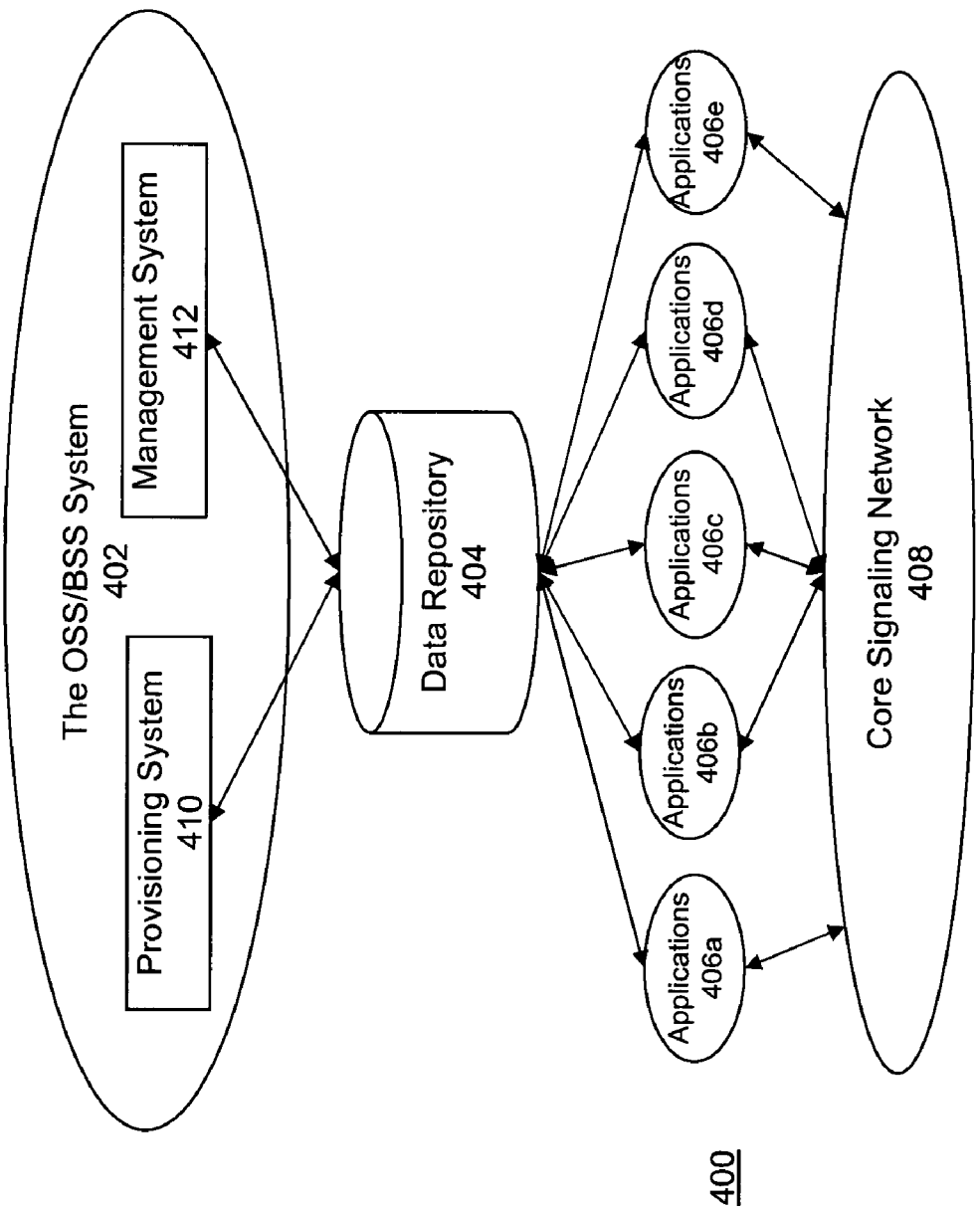
FIG. 4 provides a functional view of data storage in a network architecture 400, according to an embodiment of the invention.

FIG. 4 provides a functional view of data storage in a network architecture 400, according to an embodiment of the invention. The network architecture 400 comprises an Operations Support System (OSS)/Business Support System (BSS) system 402, a Data Repository 404, one or more applications, such as, for example, Applications 406a-406e, and a Core Signaling Network 408.

The OSS/BSS System 402 includes a Provisioning System 410 and a Network Management System 412. The OSS/BSS System 402 comprises various computing systems used by the CSP. The OSS/BSS systems 402, including the Provisioning System 410 and the Network Management System 412, comprise the "network systems" of the mobile telecommunication network, that support processes such as maintaining network inventory, provisioning services, configuring network components, and managing faults. The BSS systems comprise "business systems" for dealing with subscribers, supporting processes such as taking orders, processing bills, and collecting payments.

The Data Repository 404 provides a centralized data domain that supports open access to data, such as subscriber and service data, by one or more applications, such as, the Applications 406a, 406b, 406c, 406d and 406e, as well as BSS/OSS systems, such as the Provisioning System 410 and the Network Management Systems 412, according to an embodiment of the invention. For example, the Data Repository 404 may include the data stored for an HSS, such as the data associated with the HSS 301 shown in FIG. 3, as well as the data set for the entire Mobile Telecommunications Network 204. Accordingly, the Applications 406a-406e may comprise the HSS 301 and/or the HLR 307, respectively, according to an embodiment of the invention. The Applications 406a-406e may also include applications such as a Voicemail system, an Authentication, Authorization and Accounting (AAA) system, Mobile Number Portability (MNP), according to an embodiment of the invention. These applications are all known in the art. Additional Applications 406 may also be included in the network 400. The Data Repository 404 may be configured as an ITU-T X.500 directory application, according to an embodiment of the invention.

In an embodiment of the invention, the software architecture of the Data Repository 404 provides a single logical directory entity. Every physical entity has access to every data record, providing high reliability and performance, according to an embodiment of the invention. In various embodiments of the invention, the Data Repository 404 supports a variety of open interfaces, such as, Directory Access Protocol (DAP), Lightweight Directory Access Protocol (LDAP), Structured Query Language (SQL), OBDC/JDBC and so forth. These open interfaces, which are known in the art, simplify linking the data stored in the Data Repository 404 to business applications, such as, Customer Relationship Management (CRM) systems.

In an embodiment of the invention, the Data Repository 404 is implemented as an in-memory data repository. The in-memory operation of the Data Repository 404 is typically much faster than disk-based systems. Thus, the Data Repository 404 may provide efficiencies that result in higher performance and lower costs for the CSPs, according to an embodiment of the invention.

Figure 5:
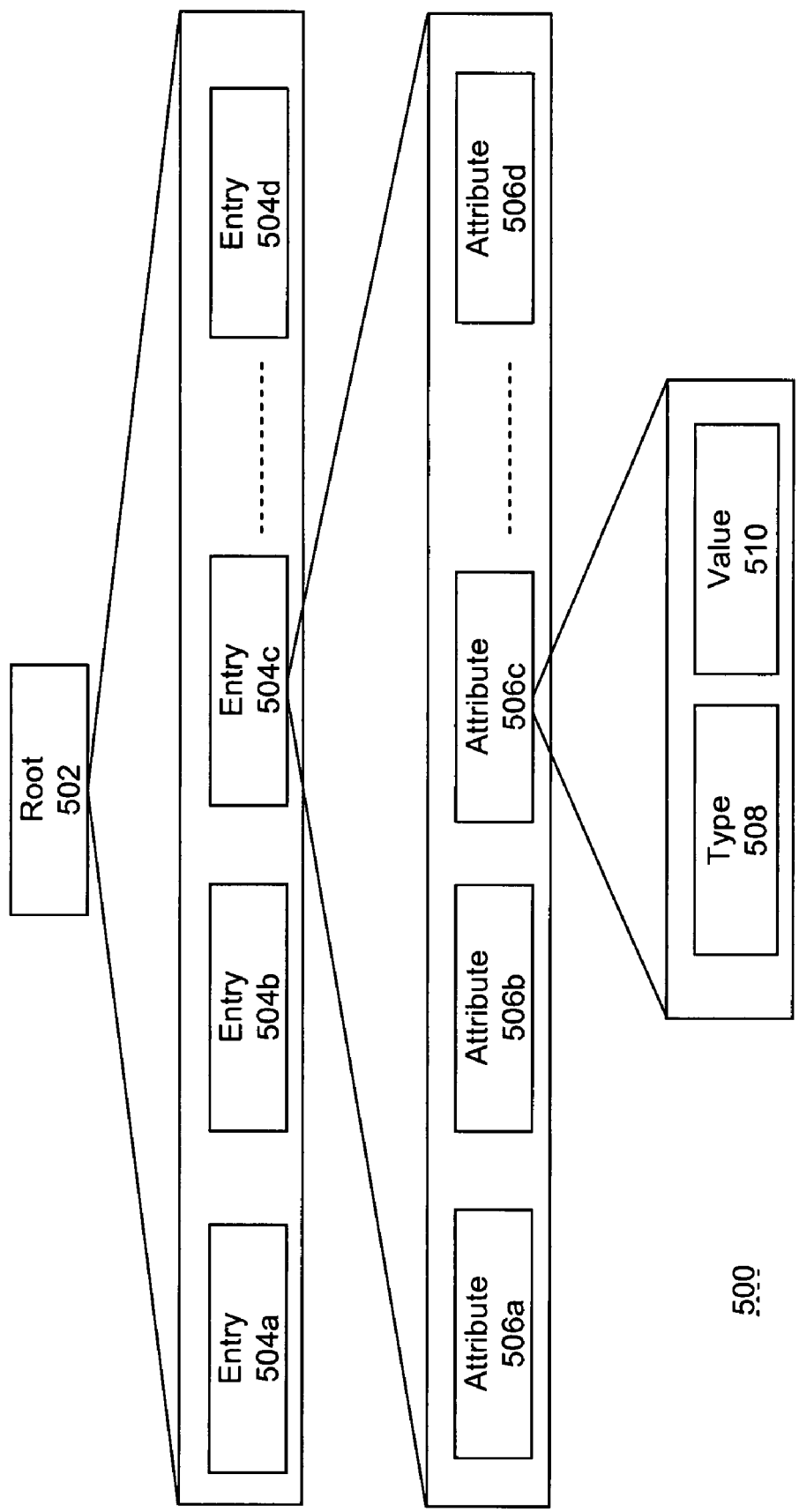
FIG. 5 depicts a Directory Information Base (DIB) 500, according to an embodiment of the invention.

FIG. 5 depicts a Directory Information Base (DIB) 500, according to an embodiment of the invention. For example, the DIB 500 represents the directory structure of the Data Repository 404 shown in FIG. 4. The DIB 500 includes a root 502 and one or more entries, such as, entries 504a, 504b, 504c, 504d and so forth. The entries 504a-504d are hereinafter referred to as entry 504. The entries 504a-504d may alternatively be referred to as "objects." Each entry 504 in the DIB 500 may include one or more attributes, such as, for example, the entry 504c includes the attributes 506a, 506b, 506c, 506d, and so forth. The attributes 506a-506d are hereinafter referred to as the attribute 506. Each attribute 506 may include a type 508 and one or more values 510. The DIB 500 represents the set of data stored in a directory. For example, the DIB 500 may contain data describing the subscribers to a communications network, e.g., the subscribers in the Mobile Telecommunication Network 204.

Figure 6:
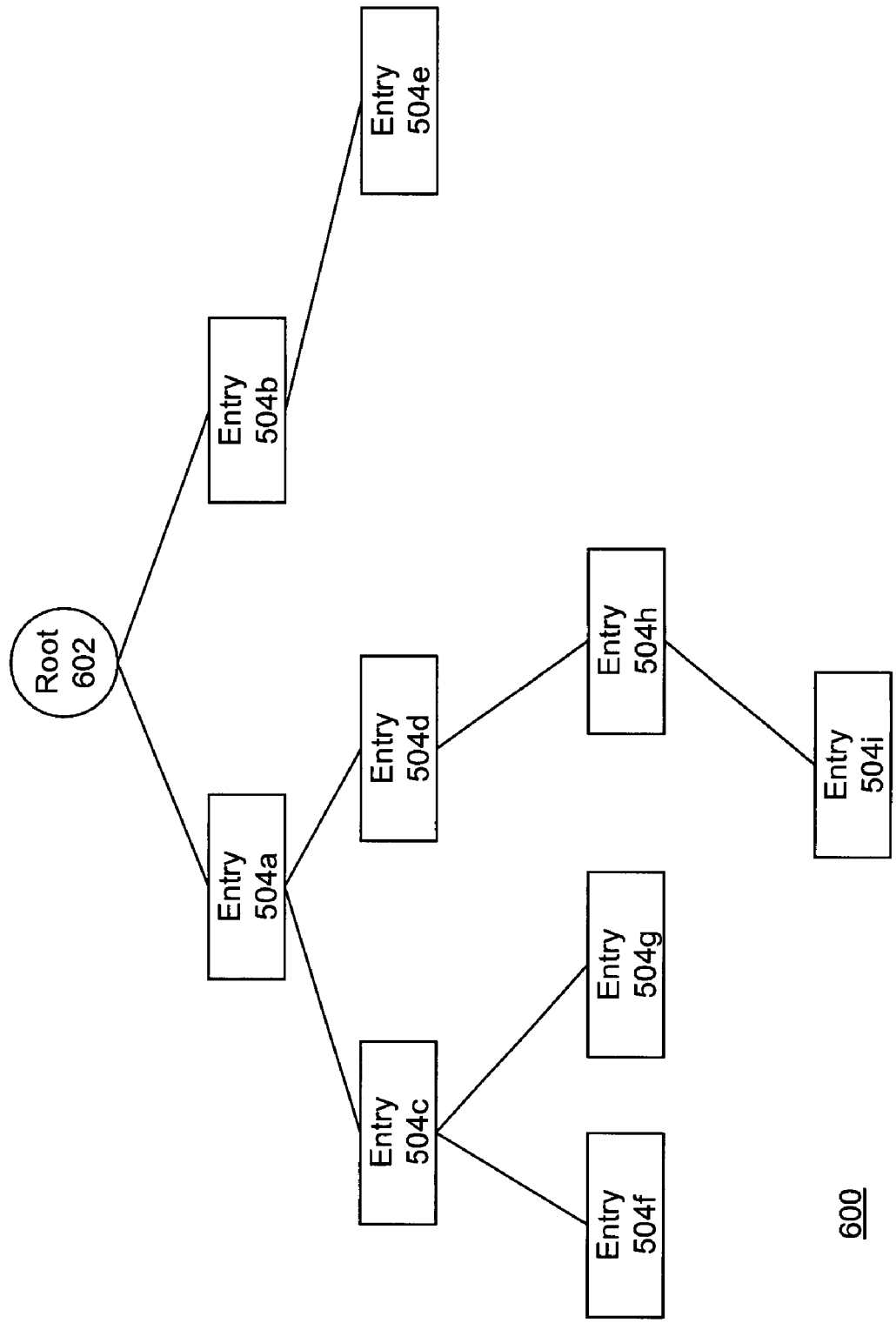
FIG. 6 depicts a Directory Information Tree (DIT) 600, according to an embodiment of the invention.

FIG. 6 depicts a Directory Information Tree (DIT) 600, according to an embodiment of the invention. The DIT 600 represents the structure (schema) of the DIB 500 shown in FIG. 5. The DIT 600 includes a root node 602 and entries 504, such as entries 504a-504i, and so forth. The DIT 600 is represented here as a hierarchical tree structure with the root node 602 at the base. Each node in the tree is the entry 504. If the DIT 600 has been constructed to adhere to various standard formats, such as the X.500 standard, then each entry 504 in the DIB 500 is uniquely and unambiguously identified by a Distinguished Name (DN). The DN of the entry 504c, for example, is based on the DN of the superior entry, such as the entry 504a, in addition to specially identified attributes of the entry 504c (distinguished values). The distinguished value and its associated type are also known as a Relative Distinguished Name (RDN) which uniquely identifies the entry 504c with respect to its parent, such as entry 504a. Therefore, for describing an RDN, the attribute type and the distinguished value of the entry 504c are used. For example, for the entry 504a, if the DN is "c=UK", where "c" is the attribute type (short for "country") and "UK" is the distinguished value for the entry, then for the entry 504c with "o=MyCompany" where 'o' is the attribute type (short for "organization") and 'MyCompany' is the distinguished value for the entry, the DN for 504c will be "o=MyCompany, c=UK" or "MyCompany.UK." The DN is analogous to a URL as used in the World Wide Web.

Directory System Agents—Optimized Routing

The Mobile Telecommunications System 204 may comprise huge numbers of subscribers. For example, some telecommunications systems comprise millions of individual subscribers. Accordingly, while the data associated with these subscribers may be logically represented, such as has been shown in the centralized Data Repository 404 of FIG. 4, the physical embodiment may be such that the data is partitioned into meaningful sub-groupings to provide greater speed and overall robustness to the telecommunication system. Data may, for example, be stored and replicated on a network of servers, according to an embodiment of the invention. In X.500, a partition of the data is held (mastered) by a Directory Server Agent (DSA).

Figure 7A:
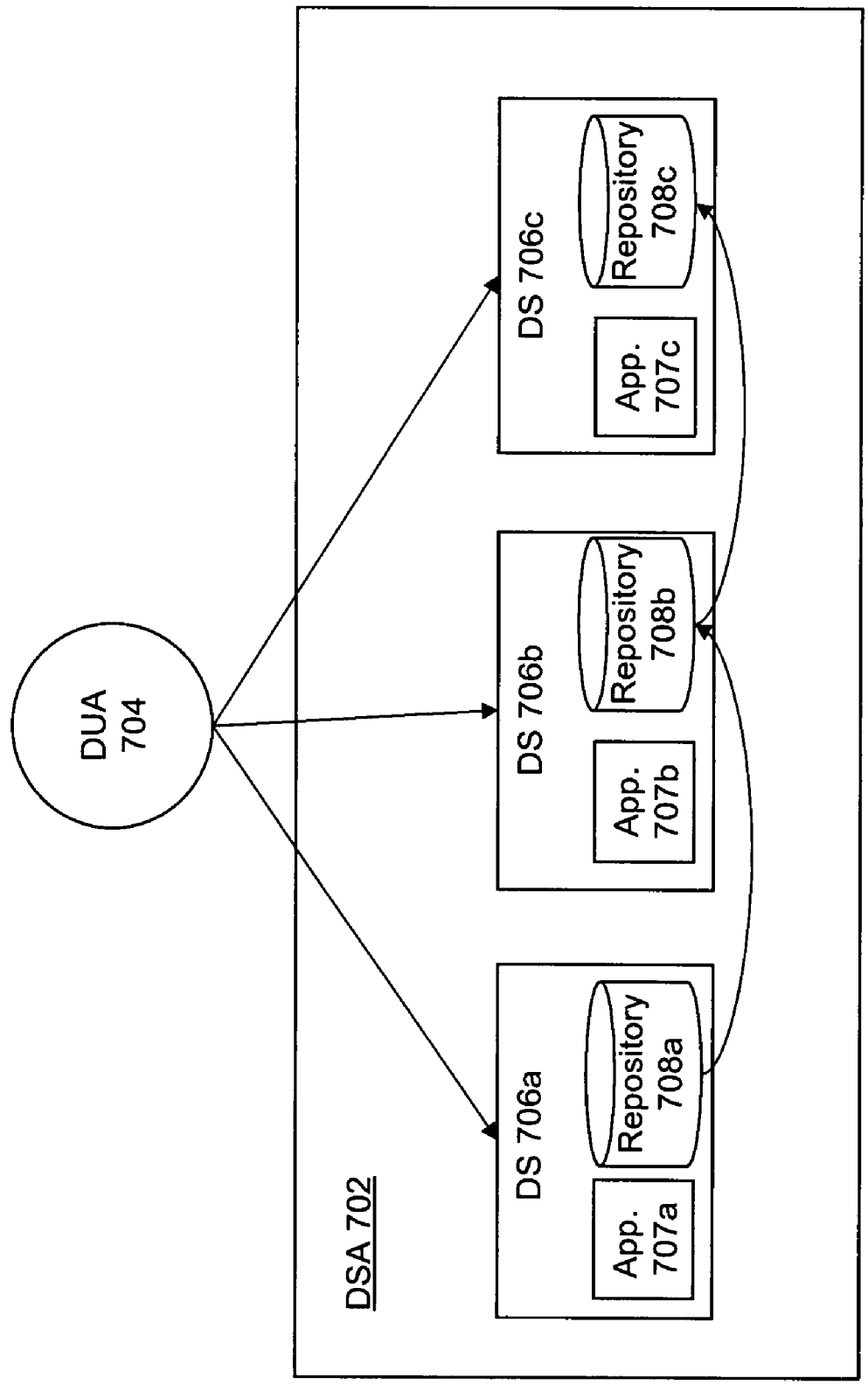
FIG. 7A illustrates a Directory System Agent (DSA) 702 and a Directory User Agent (DUA) 704, according to an embodiment of the invention.

FIG. 7A illustrates a Directory System Agent (DSA) 702 and a Directory User Agent (DUA) 704, according to an embodiment of the invention. The DSA 702 includes one or more directory servers, such as directory servers 706a-706c and so forth. Each of the one or more directory servers 706a-706c includes a data repository 708a-708c and so forth, hereinafter referred to as the data repository 708, according to an embodiment of the invention. The data repository 708 preferably comprises an in-memory database. The directory servers 706a-706c also include directory server software, such as directory server application software 707a-707c, according to an embodiment of the invention.

The DSA 702 is configured to determine the capacity and load for each of its respective directory servers 706a-706c, according to an embodiment of the invention. The DSA 702 may also detect when any of the directory servers 706a-706c are not communicating, whether from planned maintenance or from a communications, hardware, or other failure. As shown in FIG. 7A, the DSA 702 is implemented as a cluster of distinct directory servers, such as the directory servers 706a-706c. Thus, the DSA 702 may use its knowledge of the directory servers' status and capacity to quickly and efficiently handle data requests. In essence, the DSA 702 operates as a more efficient and more robust directory server than any one of the directory servers under its control acting alone. Of course, the DSA 702 could be implemented with more, or fewer, directory servers 706 than shown in FIG. 7A. In an embodiment of the invention, each of the directory servers 706 runs the same software components and maintains an identical copy of at least a portion of the DIB 500 (shown in FIG. 5) in the in-memory data repository 708 for which the DSA 702 has responsibility.

The DUA 704 is a conventional term for a directory services client, e.g., an LDAP or DAP client. For example, the DUA 704 makes the data requests as LDAP operations on behalf of various client applications, according to an embodiment of the invention. As will be shown in FIG. 7B, a typical deployment comprises multiple DSAs 702. The DUA 704 connects to one of the DSs 706 in one of the DSAs 702. That server's DSA 702 may hold the data relevant for the request (in which case it may handle the request itself) or may otherwise know a DSA 702 better able to handle the request. In the latter case, the DS 706 selects one of the servers 706 in that alternative DSA 702 and forwards the request to it (chaining). This process is described again in the Optimal Routing subsection hereinbelow.

Thus, the DSA 702 determines which directory server 706 should respond to the data request. The operations of the DSA 702 and the DSes 706a-706c are typically transparent to the DUA 704. Accordingly, in various embodiments of the invention, the DUA 704 may connect to any one of the directory servers 706a-706c to retrieve the same data. If the DSA's data repositories 708 contain only a portion of the DIB 500, then the complete DIB 500 can be constructed using one or more additional DSAs whose respective data repositories 708 contain other portions of the DIB 500. In such an embodiment, then the DSAs 702 also need information to help them select an appropriate DSA 702 for a given action.

The software running on the directory servers 706a-706c comprises directory server software 707a-707c, according to an embodiment of the invention. The directory server software 707 provides a distributed data infrastructure and directory access software for the directory servers 706. As discussed above, low-level operations performed by the in-memory data repositories 708a-708c are not a part of the invention disclosed and claimed herein. Embodiments of the invention can be configured to work with various low-level data repository programs.

FIG. 7B illustrates a distributed hierarchy comprising three DSAs 702a, 702b, and 702c, according to an embodiment of the invention. These DSAs 702a-702c illustrate how a given DIB 500 may be distributed and replicated for fast access in a communications network.

For example, the DIT 600 may be so large that it needs to be spread across several DSAs, such as DSA 702a-702c. The HSS 301, for example, need not know how large or small the DIT 600 is, or on which DSA a particular piece of data is stored. The HSS 301, for example, merely needs to route its request through the DUA 704 which directs the request to a DSA 702 which either answers the request itself or finds a DSA 702 that will answer the request, according to an embodiment of the invention.

Assume further that a given DIB 500 comprises data relating to the subscribers in a communications network, including these subscribers' respective IMSI data (the unique number associated with all GSM and UMTS network mobile phone subscribers) and these subscribers' respective MSISDN data (the fixed number of digits that is used to refer to a particular mobile device). Such a DIB 500 could be deployed in the DSAs 702a-702c as follows: the subscriber's data, such as their names and addresses could be placed in the DSA 702a, which would act as a root DSA. The subscribers' respective IMSI data could be placed in DSA 702b, which would act as an IMSI domain (such as the IMSI 323 shown in FIG. 3), and the subscribers' respective MSISDN data could be placed in DSA 702c, which would act as a MSISDN domain (such as the MSISDN 325 shown in FIG. 3).

Thus, in this example configuration, the DSA 702a could serve as a "root" DSA; the DSA 702b could serve as an "IMSI" domain DSA, and the DSA 702c could serve as an "MSISDN" domain DSA. The root DSA 702a includes one or more directory servers 706a-706c; the "IMSI" domain server 702b includes one or more directory servers 706d-706f; and the "MSISDN" domain DSA 702c includes one or more directory servers 706g-706i. The one or more directory servers 706a to 706i include directory server software, such as the directory server software 707 shown in FIG. 7A, and a data repository, such as the data repository 708, shown in FIG. 7A, according to an embodiment of the invention. The root DSA 702a stores the root entry; the "IMSI" domain DSA 702b stores "IMSI" related data, and the "MSISDN" domain DSA 702c stores "MSISDN" related data.

Thus, in various embodiments of the invention, one or more DSA 702 may be implemented together to store the DIB 500, such as the complete DIB for an entire mobile telecommunications network. Each DSA 702 is typically responsible for a defined subset of the data that comprises the DIB 500. Thus, in the example above, the DUA 704 could connect to any of the available DSAs 702, such as the root DSA 702a, the "IMSI" domain DSA 702b and the "MSISDN" domain DSA 702c. The request from the DUA 704 is transparently processed by the DSA, such as, for example, the "IMSI" domain DSA 702b, mastering the data.

Optimized Routing

Figure 8:
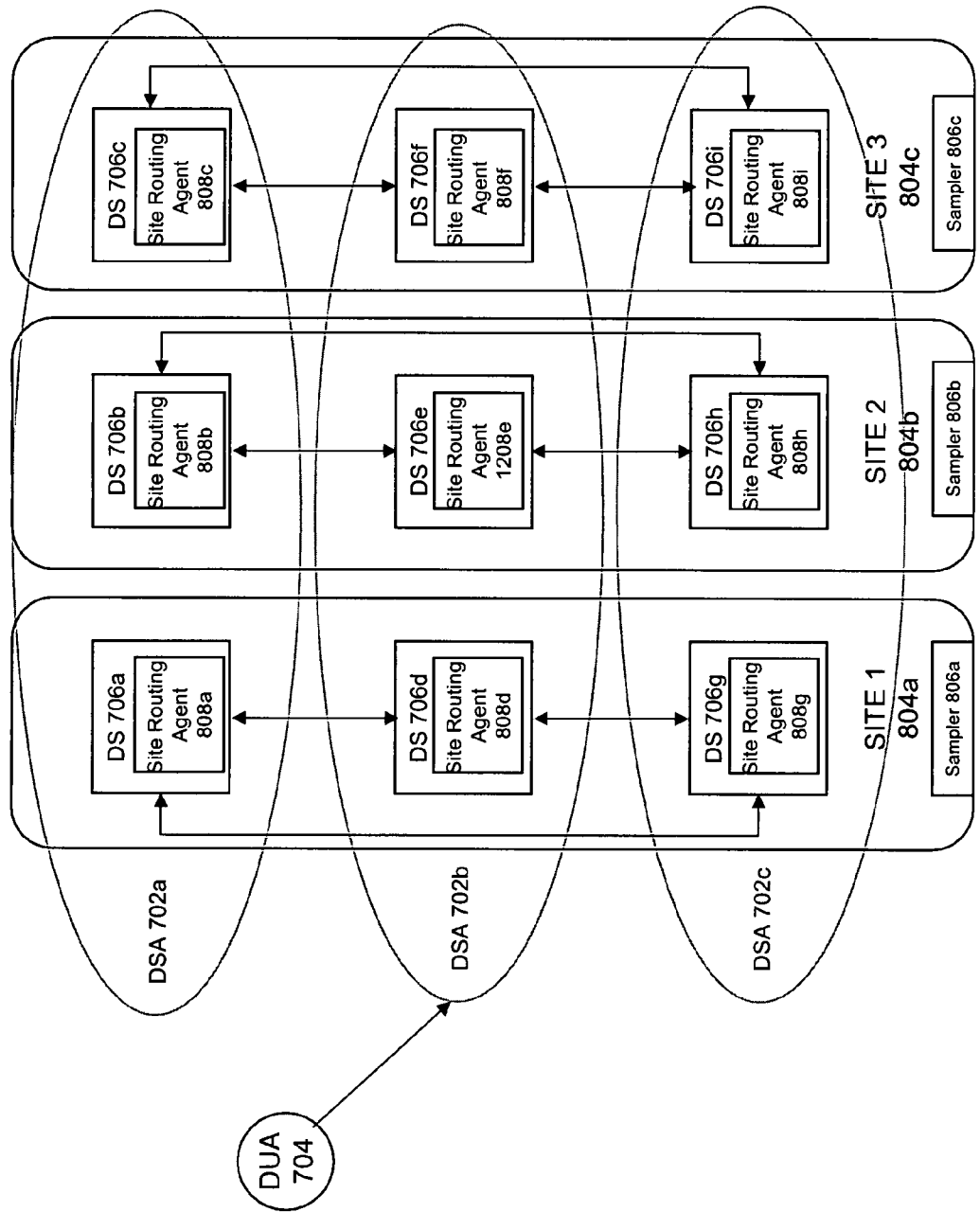
FIG. 8 illustrates optimized routing in the distributed hierarchy of DSAs shown in FIG. 7B, according to an embodiment of the invention.

FIG. 8 illustrates optimized routing in the distributed hierarchy of DSAs shown in FIG. 7B, according to an embodiment of the invention. As discussed above, the DSAs 702a-702c work together to provide a distributed directory. Each DSA 702 holds a subset of the directory entries in its DSs 706, along with knowledge about possible locations of directory entries that it does not hold. As discussed, a DSA 702 may be able to satisfy a directory operation locally if it concerns data located within its own subset of the directory. Otherwise, the DSA 702 (e.g., the DSA 702a) uses its knowledge about the directory to the select which DSA (e.g., the DSA 702b) is the best DSA to satisfy the operation and then chain the operation to the other DSA 702b.

As discussed above, each DSA 702 is implemented as a set of DSs 706, each typically holding a fully replicated copy of the subset of the directory. Thus, each of the DSs typically processes a directory operation in an identical fashion. As part of the chaining process, the DS 706 of a first DSA 702 has to select a DS 706 in a second DSA 702 to receive the chained operation. This selection conventionally implements load sharing, based on round robin or least utilized, and may take into account the ability of the DSes to handle the request. For example, if the DS 706 is known to have a non-fully replicated version of the directory as a result of an earlier problem, it will not be selected.

However, the typical physical implementations of the DS 706 are such that they are geographically distributed. Moreover, it is often the case that located on a given physical site, there will be one or more DSs for other DSAs 702. In other words, the DSs 706 of various DSAs 702 may be clustered together in relatively close physical proximity and/or communications distance proximity.

For example, the set of DSAs 702 shown in FIG. 8 is physically arranged such that DS 706a, DS 706d, and DS 706g physically reside on Site 1 804a; DS 706b, DS 706e, and DS 706h physically reside on Site 2 804b, and DS 706c, DS 706f, and DS 706i physically reside on Site 3 804c. Such a distribution provides, among other things, extra resilience for the communications network. For example, if there is a power failure at Site 1 804a, then operations can continue smoothly for DSAs 702a-702c using the DSes 706 found on Site 2 804b and Site 3 804c.

The communication paths (e.g., WAN) from one DS cluster (i.e., DSs at the same site) to another DS cluster are typically of lower bandwidth and higher latency than communications within a DS cluster (i.e., DSs at the same site). In other words, it generally takes less time for the DS 706a to communicate with DS 706d than it does for the DS 706a to communicate with the DS 706e because both the DS 706a and the DS 706d are located on the same site, i.e., Site 1 804a.

Assuming that data accesses are load-shared across DS sites, then selecting a DS 706 for chaining based on the physical location of that DS 706 may provide optimized communications usage (e.g., optimal WAN usage) and reduced response times for directory operations. In other words, the DS 706a should preferably communicate with the DS 706d when it needs data associated with the DSA 702b rather than the DS 706e or the DS 706f because the DS 706a and the DS 706d are located on the same site, Site 1 704a. Of course, if the DS 706a required data from the DSA 702b and the DS 706d was unavailable, for whatever reason, then the DS 706a would be configured to chain to the DS 706e or the DS 706f, which are also part of the DSA 702b but located on a site different from the DS 706a.

A Site Routing Agent 808 on the DS 706 is configured to determine which second DS 706 can complete a given data request at a lowest cost relative to a set of other DSs, according to an embodiment of the invention. The Site Routing Agent 808 may be configured to consider the distance between all possible DSs or a given subset of DSs. For example, it might be more inefficient for a Site Routing Agent in the UK to calculate the distance to another DS in China when the DS was mirrored on six other sites in Europe. A simpler approach would be for the Site Routing Agent 808 to calculate periodically the distance to the other European sites with a default rule to use the site in China if the other European DSs were ever unavailable, according to an embodiment of the invention.

Additionally, the Site Routing Agent's 808 selection of the DS 706 can encompass a variety of factors, according to an embodiment of the invention. For example, the Site Routing Agent 808 could base its selection of another DS 706 using a ranking of connectivity between the nodes (e.g., sites), where the rank values are derived from factors, such as bandwidth, latency, and cost. Assume from the example above that the DS 706a needs data from the DSA 702b and the DS 706d is unavailable. Assume further that Site 2 804b is significantly "closer" to the Site 1 804a than the Site 3 804c is to the Site 1 804a, where "closer" comprises a composite based on at least one of bandwidth, latency, and cost, e.g., the lowest score for bandwidth+latency+cost. Accordingly, the Site Routing Agent 808a may recommend that the DS 706a chain to the DS 706e of the Site 2 804b. If the DS 706e is unavailable, then the Site Routing Agent 808a may recommend that the DS 706a attempt to complete its operation on the DSA 702b with the DS 706f of Site 3 804c.

In a still further embodiment of the invention, the Site Routing Agent 808 can be configured for dynamic selection of a DS 706. For example, assume from the example that a sampling device 806, associated with each of the sites periodically monitors the "distance" between the Site and any other Sites of interest. For example, the Sampler 806a of the Site 1 804a could periodically monitor the "distance" to the Site 2 804b where the "distance" is measured by at least one of bandwidth, latency, and cost, e.g., the lowest score for bandwidth+latency+cost. The Sampler 806a can then make the results of this "distance" calculation available to the Site Routing Agents 808a, 808d, 808g on the Site 1 804a. The Sampler 806a may itself be configurable in terms of how it measures "distance" and how often it measures such distance. Additionally, the Sampler 806a may base its "distance" determination on actual measurements, such as response times, received from the DSes 706 and reported to the Sampler 806a. This dynamic approach takes account of changing network conditions and problems with given DSes or communication paths. Alternatively, the Sampler 806a could be located within the DS 706, e.g., within the Site Routing Agent 808 itself.

In yet a still further embodiment of the invention assume, for example, that the Site Routing Agent 808 calculates "distance" or "closeness" between two DSes in terms of "cost." Assume further that the elements of cost are bandwidth, latency, and access cost, according to an embodiment of the invention. Of course, other components could comprise the primary drivers of cost. Assume further that a weighted cost equation could be expressed as a formula, such as: (Weight1×Bandwidth)+(Weight2×Latency)+(Weight3×Access Cost). The Site Routing Agent 808 could be configured to calculate new results for this equation periodically, e.g., daily, hourly, every minute, etc. The Site Routing Agent 808 could then make sure that the DS 706 first attempted to select the lowest cost DS 706 when chaining was required. This, of course, might mean a DS that was not located on the same site. Alternatively, the sampler 806 might perform these equations and then provide the results to the relevant set of Site Routing Agents 808, according to an embodiment of the invention.

Aliases and Alias Hiding

FIG. 9A depicts a DIT 900 having an Alias Entry 902, according to an embodiment of the invention. The DIT 900 includes one or more entries, such as entries 504a-504g and so forth, the root node 602, and the Alias Entry 902.

As previously discussed, in the DIB 500 shown in FIG. 5, an instance of an entry, or an object, is uniquely and unambiguously identified by the DN. However, the DN need not be the only name by which an entry, such as the entry 504f, can be referenced by a client application. An alias entry, such as the Alias Entry 902, is an entry in the DIT, such as the DIT 900, that has an attribute, such as "aliasedEntryName," which contains the name of another entry in the DIT 900. So, for example, the Alias Entry 902 might have an attribute named "aliasedEntryName" whose value is the name "Entry 504f." The second entry (e.g., the Entry 504f) does not necessarily need to exist in the DIT 900, although it does in this example. Note also that the structure of the Alias Entry 902 in the DIT 900 need not be fundamentally different than the entries 504a-504g, with the difference in names ("entry" versus "alias entry") presented here as an aid to understanding the function of the alias entry.

Alias entries, such as the Alias Entry 902, provide alternative names for an entry, such as the entry 504f. An alias is a special entry in the DIB 500 which points to another entry, such as the entry 504f. Aliases are similar to a symbolic link in a file system. Therefore, an alias is a useful way of providing a database entry, such as the entry 504f, with multiple identities without duplicating data. Aliases are particularly useful if the data is stored under a unique name (or key) that will not often change (perhaps allocated by the Provisioning System 410) but needs to be publicly accessed by a variety of different identities, such as, for example, applications associated with IMSI 323, MSISDN 325, Uniform Resource Locator (URL) and the like, which may change, according to an embodiment of the invention. Using aliases allows data to be stored once and then referenced via multiple different identities implemented as aliases. Alias entries, such as the Alias Entry 902, can be added, modified, and/or removed without affecting the data.

New aliases may be implemented in the DIT 900 by an Alias Creation Module 905. The Alias Creation Module 905 may be configured to construct an alias in the DIT 900 so that other components, such a Name Resolution Module 909 shown in FIG. 9B, can then perform alias dereferencing for data requests received from a client application, according to an embodiment of the invention. The Alias Creation Module 905 may include a user interface so that aliases may be created after initial provisioning (e.g., "on the fly") so as to enable the rapid deployment of new aliases. Alternatively, the Alias Creation Module 905 may be invoked via a conventional directory "addEntry" operation by, for example LDAP or DAP.

In some embodiments of the invention, the Alias Creation Module 905 implements the alias as an entry in the DIB 500 with a mandatory attribute which provides the DN of the entry pointed to by the alias. For example, assume the entry 504a has a DN "c=UK", the entry 504c has a DN "o=MyCompany, c=UK" and the entry 504d has a DN "o=CompanyX, c=UK". The entry 504f has a DN "employeeId=111, o=MyCompany, c=UK". Therefore, the Alias Entry 902 may have an alternative name "cn=Joe, o=MyCompany, c=UK" and reference the entry 504f.

A provider of a directory service, such as a CSP, may want to use aliases, but do so in a manner different from that provided for by various known protocols and aliasing techniques. For example, such a directory service provider might want to provide aliasing services to client applications, such as the HSS 301, that might not have been designed with an ability to use aliases. Additionally, the directory service provider might also want to hide from one or more applications that aliasing has been performed, even when the client application itself could perform aliasing. Such alias hiding could be performed, for example, for security reasons.

Figure 9B:
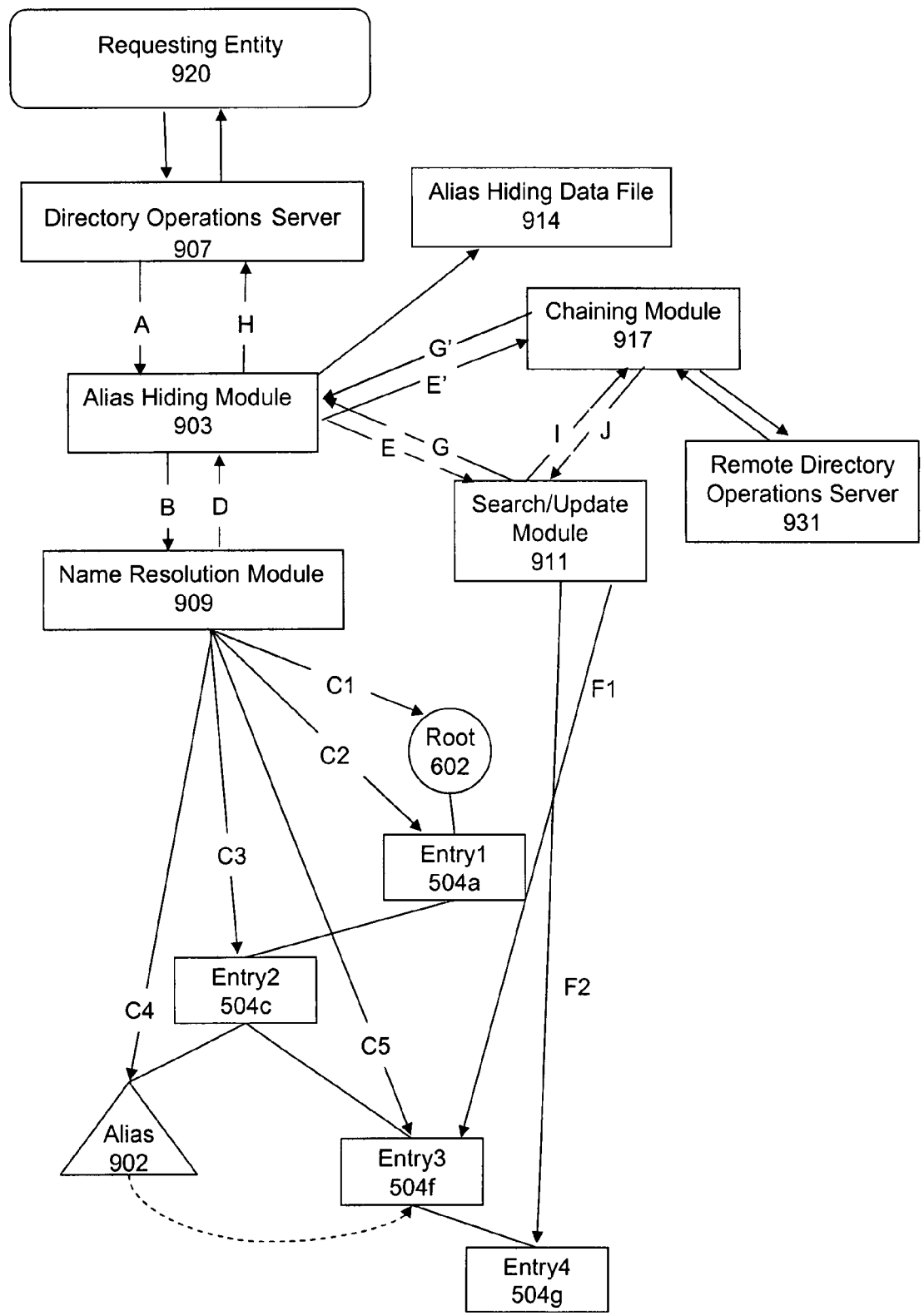
FIG. 9B illustrates an Alias Hiding Module 903 interacting with the DIT 900 including the Alias 903 to perform alias hiding on a data request from a Requesting Entity 920, according to an embodiment of the invention.

FIG. 9B illustrates an Alias Hiding Module 903 interacting with the DIT 900 including the Alias 903 to perform alias hiding on a data request from a Requesting Entity 920, such as a client application, according to an embodiment of the invention.

The Alias Hiding Module 903 located in a directory server, such as the DS 706 shown in FIG. 7A, intercedes during data requests by the Requesting Entity 920 and controls alias dereferencing, both for queries and updates, irrespective of the expectations of the Requesting Entity 920, according to an embodiment of the invention. Accordingly, the Requesting Entity 920 could represent an entity such as a client application, an end user, or a remote DSA that may be need data to complete a chaining procedure initiated on a portion of the directory under that DSA's control. For example, the Requesting Entity 920 might be an HSS 301 that has not been configured to control aliasing itself and/or an HSS 301 for which the CSP would like to hide aliasing.

Accordingly, the Alias Hiding Module 903 may replace in the results presented to the Requesting Entity 920 the names in the entries with names that accord with the Requesting Entity's view of the DIT 900, according to an embodiment of the invention.

Using the Alias Hiding Module 903, entries, such as the entry 504f may contain data that could be accessed by the Requesting Entity 920, such as the HSS 301, using a different name, such the name of the Alias Entry 902. The Requesting Entity 920, for example, may need to address an entry, such as the entry 504f, by a name that is unique to the Requesting Entity 920. However, assume that the Requesting Entity 920 has not been designed so that it can use aliasing as the approach is conventionally deployed. The Alias Hiding Module 903 thus effectively provides such Requesting Entities 920 with the ability to use aliasing, without requiring any modifications to the Requesting Entity 920.

In fact, an entry, such as the entry 504f, could have a variety of alias entries (e.g., multiple instances of the alias 902), with each alias entry representing a name used by different Requesting Entities 920 to access the data contained in the entry 504f. This approach allows data associated with a telecommunications network to be centrally located, such as in the Data Repository 404, without having to alter existing Requesting Entities 920 (e.g., client applications), according to an embodiment of the invention. Thus, the Alias Hiding Module 903 allows a CSP to use legacy applications, such as a legacy HSS 301, even after switching to a different architecture for the telecommunications network.

The Alias Hiding Module 903 can also remove any indications that aliasing has been performed when returning the data to the Requesting Entity 920, according to an embodiment of the invention. In other words, embodiments of the invention allow data to be returned according to the Requesting Entity 920's native data format, such that the data can be presented to the Requesting Entity 920 with the expected attribute value and name. In such instances, the Requesting Entity 920 only needs to know the alternative or alias entry name.

Alias-hiding is mechanism that can be used on a per-application basis to hide the existence of an alias, according to an embodiment of the invention. The alias hiding instructions for a given application can be included in the Alias Hiding Data File 914, according to an embodiment of the invention. When alias-hiding is performed for the Requesting Entity 920, operations requested by the Requesting Entity 920 involving an alias, such as the Alias Entry 902, appear to the Requesting Entity 920 as an operation on a normal entry, such as the entry 504f. The Alias Hiding Module 903 may force dereferencing of any aliases and subsequently performs name mapping on any returned entry names to be relative to the original base name in the Requesting Entity's request, rather than the real entry name. Therefore, search results presented to the Requesting Entity 920 may include the alias name and not the real name in the DIT 900 of the entries returned in the search. From the Requesting Entity's viewpoint, the alias appears as a real entry. Likewise, any entries subordinate to the real entry appear as entries subordinate to the alias. Thus, the Requesting Entity 920, such as the HSS 301, can update and query the entry using the alias name.

According to an embodiment of the invention, the Alias Hiding Module 903 may perform three separate functions:

Control alias de-referencing by a Name Resolution Module 909, possibly in contradiction to the expectations of the Requesting Entity 920 (e.g., a client application) that originated the data request, and/or Control alias de-referencing by a Search/Update Module 911, or of a directory operation chained by a Chaining Module 917, possibly in contradiction to the expectations of the Requesting Entity 920 (e.g., a client application) that originated the data request, and/or Modify names in results generated by the Search/Update Module 911 or returned by the Chaining Module 917 so that they are relative to the base name provided by the Requesting Entity 920 (e.g., a client application) that originated the data request, rather than the resolved base name (RDN), and in addition, for any aliases encountered during a sub-tree search, recursively replace the relative real entry names with the relative names of the alias entries, so that it appears as if there is a single sub-tree below the resolved base entry with no aliases.

FIG. 9B illustrates the processing of directory operations when using the Alias Hiding Module 903 in the three cases above, according to an embodiment of the invention.

Requests for access to data in a directory may arise from a variety of entities or sources. For example, data accesses, such as searches and updates, may come from a client application, an end user, or even a directory system agent, such as the DSA 702 shown in FIG. 7A. Accordingly, as noted above, the Requesting Entity 920 could represent an entity such as a client application, an end user, or a remote DSA that may be need data to complete a chaining procedure initiated on a portion of the directory under that DSA's control.

In any event, the Requesting Entity 920 sends a data request to a Directory Operations Server 907. The Directory Operations Server 907 represents an entity configured to receive data requests and then provide them to appropriate processing units associated with a Directory Server so that the requested operation may be completed. For example, an LDAP server represents a typical directory operations server, such as the Directory Operations Server 907.

The Directory Operations Server 907 receives from the Requesting Entity 920 a request related to data stored in a directory, such as the DIT 900 and passes this request to the Alias Hiding Module 903 (Step A). The Alias Hiding Module 903 then passes this request to the Name Resolution Module 909 after modifying the data request to reflect any operative alias hiding regime(s) (Step B). In determining the operative alias hiding regime, the Alias Hiding Module 903 may review the Alias Hiding Data File 914, which may contain aliasing related data configures on bases such as per application, per user, system wide, etc. Thus, the Alias Hiding Module 903 may modify the data request to control alias de-referencing possibly in ways contrary to the expectations of the Requesting Entity 920, according to an embodiment of the invention. In the case of a chained request from a remote DSA, the operative alias hiding regime(s) may also be indicated in the chaining request parameters, where the equivalent processing on that remote DSA has already determined the operative alias hiding regime, possibly from its own alias hiding data file 914 or from an incoming chained operation.

The Name Resolution Module 909 then resolves the name provided by the Alias Hiding Module 903, according to an embodiment of the invention. The Name Resolution Module 909, located in a directory server, such as the DS 706 shown in FIG. 7A, performs name resolution processing, which is an initial part of the processing for an incoming directory operation, according to an embodiment of the invention. The Name Resolution Module 909 locates the base entry of the directory operation in the DIT 900 using the name supplied as a parameter to the directory operation by the Alias Hiding Module 903. The Name Resolution Module 909 considers each RDN in turn and locates the entry matching that RDN which is an immediate subordinate of the previously located entry (or the root entry for the first RDN). This process continues until all RDNs have been considered or until the name cannot be fully resolved locally but a reference has been encountered to enable the operation to be chained to a remote DSA which may be able to fully resolve the name, according to an embodiment of the invention.

If, during name resolution, the Name Resolution Module 909 encounters an alias entry, the name resolution process may be restarted, with the currently resolved part of the name replaced with the value of the alias entry, such as the "aliasedEntryName" entry attribute mentioned above, according to an embodiment of the invention. This restart of the operation, which is known in the art as "alias dereferencing," may occur more than once to fully resolve a name.

Name resolution is a conventional process in protocols such as the X.500, although name resolution, according to an embodiment of the invention, would not necessarily need to be performed according to any one particular protocol. The conventional LDAP protocol, for example, limits alias dereferencing to query operations only, although this limitation is not found in the conventional X.500 protocol. More importantly, this conventional process is under the control of the Requesting Entity 902, such as a client application like the HSS 301 rather than the Alias Hiding Module 903. In other words, the client application has to specify that the alias dereferencing operation should take place. In addition, the result of the conventional alias dereferencing will indicate that alias dereferencing has taken place by including, among other things, the fully dereferenced names of the entries in the results provided to the client application. According to an embodiment of the invention, the Requesting Entity 920 has no necessity for specifying whether alias dereferencing should occur, and the Requesting Entity 920 will not necessarily receive the fully dereferenced names of the entries in the results provided.

Assume, for example, that the Name Resolution Module 909 has received a read request for the data located at "Root.Entry1.Entry2.Alias" in the DIT 900. The Name Resolution Module 909 first accesses the Root 602 (Step C1). The Name Resolution Module 909 next accesses the entry 504*a* for this particular request (Step C2) before accessing the entry 504*c* (Step C3). The Name Resolution Module 909 next accesses the Alias Entry 902 and finds an indication that the Alias Entry 902 is an alias entry and that the aliased entry has name "Root.Entry1.Entry2.Entry3" (Step C4). Accordingly, the Name Resolution Module 909 restarts the name resolution process, and repeats Steps C1, C2, C3, according to an embodiment of the invention. The Name Resolution Module 909 next accesses the entry 504*f*, and determines it is a real entry, and therefore has fully resolved the original name (Step C5).

The Name Resolution Module 909 reports the located entry 504*f* along with the path taken to the Alias Hiding Module 903 (Step D). The Alias Hiding Module 903 retains the dereferenced path information, at least momentarily, according to an embodiment of the invention.

If local search/update processing is necessary to complete the request (i.e., the name has been fully resolved locally), then the Alias Hiding Module 903 passes the located entry (e.g., the entry 504*f*) and the original request, modified for the previously determined operative alias hiding regime(s) to the Search/Update Module 911 (Step E).

Alternatively, if chaining is necessary to complete the request (i.e., the name has not been fully resolved), then the Alias Hiding Module 903 passes the original operation, with the previously determined operative alias hiding regime(s) and any dereferenced alias information, to the Chaining Module 917 (Step E').

The Search/Update Module 911 acts on the located entry (e.g., the Entry 504*f*.) Located in a directory server, such as the DS 706 shown in FIG. 7A, the Search/Update Module 911 performs the operation requested by the Alias Hiding Module 903 on the resolved entry provided by the Name Resolution Module 909, according to an embodiment of the invention. In the case of an update, the Search/Update Module 911 performs the update on the entry, e.g., the entry 504*f* (Step F1). In the case of search, the Search/Update Module 911 performs the search starting at the located entry provided by the Name Resolution Module 909, e.g., the entry 504*f* (Step F1) and may also search a subset of, or all of, its subordinate entries, e.g., entry 504*g* (Step F2). In examining the subtree below the resolved entry, the Search/Update Module 911 may encounter other aliases (e.g., suppose that the entry 504*g* is an alias) and perform alias dereferencing in a manner similar to that performed by the Name Resolution Module 909.

The Search/Update module 911 may also encounter subordinate references to remote DSAs, which indicate that the subtree is partitioned and that any subordinate entries from that point are held remotely. In such cases a new search operation is chained (with the operative alias hiding regime (s)) to the remote DSA (via the Chaining Module 917)(Step I), and all of the results (Step J) from that chained operation are appended to those generated locally.

The Search/Update Module 911 reports actions taken, information retrieved (locally and/or from the chained searches), and the path taken to the Alias Hiding Module 903 (Step G). The Search/Update Module 911 typically reports the path information to the Alias Hiding Module 903 using the fully de-referenced names for the entries in the search.

The Chaining Module 917 acts as a requesting entity on the referenced remote DSA, passing chained operations to the Remote Directory Operations Server 931. Located in a directory server, such as the DS 706 shown in FIG. 7A, the Chaining Module 917 operates in conjunction with the Name Resolution Module 909, as an alternative to the Search/Update Module 911 in the case that the Directory is distributed and where the Name Resolution Module 909 cannot fully resolve the name locally, and has encountered a suitable reference which indicates that a remote DSA may be able to fully resolve the name. The Chaining Module 917 forwards the incoming directory operation, and any dereferenced aliases, to the Directory Operations Server 931 that is similar to the Directory Operations Server 907 but residing on a remote DSA. The Chaining Module 917 reports the results received back from the remote DSA, to the Alias Hiding Module 903 (Step G') or the Search/Update Module 911 (Step J), depending upon which module submitted the chaining request.

The Alias Hiding Module reports the results of the data request back to the Directory Operations Server 907 (Step H), which in turn passes the information back to the Requesting Entity 920. The Alias Hiding Module 903 may be configured to remove any indication that finding the requested information involved an alias and simply report the data request back to the Directory Operations Server 907. The Alias Hiding Module 903, depending on its instructions, may reconstruct the tree as though it contained no aliases and amend names accordingly, e.g., the tree: root.entry1.entry2.alias920.entry4 (a tree possibly expected by the Requesting Entity 920 rather than the actual tree in the directory: root.entry1.entry2.entry3.entry4). Thus, the Alias Hiding Module 903 may modify names in results generated by the Search/Update Module 911 so that they are relative to the base name provided by the Requesting Entity 920, rather than the resolved base name (RDN), and also such that any entries searched as a result of an alias entry subordinate to the base entry are represented "in situ" rather than within an explicit additional subtree, according to an embodiment of the invention.

In an embodiment of the invention, if the Alias Hiding Module 903 returns the target of any alias in the search result and the RDN attribute is listed in the returned attribute list, substitution may occur on the RDN attribute, i.e., the alias RDN replaces the real RDN in the list. Alternatively, the alias RDN may be appended to the returned attribute list, or may already be present in the list if the alias RDN is also a real attribute of the entry.

As shown in FIG. 4, a solution to the problem of multiple, independent data silos for each application operation in a network is to combine the data in one data repository. As previously discussed, in some instances, precisely the same data exists in different pre-existing data repositories, e.g., both data repositories have subscriber "John Smith." However, in some instances, an application may require that the DN have the name "Customer" while another application may require that the DN have the name "Subscriber." The DN in the data repository might have the name "Name." In all three instances, the DN's "Subscriber," "Customer," and "Name" both point to a data entry having the value "John Smith." Rather than reproduce "John Smith" three times in the database, the DN can be "Name," with two aliases "Subscriber" and "Customer." Assume that the application requiring the name "Subscriber" is removed from the system, then the alias for "Subscriber" can be deleted, according to an embodiment of the invention. Assume further than a new application is added that uses the DN "Namn" for a subscriber's name, then a "Namn" alias can simply be added.

Variants

Figure 10A:
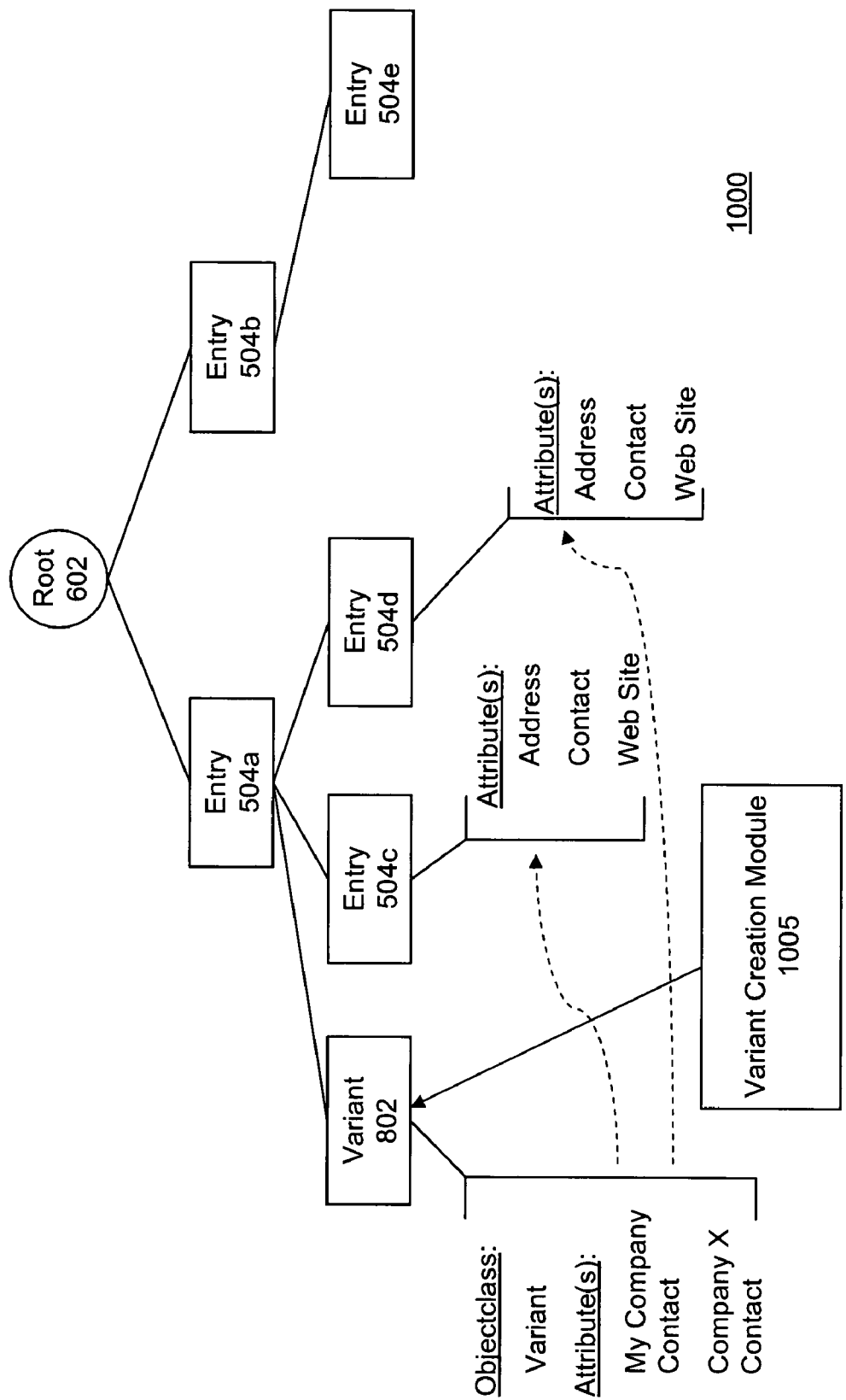
FIG. 10A depicts a DIT 1000 with a variant entry 1002, according to an embodiment of the invention.

FIG. 10A depicts a DIT 1000 with a variant entry 1002, according to an embodiment of the invention. The DIT 1000 includes one or more entries, such as entries 504a-504e and so forth, the root node 602, and the variant entry 1002. Variant entries, such as the variant entry 1002, provide alternative views of the data stored in the Data Repository 404. The variant entry 1002 defines an entry which groups together attributes from different entries in the DIT 1000, such as the entries 504c and 504d. Therefore, when a requesting entity, such as a client application, accesses the variant entry 1002, the requesting entity receives access to attributes from other entries, such as entries 504c and 504d. Access to these other entries can be transparent to the requesting entity, which need not know how the underlying data has been structured.

Thus, so long as the requesting entity retrieves data in its expected manner, then the requesting entity can operate as if the data still resided in a single, proprietary data silo, for example. In other words, no changes need to be made to the requesting entity to accommodate the presence of the variant, according to an embodiment of the invention. More importantly, implementation of a variant entry may sometimes be essential to avoid having to make a change to the requesting entity in order for the requesting entity to interoperate properly with the DIT 1000. Similarly, changes in a requesting entity's data needs can be accomplished by creating a variant entry that matches the requesting entity's new data needs. In essence, variants redirect at the attribute level whereas aliases, such as the alias 902 shown in FIG. 9B, redirect at the entry level, according to an embodiment of the invention.

The variant entry 1002 is an entry in the DIT 1000 which has no requirement for instantiated attributes, other than the "objectclass" attribute, according to an embodiment of the invention. The associated "objectclass" definition is marked as "variant" and includes a number of attributes. The membership of a variant objectclass signals that a rule should be accessed in processing one or more attributes of the entry. For example, as shown in FIG. 10A, an objectclass attribute value "Variant" signals that the attributes "My Company Contact," and "Company X Contact," have a rule for deriving their values from other attributes (the "real" attributes) in other entries (the "concrete" entries) in the DIT 1000, such as the entry 504c. So, for example, in the variant entry 1002, the value for the "My Company Contact" attribute is found in the "Address, Contact, and Website" attributes of the entry 504c.

In various embodiments of the invention, a Variant Creation Module 1005 may be active at the initial provisioning. Thus, the variants may be provisioned alongside the data that are referenced by the variants. The Variant Creation Module 1005 may also create the variants on the fly, as needed, some time after the initial provisioning, according to an embodiment of the invention.

A given variant (e.g., the Variant 1002) may be instantiated in the DIT 1000 using a Variant Creation Module 1005, according to an embodiment of the invention. For instance, as shown in FIG. 10A, the Variant Creation Module 1005 may create the Variant 1002 such that it is a member of a variant objectclass that includes a "my company contact" attribute and a "company X contact" attribute, with the "my company contact" attribute receiving its data from the entry 504c whose attributes are "address", "contact," and "website," and the "company x contact" attribute receiving its data from the entry 504d whose attributes are "address", "contact," and "website." The Variant Creation Module 1005 may provide a user interface so that variants may be created on the fly to enable the rapid deployment of new variants. Alternatively, the Variant Creation Module 1005 may be invoked via a conventional directory addEntry operation, for example, over LDAP or DAP.

Once the Variant Creation Module 1005 has created the variant 1002 in the DIT 1000, then requests for the attributes of the variant 1002 can be transparently provided to the requesting entities requesting the data represented by these attributes, according to an embodiment of the invention. Suppose, for example, that a requesting entity requests the data for the address attribute of "My Company Contact," because the variant objectclass defines the address attribute for "My Company Contact" to be the address attribute of the entry 504c, then this is the data that the variant 1002 returns to the requesting entity.

Figure 10B:
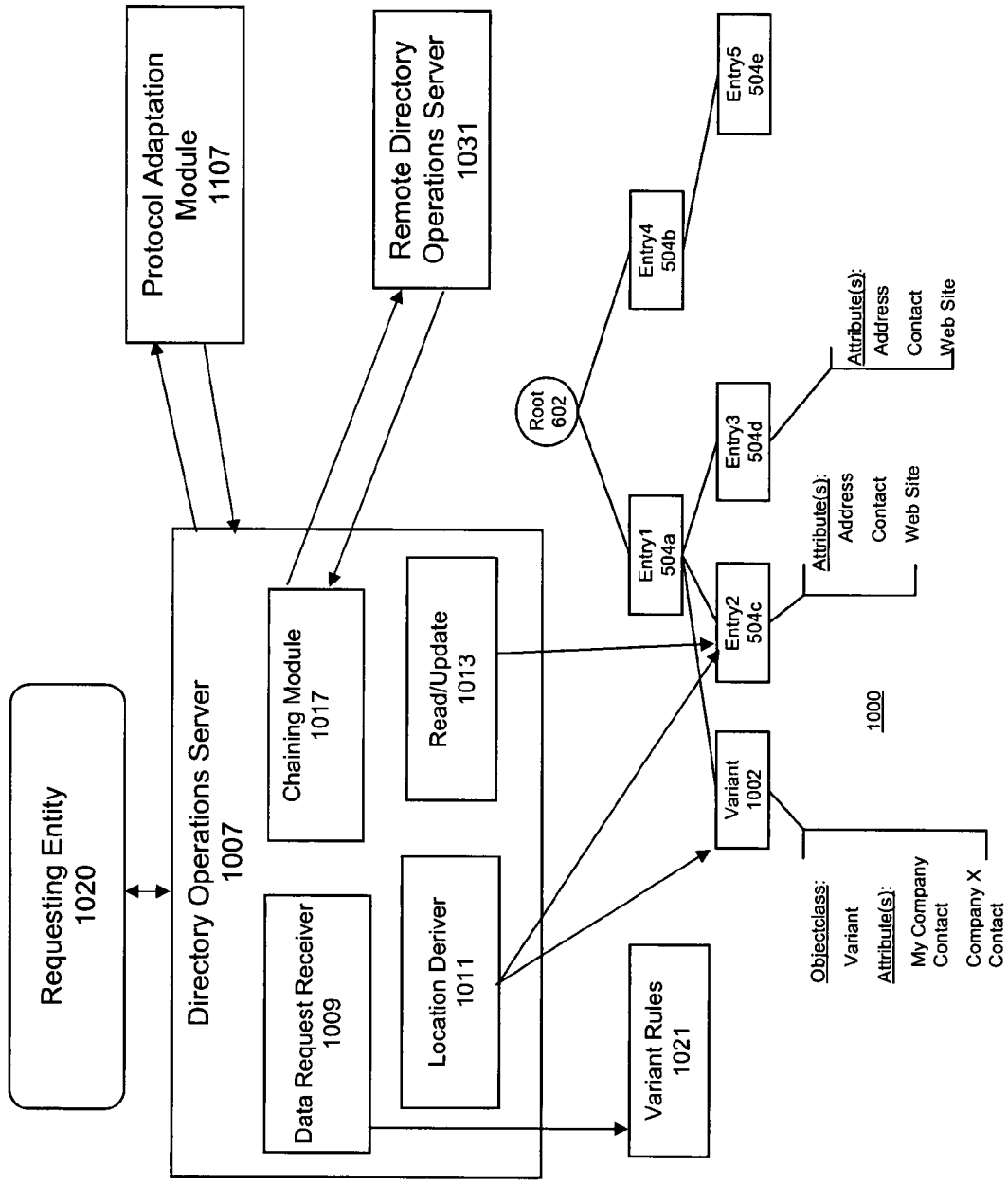
FIG. 10B illustrates a variant processing in the DIT 1000 including the Variant 1002 of a data request from a Requesting Entity 1020, according to an embodiment of the invention.

FIG. 10B illustrates a variant processing in the DIT 1000 including the Variant 1002 of a data request from a Requesting Entity 1020, such as a client application, according to an embodiment of the invention. The Requesting Entity 1020 could represent an entity such as a client application, an end user, or a remote DSA that may be need data to complete a chaining procedure initiated on a portion of the directory under that DSA's control.

The Directory Operations Server 1007 represents an entity configured to receive data requests and then provide them to appropriate processing units associated with a Directory Server so that the requested operation may be completed, according to an embodiment of the invention. For example, an LDAP server represents a typical directory operations server, such as the Directory Operations Server 1007. The Directory Operations Server 1007 is located in close access proximity (e.g., co-located) with a data storage mechanism hosting the data for the DIT 1000. Thus, processing of a variant entry (e.g., the attribute value derivation), such as the variant 1002, can be performed at the point of access to/from the underlying data storage mechanism. For example, processing a variant entry at the Directory Operations Server 1007 may occur at a directory system agent, such as the DSA 702 shown in FIG. 7A, where the data is actually stored. The protocol layers, such as X.500, for example, do not need to be aware of the presence or existence of the variant entries. This variant processing may provide improved performance in demanding real-time environments, such as the Mobile Telecommunications System 204, but such improved performance may require the variant and its concrete entries to be collocated within the same DSA, according to an embodiment of the invention.

A Data Request Receiver 1009 is configured to receive the data request from the Requesting Entity 1020, according to an embodiment of the invention. For example, assume that the Data Request Receiver 1009 receives a request for data associated with the Variant 1002. The Data Request Receiver 1009 determines that the Variant 1002 includes the objectclass "Variant". Accordingly, the Data Request Receiver 1009 then identifies applicable rules for the "variant" objectclass. The Data Request Receiver 1009 may find these rules in the Variant 1002 and/or in a Variant Rules file 1009.

The Data Request Receiver 1009 provides a location for the Variant 1002 along with the applicable rules for variant processing to a Location Deriver 1011. The Location Deriver 1011 then derives a location for the requested data within the data storage mechanism using the applicable rules for deriving the location for the data, according to an embodiment of the invention. For example, in deriving a location for the "My Company Contact" attribute of the Variant 1002, the Location Deriver 1011 would find a rule clarifying that this data may be retrieved from the "Address," "Contact," and "Web Site" attributes stored for the entry found at Root.Entry1.Entry2. Similarly, in deriving a location for the "Company X Contact," the Location Deriver 1011 would find a rule specifying that this data may be retrieved from the "Address," "Contact," and "Web Site" attributes stored for the entry found at Root.Entry1.Entry3.

The rules applied by the Location Deriver 1011 for deriving the DN of a concrete entry in the DIT 1000 may include variable data extracted from the DN of an original variant entry, such as the variant entry 1002, according to an embodiment of the invention. For example, assume the entry 504a has a DN "c=UK", the entry 504c has a DN "o=MyCompany, c=UK" and the entry 504d has a DN "o=CompanyX, c=UK". The variant entry 1002 has a DN "varianto=MyCompany, c=UK". The DN rule for the concrete entry is "o=valueof (varianto), c=UK". Since the value of "varianto" is "CompanyX", the concrete entry has DN "o=MyCompany, c=UK"—in other words, its value is found at entry 504c.

The Location Deriver 1011 would then provide the derived locations to a Data Read/Update Module 1013 that would then carry out the requested procedure on the data held by the data storage mechanism, according to an embodiment of the invention. The Data Read/Update Module 1013 applies any operative rules (e.g., value mappings) related to the data (e.g., its format) in carrying out its tasks. For attributes in a variant objectclass (e.g., the "My Company Contact" attribute of Variant 1002), there are real attribute(s) in a concrete entry (e.g., the "Address," "Contact," "Web Site" attributes of the Entry2) which contain the derived attribute values, subject to a value mapping or function, according to an embodiment of the invention. For example, the Data Read/Update Module 1013 might apply a value mapping rule that changes an integer value from an attribute taken from a real attribute into a real value for an attribute in a variant entry, e.g., from "1" to "1.0". The Data Read/Update Module 1013 might apply a function, for example, to an attribute taken from a real attribute to an attribute in a variant entry, e.g., 12 might be added to a time to convert its format from the expected US time ("1 p.m.") to the expected European format ("1300"). The Read/Update Module 1013 provides information regarding its actions that may be reported back to the Requesting Entity 1020, according to an embodiment of the invention. Moreover, as previously mentioned, reports may be structured so that the actual nature of the DIT 1000 is transparent (e.g., hidden) from the Requesting Entity 1020, according to an embodiment of the invention.

The Location Deriver 1011 may determine for a given data request that some portion of the data for a variant resides on a remote directory. Accordingly, the Location Deriver 1011 forwards that portion of the data request to a Chaining Module 1017 that interacts with a Remote Directory Operations Server 1031 to access the requested data. The Remote Directory Operations Server 1031, like the Directory Operations Server 1007 has been configured to handle operations for variant entries, according to an embodiment of the invention.

In an alternative embodiment, the Location Deriver 1011 may decompose a directory search operation on a variant into one or more directory search operations on the associated concrete entries. These derived operations are chained by the Chaining Module 1017 either to a Remote Directory Operations Server 1031 or to the same Directory Operations Server 1007, for processing as normal directory operations. The chained results are subsequently used by the Data Read/Update Module 1013 to create the outgoing results. For example, an incoming base search on base entry variant 1002 (all user attributes), would be decomposed into two base searches, one on entry 504c, and one on entry 504d. The attribute values contained in the results of these two searches are used by the Data Read/Update Module 1013 to derive the attribute values returned in the outgoing result. The Location Deriver 1011 may likewise decompose a directory update operation on a variant into one or more directory update operations on the associated concrete entries, and onward chain them, according to an embodiment of the invention.

In another alternative embodiment, this decomposition procedure can be handled by a Location Deriver as part of Protocol Adaptation, which is discussed hereinbelow. A Protocol Adaptation Module 1107, which is discussed further in FIG. 11A may operate with variant processing, according to an embodiment of the invention. Protocol Adaptation is an optional for variant processing, according to an embodiment of the invention.

The concept of variant entries can be extended so that the variant entry 1002 can contain a mixture of real attribute values and derived attribute values, according to an embodiment of the invention. This might be as a result of a mixture of real and variant objectclasses for which the entry is a member, or because a single object class can have a mixture of real and derived attributes. Furthermore, a single attribute might have real values stored in the variant entry 1002 as well as values derived from other concrete entries. For example, variant entry 1002 might have an extra real attribute "Alternative Contact" and this attribute might itself hold the actual data for an alternative contact. In this case, the Location Deriver 1011 would simply provide this particular location to the Data Read/Update Module 1013.

Further embodiments of the invention allow extension of various rules associated with variant processing. For example, the variant objectclass rules for deriving the names of the concrete entries from which to extract attribute values, the rules for identifying the attributes within the concrete entries, and the rules for identifying the mapping of the attribute values from the concrete entries can each be extended to include items such as:

The use of real attribute values within the variant entry 1002, and/or

The use of contextual information, such as time of day and requesting user, and/or Alternative rules held themselves as real attribute values within the variant entry For example, in terms of contextual information, a variant could be implemented to reflect an "office persona" and an "evening persona" for a subscriber, such that at certain times of the day, the Location Deriver 1011 when accessing the variant would locate certain attributes from one set of data while at other times of the day, the Location Deriver 1011 when accessing the variant would locate the data from another location. Alternative rules, for example, may include a fixed rule for one particular instance of a variant.

Variant entries, such as the variant 1002, can simplify updating data in the DIT 1000. For example, because the address attribute of the "My Company Contact" is the address attribute of the data entry 504c, then updating the address entry for both the "My Company Contact," and the data entry 504c is as simple as updating the address entry for the data entry 504c. The simplicity of this approach can be seen if one imagines that the DIT 1000 contains not just the one variant 1002 but dozens of variant entries, each possibly associated with a different requesting entity, but all pointing to the data entry 504c.

In some embodiments of the invention, variants enable design of the data hierarchy in the manner suitable for modeling a business structure but without requiring consideration of the specific needs of particular requesting entities, such as the HLR 307, the HSS 301, and the like. In this approach, variants entries may be added for each of the requesting entities once the data hierarchy is established. The variant entries group the attributes needed by the requesting entity into a simple entry or into a simple hierarchy of entries. Thus, the requesting entities require no special knowledge of the data hierarchy where the attributes are actually located. The variant, such as the variant 1002, thus provides the mapping from the attribute which the requesting entity requires to the actual location of the attribute in the data hierarchy.

Adaptation—Protocol Adaptation

Figure 11A:
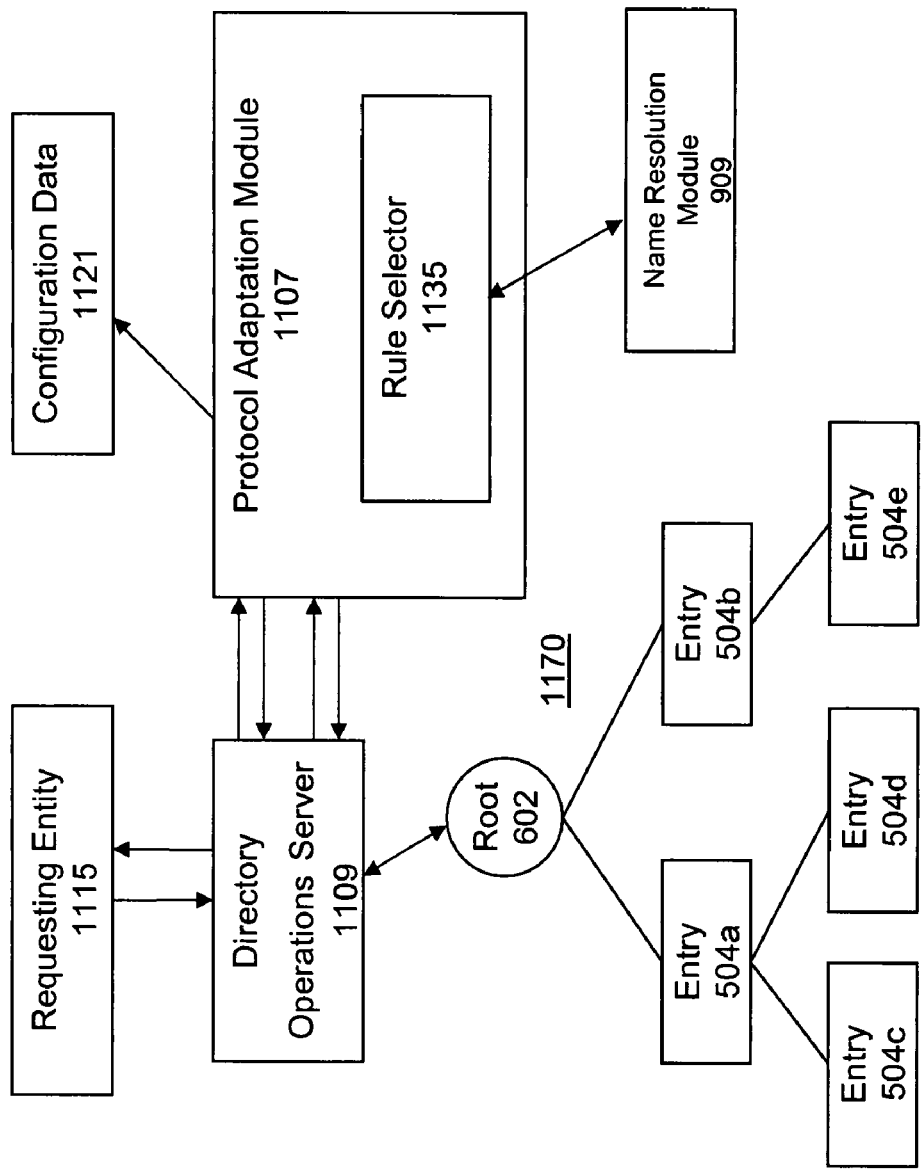
FIG. 11A illustrates a Protocol Adaptation Module 1107, according to an embodiment of the invention.

FIG. 11A illustrates a Protocol Adaptation Module 1107, according to an embodiment of the invention. The Protocol Adaptation Module 1107 may provide non-standard processing of directory operations, such as LDAP or DAP.

Requests for data in a directory may arise from a variety of sources. For example, data accesses may come from a client application, an end user, or even a directory system agent, such as the DSA 702 shown in FIG. 7A. Accordingly, Requesting Entity 1115 could represent an entity such as a client application, an end user, or a remote DSA that may be need data to complete a chaining procedure initiated on a portion of the directory under that DSA's control, according to an embodiment of the invention. In any event, the Requesting Entity 1115 sends a data request to a Directory Operations Server 1109. The Directory Operations Server 1109 represents an entity configured to receive data requests and then provide them to appropriate processing units associated with a directory server so that the requested operation may be completed, according to an embodiment of the invention. For example, an LDAP server would represent a directory operations server, such as the Directory Operations Server 1109.

The Protocol Adaptation Module 1107 reviews incoming operations to the Directory Operations Server 1109, according to an embodiment of the invention. In the Protocol Adaptation Module 1107, an incoming operation is mapped to zero, one, or more ongoing operations. The Protocol Adaptation Module 1107 subsequently merges the results of each of the mapped operations into a single result so that they may be returned to the originating Requesting Entity 1115. A Rule Selector 1135 in the Protocol Adaptation Module 1107 selects a set of rules (the rule set) which provides instructions for the mapping of the incoming operation and outgoing results, according to an embodiment of the invention. The Rule Selector 1135 derives the rule set using zero, one or more of fields of the incoming operation, such as "type of operation," and "entry name in operation," according to an embodiment of the invention. The Rule Selector 1135 may find the set of putative rules from which to select the rule set in Configuration Data 1121, as well as in the directory, according to an embodiment of the invention.

The Rule Selector 1135 may use any field, or combination of fields, in the incoming operation to identify the pertinent rule set, according to an embodiment of the invention. In addition, the originating user (e.g., the Requesting Entity 1115) can be used in the rule selection process, as can other contextual data, such as time of day. The Rule Selector 1135 may also use current "working" data related to the data request itself as part of the rule selection process, such as when the adaptation process takes place after the processing of the incoming operation has commenced. For example, the content of dereferenced aliases may be used in rule selection if the protocol adaptation takes place after name resolution. Accordingly, the Rule Selector 1135 may operate in conjunction with the Name Resolution Module 909 shown in FIG. 9B, according to an embodiment of the invention. Although not shown in FIG. 11A, the Protocol Adaptation Module 1107 may be configured to operate with other functionality, such as the components associated with alias hiding as shown in FIG. 9B, according to an embodiment of the invention.

All such data that can be used in the rule selection process is termed the rule selection data. The selection of a rule set typically involves matching the rule selection data against value assertions in the putative rules, either involving single values or in logical combinations, such as "AND" and "OR". The value assertions may be simple equalities or inequalities, or may involve other criteria such as "best match" across a number of putative rules. For example, if a rule is to be selected by the entry name in the incoming operation, the rule selected by the Rule Selector 1135 might be that in which the maximum number of ordered RDNs match that of the name in the incoming operation—in other words the longest name prefix match. The value assertions may also include variable or wildcarding rules, and are extensible, to allow new assertion types to be added when required, according to an embodiment of the invention. For example, if matching an RDN, the assertion may be constructed such that only the attribute type needs to match, with any value of the attribute providing a match.

The rule set selected by the Rule Selector 1135 specifies the set of ongoing operation(s) performed under the control of the Protocol Adaptation Module 1107, according to an embodiment of the invention. The rule set may also specify results or errors to be immediately returned to the Requesting Entity 1115 and/or a set of actions such as "log the operation". The ongoing operations can be either processed sequentially or in parallel. In the case of sequential processing, the results of one operation can be used by the Protocol Adaptation Module 1107 as inputs for a subsequent operation, such as in the example shown in FIG. 11B below. The fields of the ongoing operations can be populated by the Protocol Adaptation Module 1107 with a combination of variable data extracted from any field in the incoming operation, optionally subject to a mapping, and/or any other rule selection data, and/or fixed data provided by the selected rules, according to an embodiment of the invention. Likewise, the Protocol Adaptation Module may populate the fields of the outgoing result with a combination of variable data extracted from any field in the results(s), optionally subject to a mapping, and fixed data provided by the selected rules.

Figure 11B:
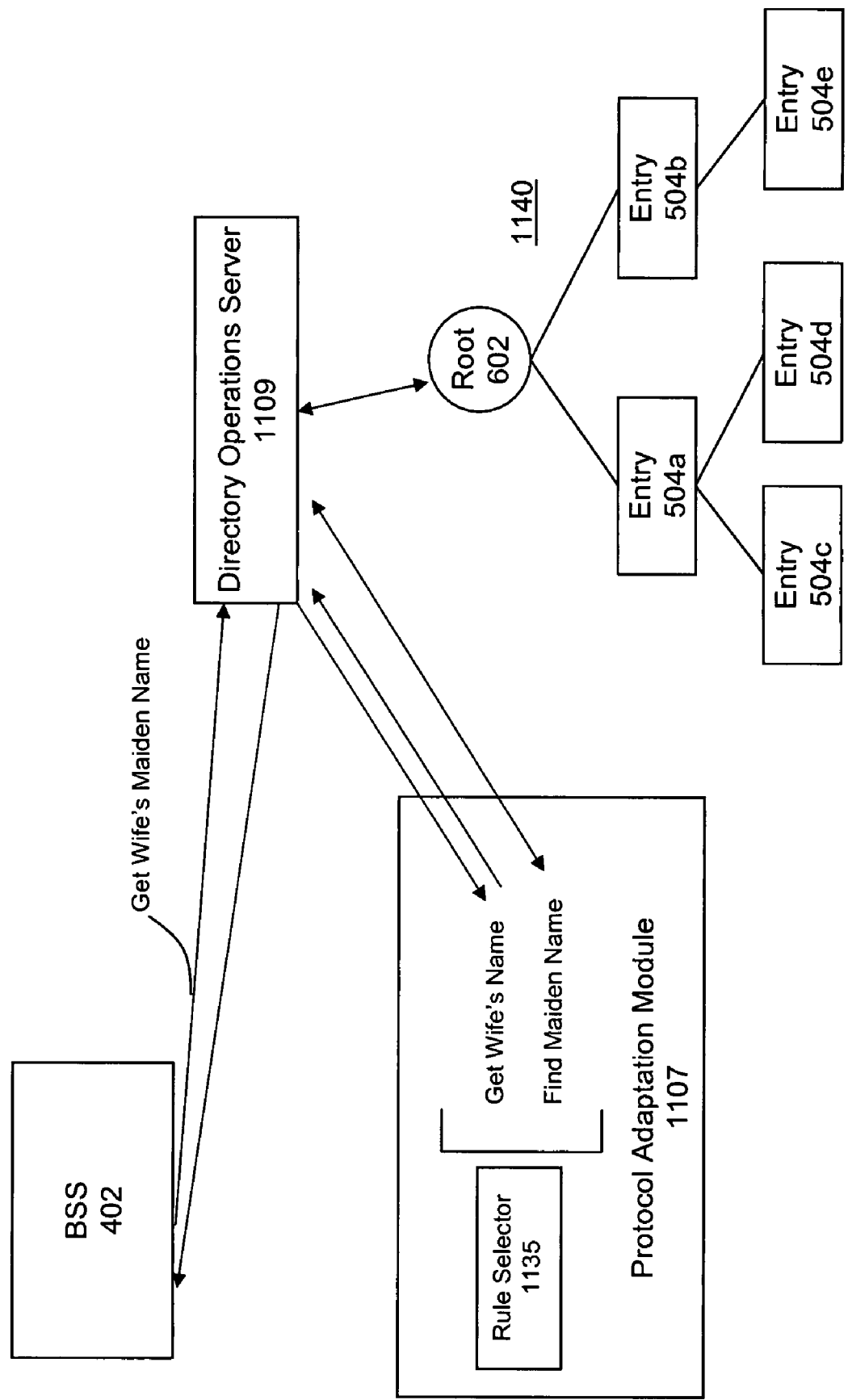
FIG. 11B illustrates an example of a serial or sequential processing of protocol adaptation, according an embodiment of the invention.

FIG. 11B illustrates an example of a serial or sequential processing of protocol adaptation, according an embodiment of the invention. A BSS 402 sends a request for the maiden name of a subscriber's wife. Here, the BSS 402 is acting as the Requesting Entity 1115 shown in FIG. 11A. The Rule Selector 1135 associated with the Protocol Adaptation Module 1107 reviews the incoming operation ("Get Wife's Maiden Name") received by the Directory Operations Server 1109 and identifies a rule that specifies two ongoing operations. The first ongoing operation, "Get Wife's Name," retrieves the name of the subscriber's wife, e.g., "Becky Jones." The results of the first ongoing operation provide data for the second ongoing operation, "Find Maiden Name," which retrieves the maiden name for "Becky Jones." The Protocol Adaptation Module 1107 assists the Directory Operations Server 1109 in returning the answer "Becky Romanov" to the BSS 402. Using this approach, the BSS 402 does not know, or need to know, all the steps that have been taken by the Protocol Adaptation Module 1107 in responding to the request.

The Protocol Adaptation Module 1107 may be configured to operate at various stages within the scope of the processing taken under the direction of the Directory Operations Server 1109. Thus, for example, protocol adaptation might take place after name resolution processing, such as that provided by the Name Resolution Module 909 shown in FIG. 9B, but before search/update processing, such as that provided by the Search/Update Module 911 shown in FIG. 9B.

Since the Requesting Entity 1115 might be a remote DSA, the Protocol Adaptation Module 1107 may process chained operations, providing fully distributed protocol adaptation, according to an embodiment of the invention. Performing protocol adaptation on chained operations implies multiple levels of such adaptation—in other words, a possible additional adaptation pass for each chaining step.

The Protocol Adaptation Module 1107 may be configured to interoperate with variants, such as the Variant 1002 shown in FIG. 10. Thus, for example, a variant entry might be involved in protocol adapted operations, as indicated by the presence of the Protocol Adaptation Module 1107 in FIG. 10B, according to an embodiment of the invention.

As shown in FIG. 11A, the Protocol Adaptation Module 1107 acts as an adjunct module to the Directory Operations Server 1109, according to an embodiment of the invention. In this embodiment, the Protocol Adaptation Module 1107 resides on a server in close access/physical proximity to the Directory Operations Server 1109. In some embodiments, the Protocol Adaptation Module 1107 might even reside on the same machine (e.g., server computer) hosting the Directory Operations Server 1109. This "adjunct module" embodiment may offer improved performance, especially in certain demanding real-time environments, over an embodiment in which the Protocol Adaptation Module 1107 acts as a virtual directory operations server, such as the embodiment shown in FIG. 11C.

Figure 11C:
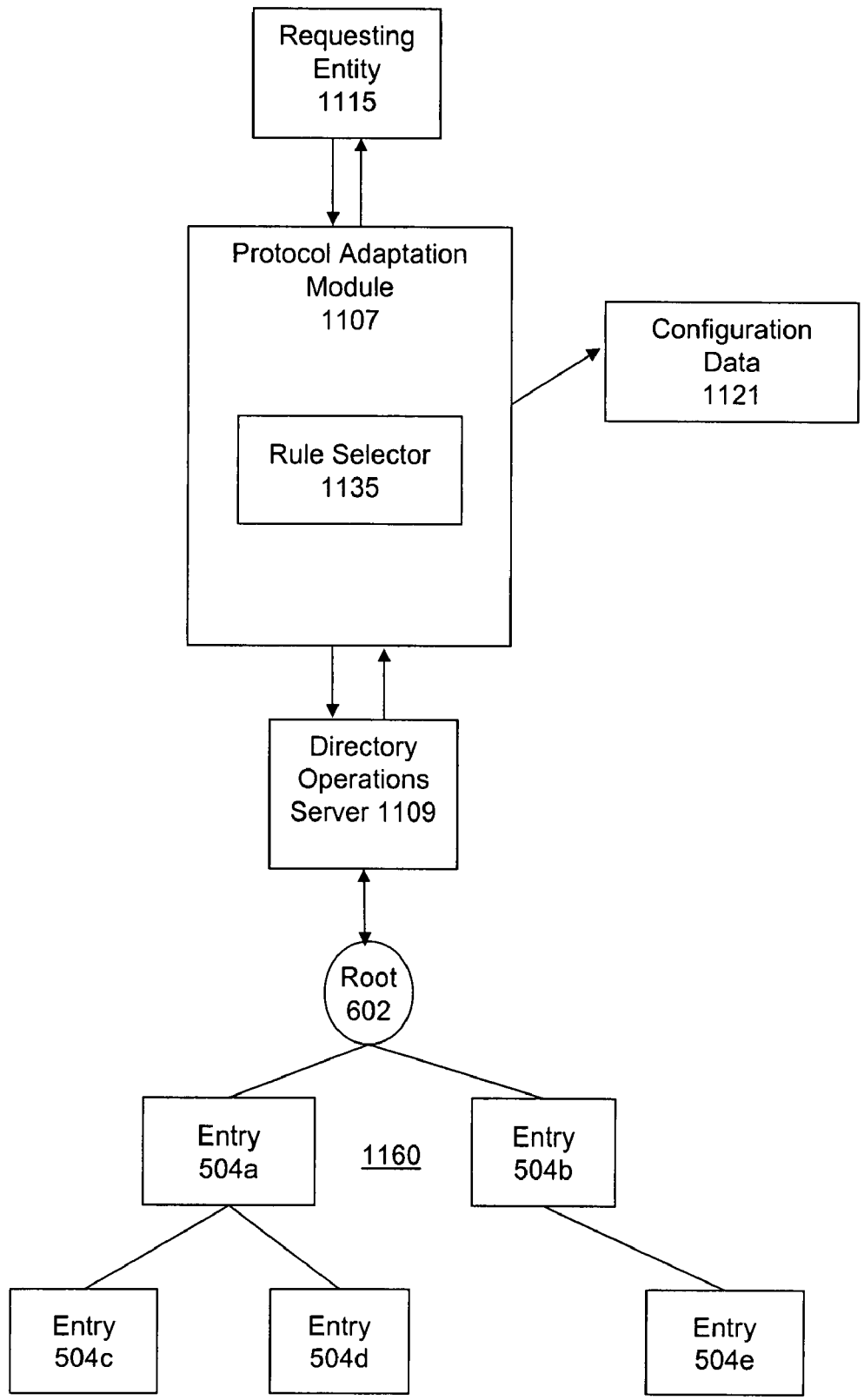
FIG. 11C illustrates a Protocol Adaptation Module 1107 essentially acting as a virtual directory server (or LDAP/DAP proxy server), sending communications (e.g., LDAP or DAP operations) to a Directory Operations Server 1109, such as the DS 706a shown in FIG. 7A, according to an alternative embodiment of the invention.

In an alternative embodiment of the invention shown in FIG. 11C, the Protocol Adaptation Module 1107 essentially acts as a virtual directory server (or LDAP/DAP proxy server), sending communications (e.g., LDAP or DAP operations) to the Directory Operations Server 1109, such as the DS 706a shown in FIG. 7A. In this embodiment, the Protocol Adaptation Module 1107 provides modified requests to the Directory Operations Server 1109 for processing in the directory represented by a DIT 1160. Thus, the Protocol Adaptation Module 1107 reviews all incoming operations to the Directory Operations Server 1109, according to an embodiment of the invention. The Rule Selector 1135 maps an incoming operation to zero, one, or more ongoing operations. The Protocol Adaptation Module 1107 subsequently merges the results of each of the mapped operations into a single result and sends it back to the originating Requesting Entity 1115. The rules for mapping of the incoming operation and outgoing result are selected by one or more of fields of the incoming operation, such as "type of operation," and "entry name in operation," according to an embodiment of the invention. The rules for mapping the incoming operation and outgoing result may also be stored in the Configuration Data 1121. In this embodiment, rule selection data is limited to the external representation of the content of the DIT 1160, e.g., the LDAP message, and the protocol adaptation takes place before and/or after the processing of the Directory Operations Server 1109.

Adaptation—Name Adaptation

Figure 11D:
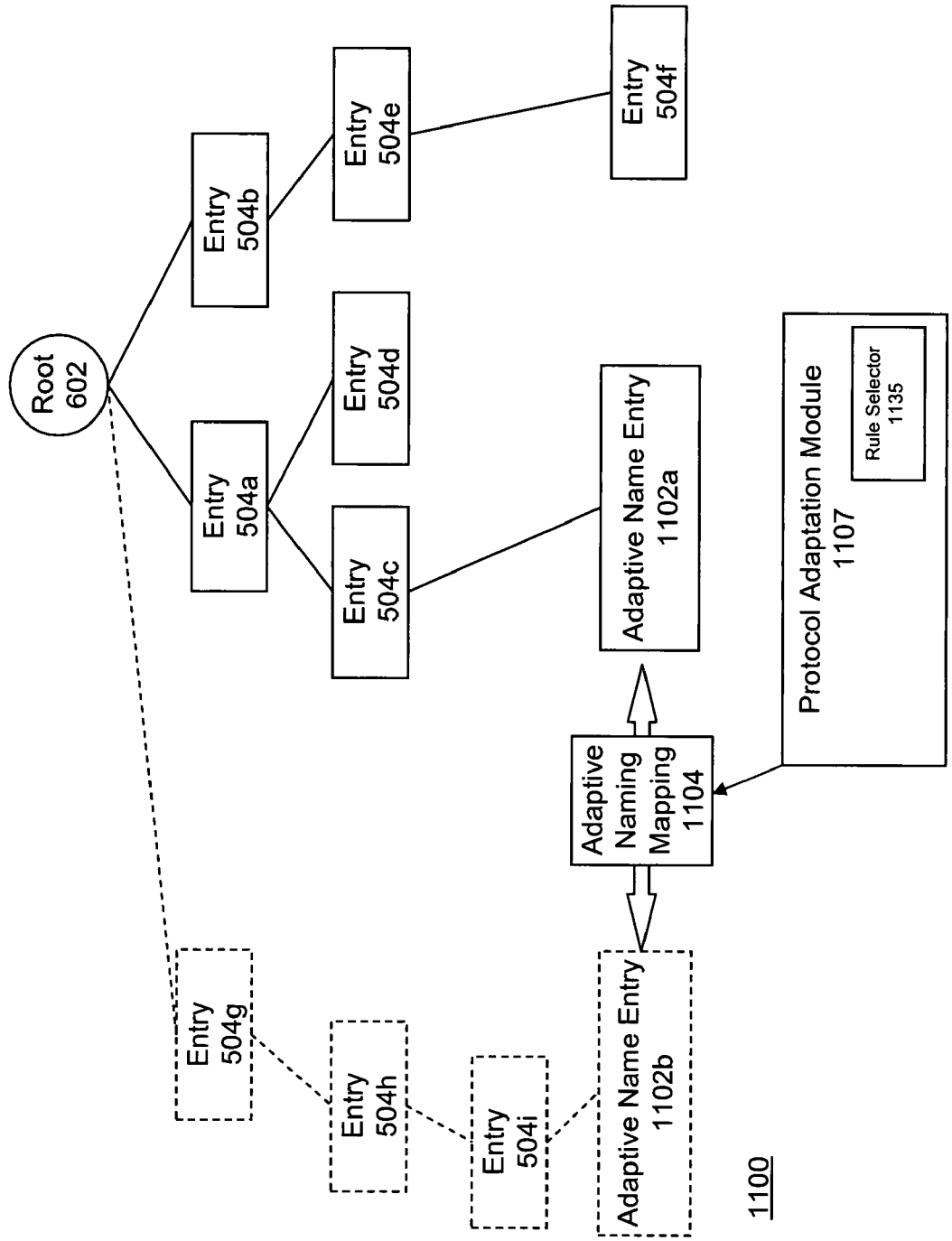
FIG. 11D depicts a DIT 1100 having an adaptive naming configuration provided by protocol adaptation, according to an embodiment of the invention.

FIG. 11D depicts a DIT 1100 having an adaptive naming configuration provided by protocol adaptation, according to an embodiment of the invention. The DIT 1100 includes one or more entries, such as entries 504a-504f and so forth, virtual entries 504g-504i, and the root node 602. The DIT 1100 also includes an entry, labeled Adaptive Name Entry 1102a, which is a real entry, like entries 504a-504f, that is subject to a mapping to a virtual entry, labeled Adaptive Name Entry 1102b.

Adaptive naming provides another mechanism for alternative names for entries in the DIT 1100. However, unlike aliases and variants, adaptive names are not directory entries themselves. Adaptive naming is implemented through configuration data, e.g., the Configuration Data 1121. The Rule Selector 1135 in the Protocol Adaptation Module 1107 uses the rule selection data and the Configuration Data 1121 to identify a set of adaptive name mappings 1104 between alternative names and their "real" name equivalent, according to an embodiment of the invention. In the case of searches, a search of wide scope with a filter may be adapted to a search of much more narrow scope, if the filter criteria can be adapted into part of the base name of the search; for example, to take advantage of aliases that may exist, but for which the Requesting Entity 1115 is not aware. A search with a complex filter comprising a number of "or" clauses might be adapted to a number of searches, one for each of the "or" alternatives, according to an embodiment of the invention.

During data retrieval and other operations, the use of adaptive naming may be transparent to the requesting entity (e.g., the client application) who used the name, according to an embodiment of the invention. Thus, the requesting entity (e.g., the Requesting Entity 1115) uses what it believes to be the real name and receives back the information requested. For example, assume the DN of the entry 1102a is "employeeId=112, o=MyCompany, c=UK" and assume further that an adaptive name entry exists between 1102a and 1102b. Finally, suppose the requesting entity accesses data in entry 1102b using what it believes to be the appropriate name, e.g., "employeeId=112, area=employeeAdmin, o=AnotherCompany, c=DE", because of the adaptive mapping between 1102a and 1102b, the same data will be retrieved. Thus, the name for 1102b is an alternative name for the data in 1102a.

Adaptation—Attribute Adaptation

Figure 11E:
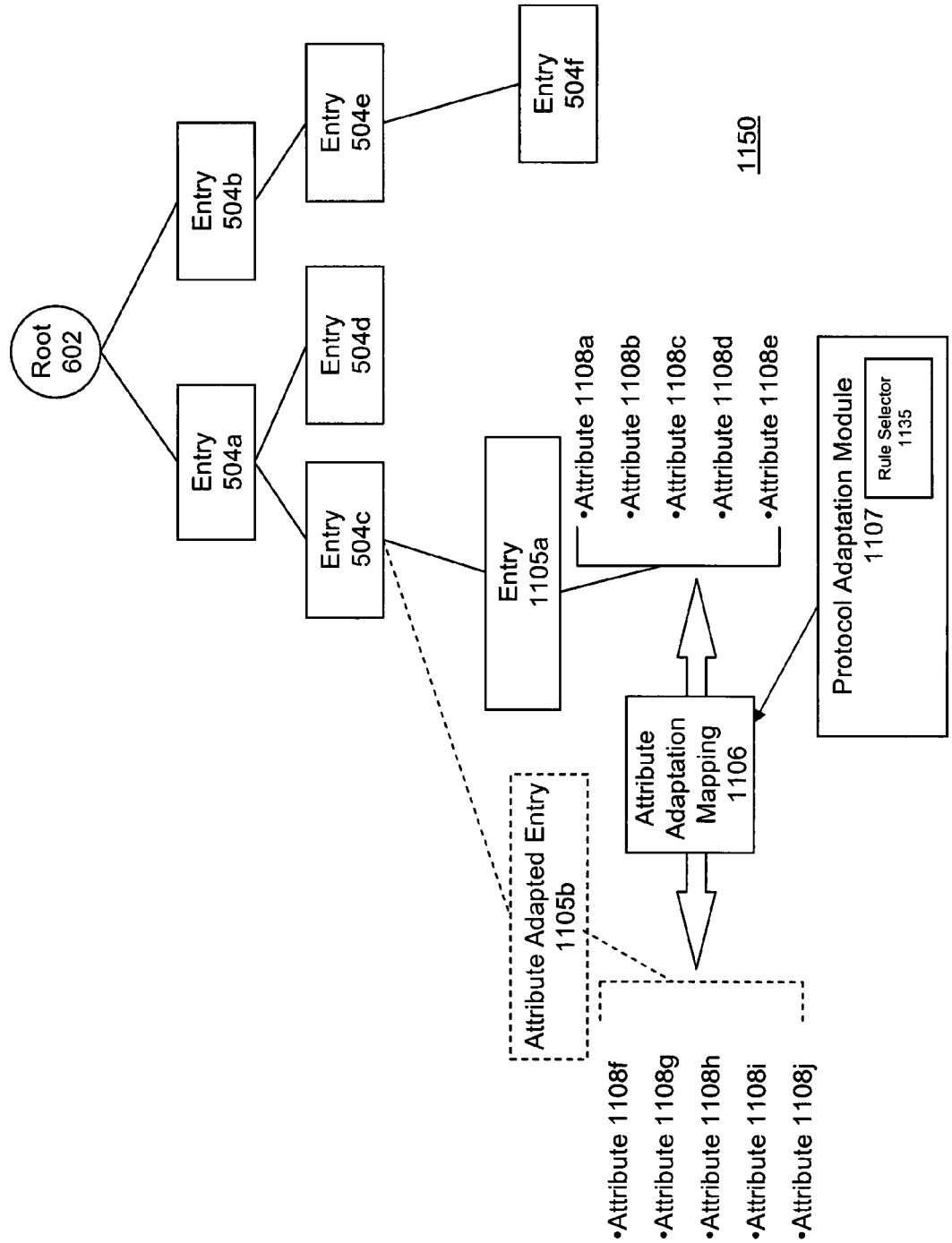
FIG. 11E depicts a DIT 1150 having an attribute adaptation provided by protocol adaptation, according to an embodiment of the invention.

FIG. 11E depicts a DIT 1150 having an attribute adaptation provided by protocol adaptation, according to an embodiment of the invention. The DIT 1150 includes one or more entries, such as entries 504a-504f and so forth, and the root node 602. The DIT 1150 also includes an entry 1105a having real attributes 1108a-1108e that is subject to a mapping to a virtual attribute adapted entry 1105b having virtual attributes 1108f-1108j.

The real entry 1105a includes one or more attributes, such as the attributes 1108a-1108e and the attribute adapted entry 1102b includes one or more attributes, such as the attributes 1108f-1108j and so forth. In an embodiment of the invention, the one or more attributes 1108a to 1108e of the entry 1105a comprise data, such as, for example, subscriber data like "forename," "surname," "address," "county," and "post code." Similarly, the one or more attributes 1108f to 1108j of the attribute adapted entry 1105b comprise data, such as, for example, any of "first name," "last name," "address," "state," "zip code," and the like.

Attribute adaptation provides alternative names and/or values for attributes, such as the attributes 1108a-1108e. In an embodiment of the invention, the Rule Selector 1135 in the Protocol Adaptation Module 1107 identifies the attribute adaptation mapping 1106 between various attributes using the Configuration Data 1121. For example, the Configuration Data 1121 instructs the Protocol Adaptation Module 1107 to perform a set of mappings from the attribute name 1108a to the alternative attribute name 1108f. In various embodiments of the invention, when a requesting entity (e.g., a client application) executes an operation that relates to an attribute having an attribute mapping, the attribute mappings translate the attribute names, such as the attributes 1108a-1108e and the values understood by the application to the appropriate attribute names and values understood by the DIT 1150. For example, assume the attribute 1108a has the format "real" and assume that its value is "1.0." Assume further that adapted attribute 1108f has the format "integer" and assume that 1108f has been adapted to attribute 1108a. If the application associated with 1108f performs a read request for 1108f, then the application expects to have the integer "1" returned and not the real "1.0". Because of the attribute adaptation performed by the attribute adaptation module 1107, the requesting entity accessing the adapted attribute 1108f receives the data in the expected integer format.

In an embodiment of the invention, when attribute adaptation is implemented in conjunction with adaptive naming, the combination provides a facility for not only using alternative names for an entry but also for translating the names and/or the values of the attributes of the entry as well. Further, in some embodiments of the invention, adaptive naming and attribute adaptation can be combined to achieve application independence from an underlying database structure. Adaptive naming and attribute adaptation enable one to design and name the core entities in a data repository considering the immediate needs of the core business over other considerations, such as the needs of a legacy application, according to an embodiment of the invention. Subsequently, adaptive names and attribute mappings may be added to provide complete alternative naming hierarchies with respect to particular applications, such as the HLR 307, the HSS 301, and so forth. These alternative hierarchies may use a different DN as well as alternative attribute names to refer to the core database entries. The Data Repository 404 with the DIB 500 translates the application requests using defined mappings to the DIB 500 entries and attributes name. The mappings may be defined on a per-application basis (or the DIB 500 subscriber basis), according to an embodiment of the invention. When more than one application requires different naming hierarchies, then each of these applications can connect with a different subscriber name with the appropriate mappings defined, in an embodiment of the invention.

Simplified Access Control for Subtrees

Figure 12:
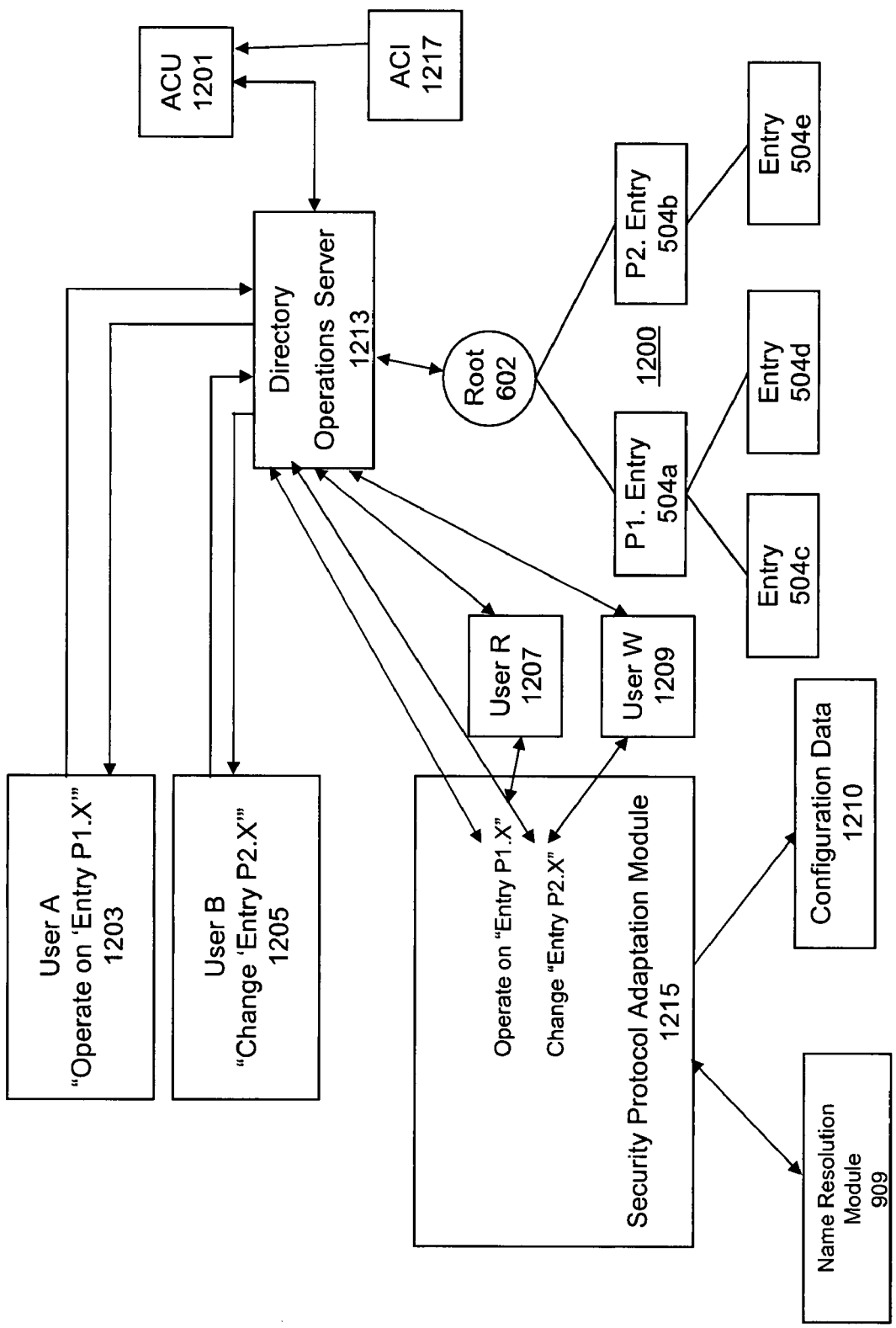
FIG. 12 illustrates an Access Control (AC) system implemented using a form of protocol adaptation, according to an embodiment of the invention.

FIG. 12 illustrates an Access Control (AC) system implemented using a form of protocol adaptation, according to an embodiment of the invention.

AC systems are typically a part of communication protocols employed in networks (e.g., an LDAP-compliant communication network) and might be implemented as an Access Control Unit (ACU) 1201. ACUs typically include various permission modules, such as a subscriber permission module, an authentication module, and a precedence module. An ACU then combines various permissions files to form a consistent and useful set of permissions. An ACU may group multiple permissions together to create a set of permissions for several different groups/users. For example, in the X.500 protocol, a conventional ACU provides flexible access control schemes, which allow very fine grained access control down to the individual entry level or that can be applied to subtrees of the directory, such as the directory 600 shown in FIG. 6. Such conventional access control schemes, whilst flexible, can result in considerable administrative overhead in maintaining the data controlling the ACU (the Access Control Information (ACI) 1217), and also considerable processing overhead by the ACU when applying the access control at runtime. This is particularly troublesome for a directory comprising many millions of entries, which might have to be individually administered for access control, and where those entries are to be accessed in real time. The large administrative overhead also has security implications in that the more complex the scheme to administer, the more likely it is that it contains errors, and hence potential security lapses.

In various embodiments of the invention, a directory server, such as the DS 706a, in order to make an access control decision for a given data request, may require information, such as the user name, authentication level, the operation being performed and the ACI 1217 associated with a target entry and its attributes.

In an embodiment of the invention, an administrative area per DSA, such as the DSA 702 shown in FIG. 7A, provides schema-level access control, so that the ACI 1217 is configured on an objectclass and attribute type basis, rather than on individual directory entries, and applies to all entries administered by that DSA. Such schema level access control is easier to administer and validate for correctness, and can be optimized for real-time access. In an embodiment of the invention, the administrative area employs a multi-tenancy approach for access control. Thus, each "tenant" (e.g., client application) is allocated one or more subtrees within the administrative area, and has access only to the entries within those subtrees, even though the entries share common object classes and attribute types with entries in other subtrees, and therefore share the ACI 1217.

The ACU 1201 is configured to make access control decisions on behalf of a Directory Operations Server 1213 when processing directory operations received from requesting entities, such as client applications, end users, and other DSA's attempting to complete a chaining operation, according to an embodiment of the invention. For example, a UserA 1203 may request an operation on an entry 504*c* while a User B 1205 may request a change to an entry 504*e*. The Directory Operations server 1213, like the Directory Operations Server 1109 shown in FIG. 11A and FIG. 11C, represents an entity configured to receive data requests and then provide them to appropriate processing units associated with a directory server so that the requested operation may be completed, according to an embodiment of the invention. For example, an LDAP server would represent a directory operations server, such as the Directory Operations Server 1213. The Directory Operations Server 1213 uses the ACU 1201 to make decisions about whether all, part, or none of the requested operation is allowed to proceed, and likewise all, part, or none of the results are allowed to be returned to the originator, according to an embodiment of the invention.

A Security Protocol Adaptation Module 1215 reviews incoming operations to the Directory Operations Server 1213, according to an embodiment of the invention. The Security Protocol Adaptation Module 1215 operates in a manner similar to that of the Protocol Adaptation Module 1107 shown in FIG. 11A and FIG. 11C. Like the Protocol Adaptation Module 1107, the Security Protocol Adaptation Module 1215 may modify incoming directory operations according to one or more selected rules (the rule set). The Security Protocol Adaptation module is configured to operate prior to the interaction between the Directory Operations Server 1213 and the ACU 1201. Note that the use of the Security Protocol Adaptation Module 1215 does not preclude the use of the Protocol Adaptation Module 1107 at the same or different processing steps of the incoming operations. Similarly, a Protocol Adaptation Module 1107 might be configured to offer a superset of the functionality offered by the Security Protocol Adaptation Module 1215.

The Security Protocol Adaptation Module 1215 may be configured to match the base name of an incoming operation against a set of name prefixes, according to an embodiment of the invention. The set of name prefixes to be matched may be configured for the requesting entity (e.g., a client application like the User 1203) that originated the requested operation. The set of name prefixes provides the rule selection criteria and might reside in the configuration data 1210 and/or reside in a portion of a directory, such as the DIT 600.

According to an embodiment of the invention, the longest matching name prefix identifies the rule to be used. For example, if a client application requests an operation on entry "A,B,C,D,E", where A-E, are the RDNs in LDAP order, and there are rules configured with name prefixes "E", "C,D,E", "B,C,D,E" and "Z,B,C,D,E", then the selected rule is the one with the name prefix "B,C,D,E" since this represents the longest prefix in the rule set that matches the "A,B,C,D,E" input. According to an embodiment of the invention, the selected rule set may comprise an associated action, such as: "respond with an error," "log the operation attempt," or "continue the operation as received, but assume a different user and/or authentication level (the effective user) for purposes of access control." In the latter case, when the ACU 1201 is subsequently employed to make access control decisions, the effective user is used, resulting in different access control decisions being made depending on a combination of the original user and the matched name prefix. In other words, the result is a schema level access control scheme that nevertheless provides subtree access control, according to an embodiment of the invention. In principal, this approach can be applied down to the individual entry level.

For example, as shown in FIG. 12, the UserA 1203 and the UserB 1205 are external users. Assume further that the administrative area's ACU 1201 has been configured such that neither the UserA 1203 nor the UserB 1205 have read or write permission on any entry in the DIT 1200. Assume further that two special users have been created, a UserR 1207 and a UserW 1209. The UserR 1207 has read permissions on any subscriber entries in the DIT 1200, and the UserW 1209, has read and write permissions on any subscriber entries in the DIT 1200. Assume still further that external client applications, such as the User A 1203 are not permitted to bind as either the UserR 1207 or the UserW 1209.

Accordingly, the Security Protocol Adaptation Module 1215 locates a rule in the configuration data 1210 such that if UserA performs an operation on an entry within the subtree with name prefix "P1", (i.e., any of the entries 504*a*, 504*c*, 504*d*) the effective user is taken as the UserW 1209. For all other operations, the effective user remains the UserA 1203. The Security Protocol Adaptation Module 1215 also includes a second rule such that if the UserB 1205 performs an operation on an entry within the subtree with name prefix "P1", the effective user is taken as the UserR 1207, and a third rule that if the UserB 1205 performs an operation on an entry within the subtree with prefix "P2", (i.e., any of the entries 504*b*, 504*e*) the effective user is taken as the UserW 1209. For all other operations, the effective user is left as the UserB 1205.

The result of these three rules is that the UserA 1203 has read/write access to the entries within subtree P1 only, and the UserB 1205 has read access to the entries within subtree P1 and also has read/write access to entries within subtree P2.

As with the Protocol Adaptation Module 1107, the Security Protocol Adaptation Module 1215 may be configured to operate after name resolution, but before the remainder of the operation processing, according to an embodiment of the invention. This means that the resulting subtree access control can be based on the fully dereferenced aliases, with no requirement to configure any access control on the alias names themselves. Thus, where subscribers have multiple identities, and are accessed via aliases representing those identities, only the real entries representing the subscribers need be grouped into subtrees for access control purposes, according to an embodiment of the invention. Accordingly, the Security Protocol Adaptation Module 1215, like the Protocol Adaptation Module 1107, may interoperate with the Name Resolution Module 909 shown in FIG. 9B, according to an embodiment of the invention. Similarly, although not shown in FIG. 12, the Security Protocol Adaptation Module 1215 may interoperate with other components of alias hiding shown in FIG. 9B, according to an embodiment of the invention. Similarly, although not shown in FIG. 12, the Security Protocol Adaptation Module 1215 may interoperate with variant processing, such as the variant processing shown in FIG. 10B, according to an embodiment of the invention. Thus, for example, the components of variant processing associated with the Directory Operations Server 1007 shown in FIG. 10B could be associated with the Directory Operations Server 1213 shown in FIG. 12, according to an embodiment of the invention.

The results of directory operations typically do not include information about the user that invoked the operation, and therefore a requesting application will not be aware that its requested actions have actually been performed by a surrogate user or users for security reasons, according to an embodiment of the invention.

Nomadic Subscriber Data System

Figure 13A:
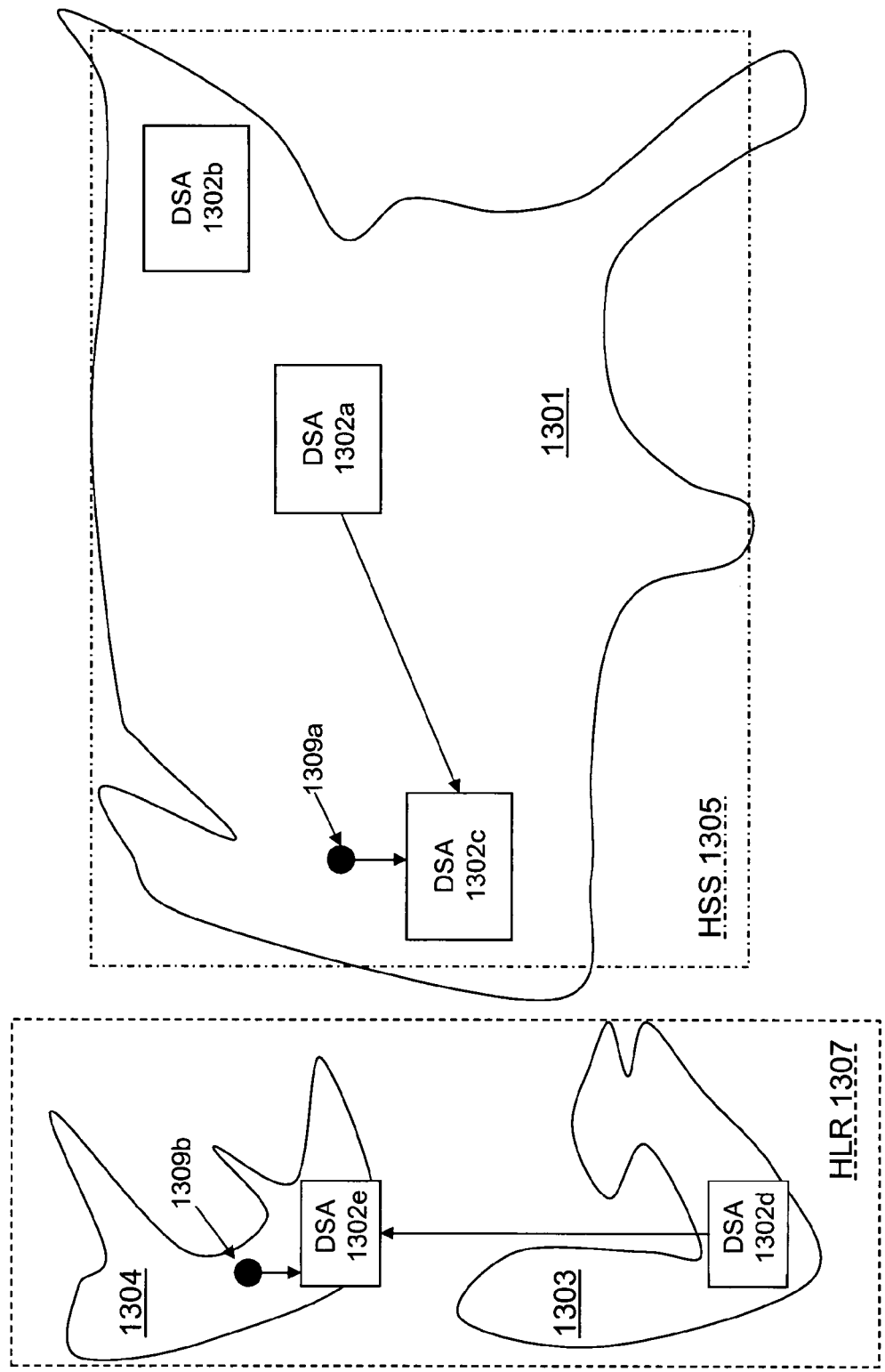
FIG. 13A illustrates a Nomadic Subscriber Data System for improved communication of subscriber data among data repositories in a communications network, such as the Mobile Telecommunications System 204, according to an embodiment of the invention.

FIG. 13A illustrates a Nomadic Subscriber Data System for improved communication of subscriber data among data repositories in a communications network, such as the Mobile Telecommunications System 204, according to an embodiment of the invention.

A problem often arises when attempting to implement a large-scale directory server system across geographical/network boundaries where network performance/latency is unpredictable, not guaranteed and/or generally limited. This situation often arises in deployments where satellite links (e.g., Indonesian islands) or long distance connections (e.g., North America to Europe/UK) are used. In such deployments, the real-time replication of data over long distances is often impractical, and the real-time chaining of X.500 requests to support a "single logical directory" across all locations is also often impractical due to lengthy transmission latencies for IP packets. For example, transmitting an IP packet one-way from New York, N.Y. to Seattle, Wash. may exceed 50 ms in any given North American operator network. Just the transmission latency alone, not including directory processing times, exceeds the maximum times client applications of the directory can wait for a response to an update or query in many cases.

Solutions to this communication problem should minimize the communication/bandwidth required between deployment sites having bandwidth/latency issues while at the same time offering a single logical directory in which any directory server system can serve any data hosted by the distributed solution, according to an embodiment of the invention. Such a solution, for example, might support an HSS that spans North America and the UK, or a single logical HLR spanning the Indonesian Islands.

In an embodiment of the Nomadic Subscriber Data System, subscriber profile data is dynamically hosted by a DSA 1302 based on locality of reference/access in a manner similar to the way in which conventional wireless networks support moving parts of a subscriber's wireless profile (e.g., a GSM or ANSI-41 defined subscriber profile) from the HLR 307 (mobility database in the home network) to the VLR 303 (mobility database collocated with the switching facilities at the network where a subscriber device is currently attached) based on point of network attachment/access of the subscriber. After the initial attachment to the network, the VLR contains all the necessary subscriber and device data to allow a local switching system to complete calls; if the data was not located locally, call setup time might become excessive if the remote HLR had to be contacted every time a call was to be processes. This HLR-VLR concept and associated profiles are very specific to wireless technology and specifications (GSM/ANSI-41) and cannot be generically applied to any subscriber profile data for any type of telecommunication network. Nomadic Subscriber Data enhances this concept to a much more generic level which is agnostic to the type of access network it is deployed into, as well as enabling a generic subscriber profile which is capable of serving the data needs of any real-time telecommunication core network application, according to an embodiment of the invention.

The Nomadic Subscriber Data system is based on the highly distributed and scalable X.500 Directory, according to an embodiment of the invention. The X.500 Directory allows subscriber profile data to be geographically distributed while at the same time appearing to the network client as a single logical database where any data can be retrieved from any server of the X.500 Directory. In the case that the deployment places different DSAs across geographies that introduce large transmission latencies as described above, embodiments of the Nomadic Subscriber Data system detect when client access to the data exceeds configurable minimum quality of service thresholds and dynamically transfers subscriber profile data from a remote DSA to a local DSA where its currently being accessed. Thus, in the Nomadic Subscriber Data System, data is hosted on a DSA close to where it is used when it is used, avoiding the need to replicate or chain over latent connections for every request while at the same time still providing a unified directory for provisioning. Further embodiments of the Nomadic Subscriber Data system allow for service or application specific portions or subsets of the subscriber profile data to be independently relocated based on similar principals described above. Thus, this subscriber and service specific extension to the Nomadic Subscriber Data system makes the relocation of the application/service specific data possible and allows different subscriber data to be located at different DSAs simultaneously allowing it to be accessed locally where it is needed, according to an embodiment of the invention.

In this approach, data is initially provisioned to a specific DSA, such as the DSA 1302*a*; however upon initial access, such as from a query or update, from a remote DSA, such as the DSA 1302*c*, the subscriber data is transferred once to the remote DSA in support of the query/update. The remote DSA is presumably a local DSA to the subscriber or application acting on behalf of the subscriber. Following the data transfer, all local queries involving this subscriber data are completed locally on the DSA, according to an embodiment of the invention. In essence, an embodiment of the Nomadic Subscriber Data System implements a generic subscriber user profile, typically definable by the CSP, and the data is nomadic based on point of access to the database (e.g., by using a protocol such as LDAP or DAP). Thus, for example, data is moved if quality of service is not being met because of excessive transmission latencies and other transfer characteristics and metrics are met or not met, according to an embodiment of the invention.

Assume, for example, that subscriber data for HSS 1305 has been initially provisioned on the DSA 1302*a*. Assume further that the portion of this subscriber data associated with the subscriber 1309*a* has been configured to be suitable for transfer. When the subscriber 1309*a* (and/or the device or server representing the subscriber) interacts with the HSS 1305 such that a data query and/or update will be requested, then the DSA 1302*a* transfers the subscriber's data to the DSA 1302*c*, which is in closer physical proximity (and hence provides faster access because of lower transmission latencies) to the subscriber 1309*a* than the DSA 1302*a*. Following this transfer the DSA 1302*c* will maintain and be responsible for the data of subscriber 1309*a* related to the HSS 1305.

Similarly, assume that subscriber data for the HLR 1307 has been initially provisioned on the DSA 1302*d* located on island 1303. Assume further that the portion of this subscriber data associated with the subscriber 1309*b* has been configured as suitable for transfer. When the subscriber 1309*b* (or the device or server representing the subscriber) interacts with the HLR 1307 such that a data query and/or update will be requested, then the DSA 1302*d* transfers the subscriber's data to the DSA 1302e, which is located on the island 1304 and in closer physical proximity to the subscriber 1309b than the DSA 1302e, thus providing faster access to the data. Following this transfer, the DSA 1302e will maintain and be responsible for the data of subscriber 1309b related to the HLR 1307.

Figure 13B:
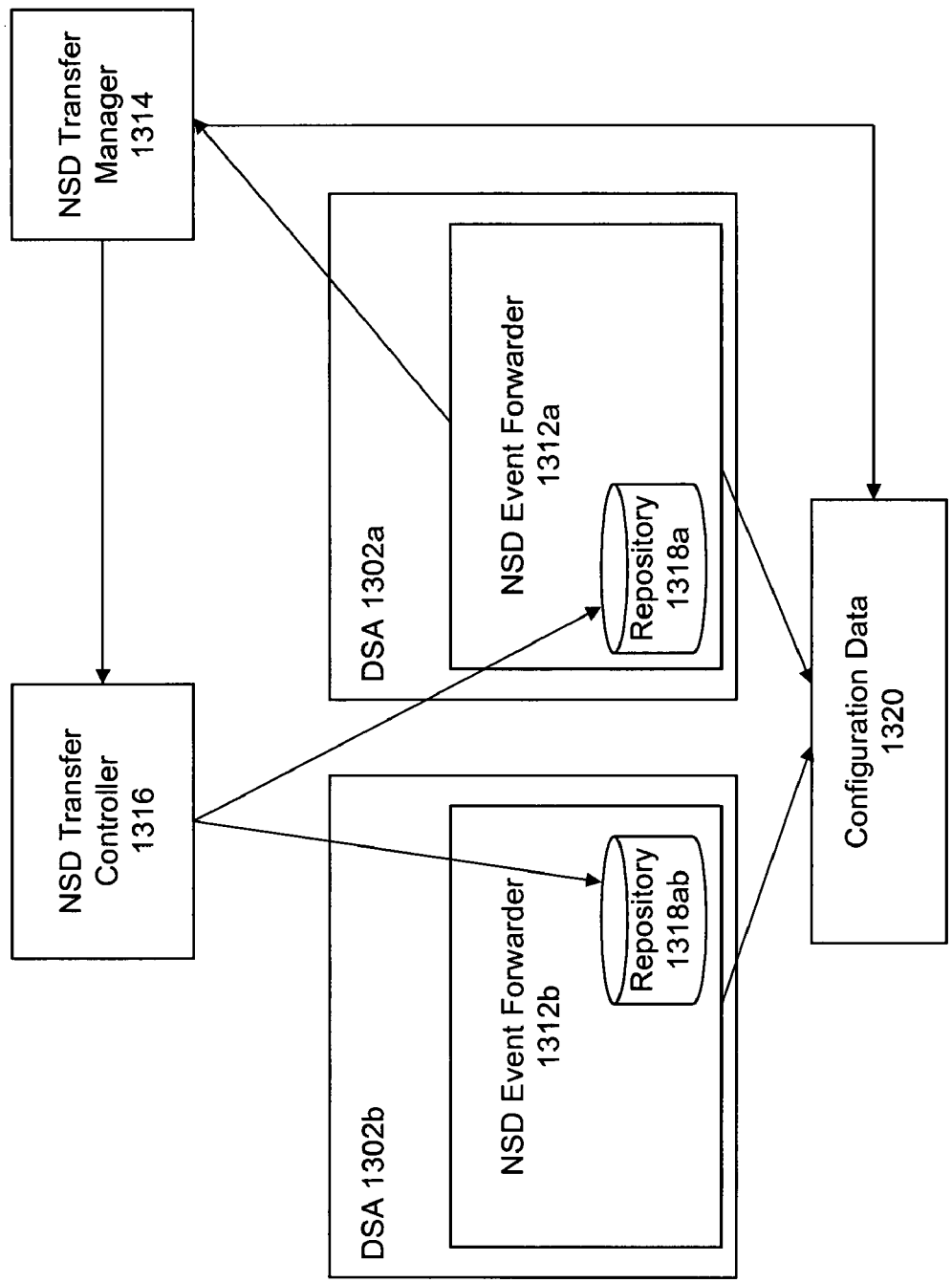
FIG. 13B illustrates representative components comprising a nomadic subscriber data system, such as that illustrated in FIG. 13A, according to an embodiment of the invention.

FIG. 13B illustrates representative components comprising a nomadic subscriber data system, such as that illustrated in FIG. 13A, according to an embodiment of the invention.

An NSD Event Forwarder 1312a resides at a point of data repository access in a DSA 1302a and monitors requests for access to subscriber profiles (e.g., monitoring LDAP access) in repository 1318a and then measuring response times against configuration data 1320, such as a pre-configured quality of service profile, according to an embodiment of the invention. If the NSD Event Forwarder 1312a detects that subscriber access (e.g., LDAP operations) has exceed thresholds for acceptable performance for client applications, as defined by the configuration data 1320, then the NSD Event Forwarder sends these events, with appropriate details for the specific subscriber profile data, to an NDS Transfer Manager 1314. The NDS Event Forwarder 1312a typically resides on DSAs configured to provide access to subscriber profile storage, such as the DSAs 1302 shown in FIG. 13A. Thus, a Nomadic Subscriber Data System may comprise multiple instances of the NSD Event Forwarder 1312, according to an embodiment of the invention.

The NSD Transfer Manager 1314 provides a centralized collection point for events forwarded from the distributed NSD Event Forwarders 1312, according to an embodiment of the invention. The NSD Transfer Manager 1314 collates the events received from the NSD Event Forwarders 1312 and determines based on configuration data 1320, such as pre-configured quality of service and performance profiles, when/if to move subscriber profile data from one DSA to another, e.g., from the DSA 1302a to the DSA 1302b shown in FIG. 13B. The NSD Transfer Manager 1314 may reside in one more or more specialized DSAs or may exist on a separate and/or external management/provisioning platform, according to an embodiment of the invention.

An NSD Transfer Controller 1316 controls the movement of subscriber profiles from a source DSA (e.g., the DSA 1318a) to a target DSA (e.g., the DSA 1312b) as instructed by the NSD Transfer Manager 1314. The NSD Transfer Controller 1316 insures that the correct subscriber data or subset of subscriber is moved intact without error to the new DSA, according to an embodiment of the invention. The NSD Transfer Controller 1316 may concurrently insure that all appropriate Directory bindings (Hierarchical Object Bindings—HOBS) are properly altered and/or maintained, according to an embodiment of the invention. If an error such as a network outage, DSA server failure or other problem prevents successful transfer of subscriber profile data, the NSD Transfer Controller 1316 insures that the original location of the subscriber data is maintained as was before the transfer was attempted. The NSD Transfer Controller 1316 uses conventional capabilities to perform such moves (e.g., Directory Transaction support and LDAP), according to an embodiment of the invention. Thus, the entire subscriber profile, or a subset of the subscriber profile may be safely transferred from one DSA to another. Similar to the NDS Transfer Manager 1314, the NSD Transfer Controller 1316 may reside on one or more specialized DSAs or may exist on a separate and/or external management/provisioning platform, according to an embodiment of the invention.

The NDS approach is not generally intended for boundaries between DSAs 1302 where the point of data access changes in real-time, such as the situation that might arise for a subscriber driving along a boarder network serviced by two neighboring access points. In such situations, a more conventional data server deployment (i.e., non-Nomadic) would likely be preferable as either of the neighboring DSAs are likely to serve the data access queries and updates with an appropriate QOS. In this situation, the NDS system can be configured to prevent the data from becoming mobile by using several approaches. The NSD Transfer Manager 1314 may be configured to disallow transfer of subscriber profiles between two geographically adjacent DSAs or between DSAs whose communication latency is very low (i.e., there's no real benefit to moving the data). Additionally, the NSD Transfer Manager 1314 may be configured to determine when thrashing is occurring between two DSA sites. Here, thrashing generally means the frequent movement of subscriber profiles back and forth between these DSAs. In this situation, the NSD Transfer Manager 1314 may throttle or reduce the movement by stricter transfer criteria, such as raising the priority required by a client application to cause a transfer, increasing the number of requests by a client to cause the transfer to happen, or just disallowing the transfer between the DSAs altogether.

FIG. 13C illustrates representative configuration data 1310 for a DSA participating in the Nomadic Subscriber Data System, according to an embodiment of the invention. The configuration data 1310 could reside in the configuration data file 1320 shown in FIG. 13B. The configuration data 1310 for the Nomadic Subscriber Data System could include data such as:

Data indicating whether the DSAs are allowed/disallowed to participate in on-demand data exchanges 1312a. As shown in the data 1310, the DSA 1302a is allowed to participate in on-demand exchanges. In particular, the DSA 1302a is allowed to participate in exchanges with the DSA 1302c.

Restrictions 1312b on partitions or subsets of the DIT, such as the DIT 600, that may be exchanged between specific DSAs. The restrictions 1312b shown for the data 1310 indicate that only data for subscribers in California, Washington, Oregon, Nevada, and Arizona may be exchanged for this particular DSA, and Other restrictions 1312c on factors such as ranges of data values, maximum size of data, time of day, etc., that may be evaluated before data is exchanged between DSAs. The other example restrictions 1312c shown for the data indicate that no data transfers of secure data, such as passwords, and no single data transfer may exceed 50 Megabytes. These restrictions merely represent examples of some of the other restrictions that could be placed upon data transfers, according to embodiments of the invention.

Other restrictions 1312c that could be used include the size of data transferred, which might be configurable and its setting could be determined based on the latencies involved in transferring and transmitting the size of data as being acceptable to client applications, such as 50 KB, 500 KB, 1 MB, 10 MB, according to an embodiment of the invention. Another restriction could be private and/or secure data/attributes that might not be transferred due to security restrictions. For example, user passwords might not be allowed to be transmitted over connections that are not secured and/or encrypted. Yet another restriction might be network loading levels. For example, link occupancy levels may be monitored to determine that data should not be transmitted during specific times of the data when busy levels peak. Still further, DSA operational status may be taken into account. For example, transfers of data may not be allowed during states where involved DSAs are in an overload state, or involved DSAs are in a reduced capacity state (one of the nodes of DSA is out of service for example). Finally, other portions of the subscriber profile data may be defined to be non-nomadic or static in nature, such that the data does not need to be relocated at the point of access. This might include static information used by a BSS such as subscriber address.

Figure 13D:
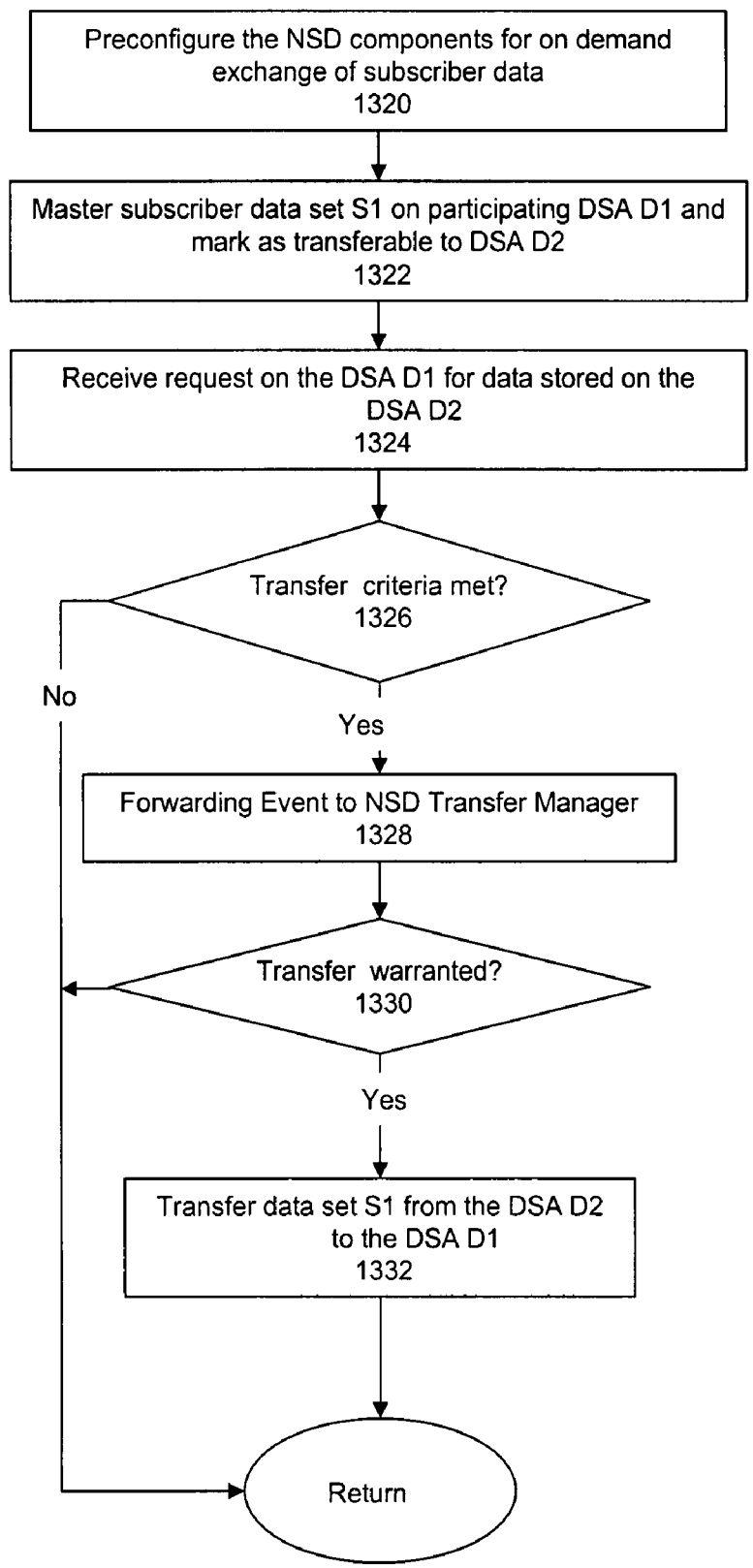
FIG. 13D provides a high-level algorithm for the Nomadic Subscriber Data System, according to an embodiment of the invention.

FIG. 13D provides a high-level algorithm for the Nomadic Subscriber Data System, according to an embodiment of the invention.

The NSD components are preconfigured for on demand exchange of subscriber data (Step 1320). The participating DSAs D1 and D2, such as the DSAs 1302*a* and 1302*c* shown in FIG. 13A, are preconfigured to exchange subscriber data with each other on demand. Additionally, relevant NSD Event Forwarder(s), such as the NSD Event Forwarder 1312*a*, NSD Transfer Manager 1314, and NSD Transfer Controller, along with the Configuration Data 1320 should be prepared, according to an embodiment of the invention. The pre-configuration process would include data, such as the configuration data 1310 shown in FIG. 13B.

The subscriber data for S1 is mastered on DSA D1 (e.g., the DSA 1302*a*) and is configured to be transferable to the DSA D2 (e.g., the DSA 1302*c*) (Step 1322). Here, S1 represents that subset of the DIT related to a subscriber or subscriber service/application that can be transferred from the DSA D1 to the DSA D2 (e.g., from the DSA 1302*a* to the DSA 1302*c*).

As discussed in FIG. 13B, the rules and eligibility of specific to be transferred are controlled by the NSD Event Forwarder and an NSD Transfer Manager, according to an embodiment of the invention. The conditions, if any, for this transfer, could be set in the configuration data, such as the configuration data 1310 shown in FIG. 13C. For example, the subscriber data S1 could be restricted to a specific subset of the subscriber profile, such as a specific service/application entry (or entries) or even a specific subset of attributes of an entry of the subscriber profile. S1 may also include restrictions on whether the entire subscriber profile is transferable as a whole or if distinct subsets of the profile (e.g., specific application data) are separately and simultaneously transferable. Here, for example, S1 might allow the entire subscriber profile to be nomadic, including all sub-trees/subsets and all application/service data included. Another example might disallow the entire subscriber profile to be nomadic but only configured application/service specific profile sub-trees/subsets are allowed to be independently nomadic. As discussed in FIG. 13B, each DSA participating in the Nomadic Subscriber Data system has an NSD Event Forwarder configured with a specific quality of service (QoS) and transfer criteria profile for subscriber data access, according to an embodiment of the invention. This profile defines, for example, a threshold for request latency (e.g., an LDAP request latency) where a subscriber profile transfer may be considered.

DSA D1 receives a request (e.g., an LDAP search or update) for subscriber data set within the bounds of S1 that is currently stored on DSA D2 (Step 1324). Typically, the examination of QOS and transfer criteria and subsequent relocation of subscriber data is specific to a single request for a single subscriber profile. However, it would be possible to configure the DSA D1 to transfer the appropriate subscriber data, according to S1, for a given set of subscribers upon the request for data for a single subscriber within the set, according to an embodiment of the invention.

The data request is typically processed as any other request would be processed by the DSA D1 and the DSA D2. For example, using the principles of X.500 protocols, the request may be chained from DSA D1 via a Root DSA to DSA D2 where the request is fulfilled and the response is returned via the same path of the request.

According to an embodiment of the invention, the NSD Event Forwarder of DSA D1 reviews the data request and associated response characteristics and performance and associated response characteristics and performance and determines if the threshold for transferring data set S1 has been exceeded (Step 1326). An exemplary threshold might be, for example, that acceptable LDAP request latency has been exceeded. If the threshold has not been exceeded (Step 1326), then the NSD Event Forwarder returns to normal processing.

If the threshold has been exceeded (Step 1326), then the NSD Event Forwarder of DSA D1 initiates a forwarding event to the NSD Transfer Manager (Step 1328).

The NSD Transfer Manager receives the forwarding event, along with others occurring simultaneously in the system, determines if the transfer is warranted, and if so, then instructs the NSD Transfer Controller to initiate a subscriber profile transfer from DSA D1 to DSA D2 (Step 1330). In determining if the transfer is warranted, the NSD Transfer Manager may check items such as the health and overload state of the affected system components and network, according to an embodiment of the invention. If transfer is not warranted (Step 1330), then the NSD Transfer Manager returns to normal processing.

If transfer is warranted (Step 1330), then the NSD Transfer Manager requests the NSD Transfer Controller to read the subscriber data set, as defined and/or constrained by S1, to be transferred from DSA D1, initiate a database transaction to delete the subscriber data set S1 from DSA D1, and then initiate a transaction to add the subscriber data set S1 into DSA D2 (Step 1332). Upon successful completion of the transaction to add the subscriber data set S1 to the DSA D2, the NSD Transfer Manager requests a delete transaction on DSA D1 is committed finalizing the transfer (Step 1332).

As part of the transfer process, the NSD Transfer Manager would request any DSA holding data relevant to the entire subscriber profile for the subscriber data set S1 to be updated accordingly, according to an embodiment of the invention. As previously discussed, a subscriber profile and/or references to a profile may span multiple DSAs. Typically, a subscriber profile might exist on a single DSA, but it may have references from a root DSA and one or more Identity domain DSAs, according to an embodiment of the invention. The subscriber profile would need to be physically moved (along with important aliases that are collocated with the profile) and all references to the profile/aliases would need to be updated accordingly to point to the new target DSA, according to an embodiment of the invention.

When S1 allows for sub-tree/subsets of the subscriber profile to be independently and simultaneous transferred to different DSAs, a specialized procedure may be employed to insure that local access to a transferred-in subscriber profile sub-tree/subset, for example an HSS application sub-tree, does not cause unnecessary X.500 chaining back to the origin DSA where the subscriber root entry lives, according to an embodiment of the invention. This subscriber root entry is considered the root of the entire subscriber profile sub-tree and hence is the superior to any subscriber profile subset or sub-tree. When S1 dictates that an entire subscriber profile is nomadically relocated from one DSA to another, the subscriber root is moved as part of the profile and all references/binding to that root are changed accordingly, according to an embodiment of the invention. However, when a subset or sub-tree of the subscriber profile is moved, the subscriber root is not moved with the sub-tree because there are possibly other sub-trees that need to remain intact on the DSA they are currently stored on, accordingly to an embodiment of the invention. To avoid X.500 chaining back to the origin DSA, where the subscriber root is located, when locally accessing a relocated application sub-tree on the destination DSA, the subscriber root entry is locally shadowed, or copied, to the local DSA when the sub-tree is relocated via the procedures described herein, according to an embodiment of the invention. This allows locally initiated queries or updates on the applications specific sub-tree to complete locally since the entire DN (Distinguished Name) of the target entry exists in the local DSA. If the DN of the application sub-tree includes other entries between the subscriber root and the root of the application sub-tree, they may as well be shadowed to insure local processing of the data is possible without X.500 chaining, according to an embodiment of the invention.

An additional specialized mechanism may be employed to insure that access to a locally transferred-in subscriber profile, or subscriber profile sub-tree, from one of many possible subscriber root entry aliases, results in locally satisfied response, according to an embodiment of the invention. Subscriber root alias entries are implemented as standard X.500 or LDAP Alias entries, according to an embodiment of the invention. These Alias entries contain a reference DN to the entry that they point to. In this embodiment a subscriber root alias points to a specific subscriber root entry. For example, the subscriber root entry may have the have an RDN of "cn=William" with an alias entry that as an RDN of "cn=Bill" that also contains a reference to the root entry with "cn=William". In this example, if the subscriber profile is moved from DSA D1 to D2 but the alias to it is left on DSA D1. Queries using the entry alias result in the query first going to DSA D1 to retrieve and resolve the alias "cn=Bill" to the root entry "cn=William" which now lives on DSA D2. To avoid the need to retrieve the alias from D1 when the subscriber root is located on D2, the alias is also moved along with the subscriber profile or profile sub-tree using the same NSD procedures defined herein. Which of many aliases should be moved may also be included as part of the Transfer criteria and configuration defined in the NSD Event Forwarder, NSD Transfer Manager and NSD Transfer Controller, according to an embodiment of the invention. Thus, specific aliases may only be transferred based on the identity of the client making the access, the priority of the client making the access or based on the alias used by the client when initiated the access triggering the Nomadic relocation of the subscriber data.

As an alternative to deleting the subscriber data set S1 from the DSA D1, the NSD Transfer Controller may mark the subscriber profiles to remain shadowed (or cached) in the DSA D1 after the profile has been successfully transferred to the target DSA, the DSA D12, according to an embodiment of the invention. The "inactive" state would indicate that the data may be stale and that there is an "active" copy located in another DSA. This approach may support disaster recovery and reduction of traffic when/if the point of access for the S1 entries in the telecommunication network returns from the DSA D2 to the DSA D1, or as shown in FIG. 13A from the DSA 1302c to the DSA 1302a.

All subsequent accesses to DSA D1 for subscriber data set S1 may be locally completed from DSA D2 afterwards, according to an embodiment of the invention.

The NSD system may be performed on a per subscriber profile basis, according to an embodiment of the invention. Typically, a certain percentage of a CSP's subscribers roam the coverage territory. Consequently, a subscriber profile changes with the change in location of the actual subscriber user, assuming that change causes an unacceptable latency in the network. Alternatively, a subscriber data constraint set S1 could comprise a group of subscribers, although it might not be easy to determine how to group subscribers into nomadic sets. Similarly, the set S1 could comprise a portion of a subscriber profile, or even portions of subscriber profiles from a set of subscribers.

Implementation of the Nomadic Subscriber Data System's algorithm may use X.500 DISP concepts for shadowing or moving entries as described above or may be implemented by bespoke interfaces, according to an embodiment of the invention.

The Nomadic Subscriber Data system described here proposes one possible mechanism to solve the problem of nomadic data, although other options are possible. For example, the location of the NSD Transfer Manager and NSD Transfer Controller may either be part of the directory software itself or separated into distinct components that live on a centralized management system or provisioning system. Additionally, to provide scalability, these components could be made scalable into multiple servers to provide throughput and resiliency for the NSD functionality, according to an embodiment of the invention.

Alternatively, as described above, the NSD functionality may include the ability to alter the granularity of the subscriber data being transferred. As discussed above, the entire subscriber profile is transferred from one DSA to another. However, assume that two distinct clients of high priority access the subscriber profile consistently from two different access points, each requiring different subsets of subscriber service data. Accordingly, the NSD functionality, such as the NSD Event Forwarder and/or the NSD Transfer Manager could include a capability for breaking up a subscriber profile itself into service components subsets or sub-trees (e.g., HSS service data, HLR service data, prepaid service data), and have each of the individual subsets could be independently nomadic based on factors, such as point of access, client system making the access, QOS profile of course, according to an embodiment of the invention. In this alternative embodiment, only one copy of the subscriber profile would exist at any time (with the possible exception of shadowed root or sub-root entries that maintain locally stored DNs to avoid X.500 chaining), but its constituent parts (services) would be distributed at different DSAs based on locality of access and QOS.

As yet another alternative, rather than transferring and deleting a subscriber data set S1, the NSD system could be configured to cache the subscriber data set S1 on multiple DSAs based factors such as point of access and QOS profiles, according to an embodiment of the invention. In such an embodiment, the NSD system would also include a mechanism to synchronize the multiple copies to insure integrity of data. The synchronization mechanism could be added to a component such as the NSD Transfer Manager 1314, according to an embodiment of the invention.

Journaling and Backup Processes

Figure 14:
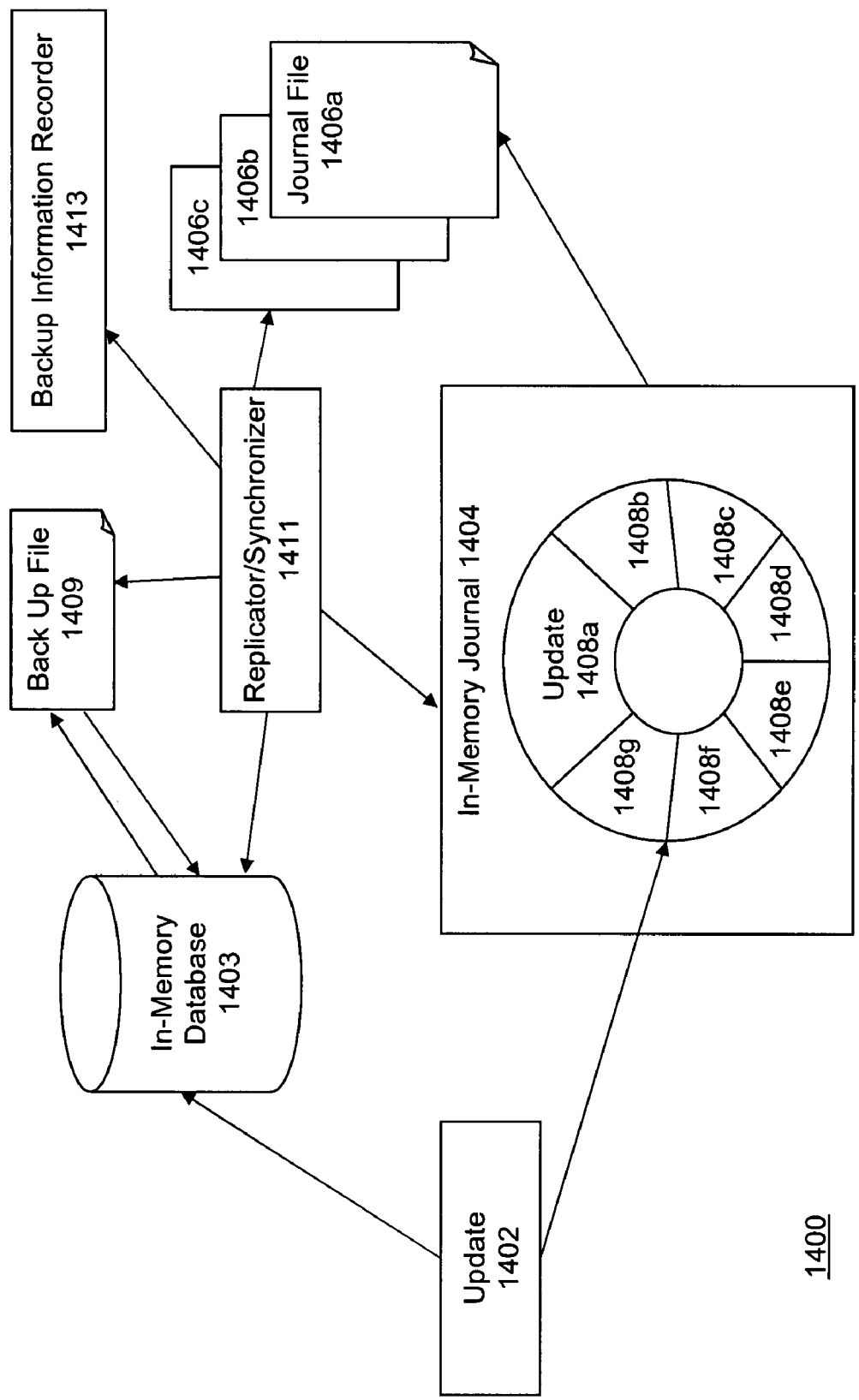
FIG. 14 depicts a journaling system 1400, according to an embodiment of the invention.

FIG. 14 depicts a journaling system 1400, according to an embodiment of the invention. The journaling system 1400 includes the in-memory database 1403, such as the data repository 708a shown in FIG. 7A, an update 1402, an in-memory journal 1404, a back-up file 1409, and one or more journal files 1406a-1406c, a Replicator/Synchronizer 1411, a Backup Information Recorder 1413, and so forth. The in-memory journal 1404 includes a list of updates 1408a-1408g, and so forth.

During the application of replicated updates, a Replicator/Synchronizer 1411 may control the process of replicating updates to one or more DSs. The Replicator/Synchronizer 1411 is typically associated with a directory server, such as the DS 706 shown in FIG. 7A. In particular, the DS of the Replicator/Synchronizer 1411 may be the primary DS within a DSA, such as the DSA 702. As previously mentioned, a DSA typically has a primary DS with any number of secondary DSs, each of which has its own in-memory database 1403, according to an embodiment of the invention. Updates 1402 are typically made to the primary DS within the DSA and then replicated to the other DSs in the DSA, according to an embodiment of the invention. Of course, the Replicator/Synchronizer 1411 could be located on any of the DSs within a DSA, according to an embodiment of the invention.

The Replicator/Synchronizer 1411 applies the updates 1408a-1408g to the in-memory database 1403. Further, in various embodiments of the invention, the directory server also stores the details of transactions to the data repository represented by the in-memory database 1403 in the in-memory journal 1404. The information stored in the in-memory journal may include changes made to entries, a time for the changes, and an incrementing identifier for each change, and a state of the entry prior to the change (e.g., a value changed in the update), according to an embodiment of the invention. Subsequently, in an embodiment of the invention, on regular time intervals, or as soon as possible given factors such as the limitations of the disk subsystem, completed transactions from the in-memory journal 1404 are written to a disk-based journal file 1406 as a permanent record of the transaction.

The in-memory journal 1404 is a shared memory area which stores details about all transactions to the in-memory database 1403. The information in the in-memory journal 1404 is used during the functions of replication and synchronization.

During replication, the Replicator/Synchronizer 1411 may use the information in the in-memory journal 1404 to rollback a replicated update, such as, for example, the update 1402, that has failed. During synchronization, the Replicator/Synchronizer 1411 may use the information in the in-memory journal 1404 to transmit the latest updates to a synchronizing node, e.g., another DS. In an embodiment of the invention, the transactions associated with the updates 1408 are stored in a circular buffer.

In various embodiments of the invention, the In-Memory Journal 1404 is configured to journal the transactions to a disk via a journal file 1406. In an embodiment of the invention, the In-Memory Journal 1404 may create a new journal file 1406 each time the node (e.g., the directory server containing the in-memory database 1403) starts-up or when the current journal file 1406 reaches a given size. The journal files 1406 may include the actual update information, a change identifier, as well as information about when the transaction was performed and by whom.

The journal files 1406 are a key component when restoring a node after a planned outage or server failure, according to an embodiment of the invention. In various embodiments of the invention, when the Replicator/Synchronizer 1411 uses the journal files 1406 in conjunction with a Backup File 1409, the in-memory database 1403 may be restored to the last transaction successfully performed before a planned shutdown (or failure), thus minimizing the number of transactions the primary server subsequently needs to retransmit to synchronize the restored secondary server (e.g., the DS holding the in-memory database 1403).

In various embodiments of the invention, a Backup File 1409 may automatically be created at a specified time interval, e.g., once a day. Backup Files 1409 may also be requested by an operator at other times.

The backup process includes writing a description of each entry in the DIT 600 to the Backup File 1409. The description includes sufficient information for the entry to be fully recreated in the in-memory database 1403 on restoration of the Backup File 1409. The backup process will take a period of time, potentially many minutes in the case of a large in-memory database. This period of time is termed the backup period. In some embodiments of the invention, the data repository 1403 is available for normal activities throughout the backup period. The Backup File is stored in a persistent data repository, according to an embodiment of the invention.

When restoring from a backup, the Replicator/Synchronizer 1411 associated with the in-memory database 1403 requires the Backup file 1409 and Journal Files 1406 for at least the update operations made during the backup period. In an embodiment of the invention, the Replicator/Synchronizer 1411 first restores entries from their descriptions in the Backup File 1409. The Replicator/Synchronizer 1411 then replays from the associated Journal Files 1406 any update operations that occurred during the backup period, in the order that they occurred, allowing for the fact that the update may or may not have been applied to an entry by the time that the description of that entry was written to the backup file 1409. The Replicator/Synchronizer 1411 may optionally apply the updates that took place after the backup period, in the order that they occurred, until either a fixed point in time, or fixed change identifier, or until all available updates have been applied. The restored DS is now in a position to be synchronized with the updates that have taken place on the other DSs within the DSA after the last updated applied from the journal file.

The Replicator/Synchronizer 1411 may review and use information stored in a Backup Information Recorder 1413 during the restore procedure, according to an embodiment of the invention. The back-up information recorder 1413 is configured to record a start time and an end time for a back-up period associated with the Back-up File 1409 and a start change identifier which identifies a first update 1402 to the in-memory database 1403 after the back-up has started and an end change identifier which identifies a final update to the in-memory database 1403 before the back-up has completed. This information can be used to identify the minimum set of updates that must be applied to ensure consistency of the restored backup, according to an embodiment of the invention.

A Subscriber-Centric Directory

Figure 15A:
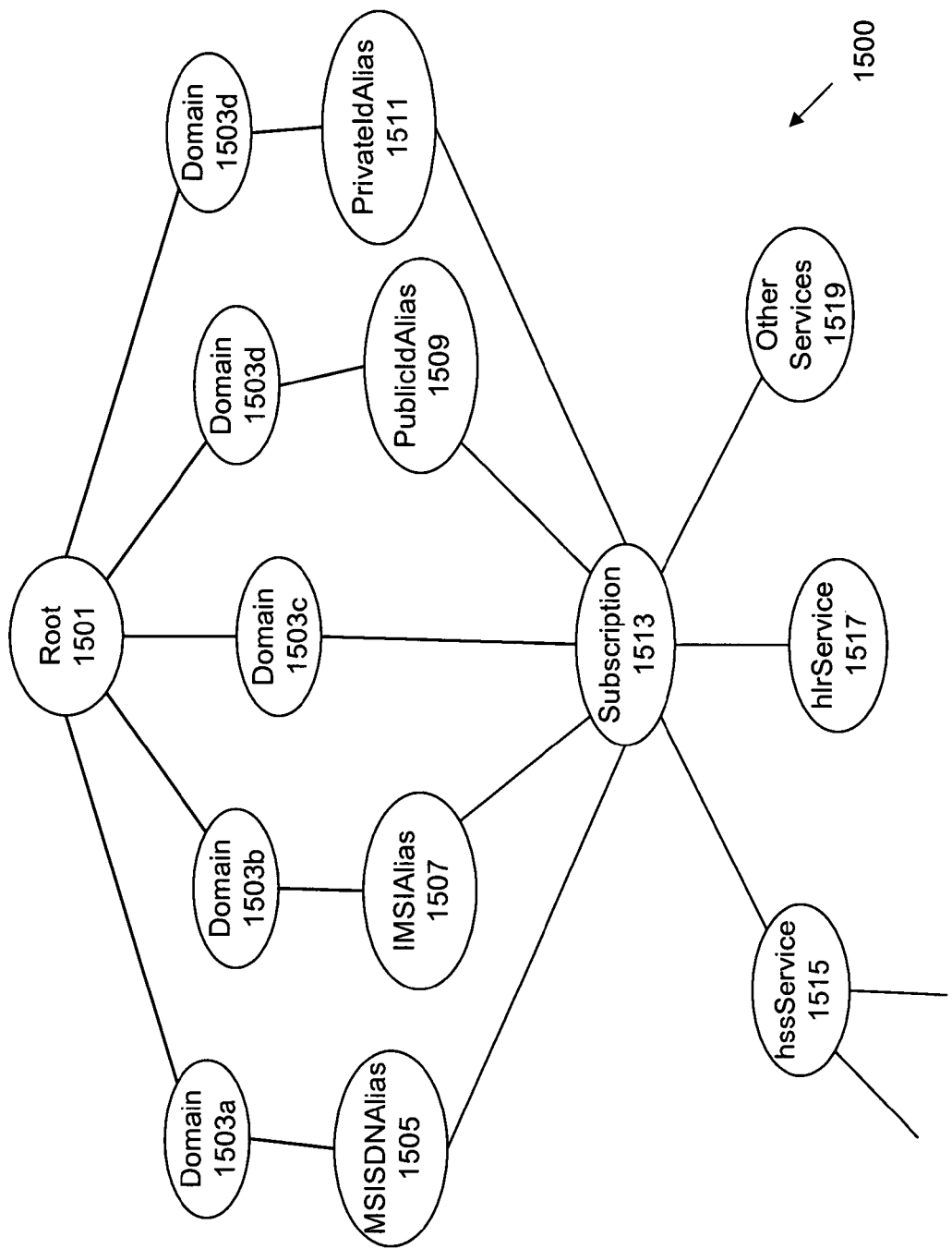
FIG. 15A is a block diagram depicting a hierarchy of data stored in a Directory 1500, such as the data used by the HSS 301 shown in FIG. 3, according to an embodiment of the invention.

FIG. 15A is a block diagram depicting a hierarchy of data stored in a Directory 1500, such as the data used by the HSS 301 shown in FIG. 3, according to an embodiment of the invention. When the HSS 301 is running, updates to the Directory 1500 typically add or modify subscriber data and originate from various domains, such as the IMS Domain 214 shown in FIG. 2. For example, the Directory 1500 may provide authentication information during the AAA procedures, provide service profile information during registration, and hold transparent service data for various services.

The Directory 1500 typically provides a single logical directory for a mobile telecommunications network, such as a directory conforming to the ITU-T X.500 Directory standard. The Directory 1500 employs a hierarchical tree-like data structure, usually referred to as a Directory Information Tree (DIT) that contains various directory entries. The entries are arranged in the form of a tree, where each entry can be superior to a number of entries. The Directory 1500 begins with a Root node 1501. Of course, in some embodiments of the Directory 1500, the Root node 1501 may itself comprise multiple sub-root nodes that collectively provide the root of the Directory 1500. For example, one sub-root node might represent the portion of the DIT that pertains to just the subscriber data for an HSS—or even to just the portion of subscriber data used by one HSS of many HSSes in a large mobile telecommunications system.

The Directory 1500 holds the records for the subscribers in a telecommunication network, such as the telecommunication network 200, according to an embodiment of the invention. In the Directory 1500, the subscriber identities may be partitioned into multiple identity domains 1503a-1503d. To reflect the data associated with the HSS 301, at least four specific domain entries may be provided: IMSI Domain (IMSID), MSISDN Domain (MSISDND), Private Id Domain (privateD), and Public Id Domain (publicD). These domains are represented by alias entries, such as MSISDNAlias entry 1505, IMSIAlias entry 1507, PublicIdAlias entry 1509, and PrivateIdAlias entry 1511. So, for example, the MSISDNAlias entry 1505 allows a subscription, such as the Subscription entry 1517, to be accessed via the MSISDN 325 as well as by a unique ID, such as that provided by the Domain entry 1503c. Similarly, the IMSIAlias entry 1507 entry allows a subscription entry, such as the Subscription entry 1517, to be accessed via the IMSI 323 as well as by unique ID. Likewise, the PrivateIDAlias entry 1511 allows a subscription entry, such as the Subscription entry 1517, to be accessed via the PrivateID 327 as well as by unique ID. The PublicIDAlias entry 1509 allows a subscription entry, such as the Subscription entry 1513, to be accessed via the PublicID 329 as well as by unique ID.

The Subscription entry 1513 represents the top level (or root) of the subscriber data. The Subscription entry 1513 represents the root of the subscriber provisioning data for services, such as the HSS or HLR related services. Accordingly, data for the HSS service, the HLR service, and other services are held as child entries of the Subscription entry 1513. For example, these entries may comprise an hssService entry 1515, an hlrService entry 1517, and other services 1519. In an embodiment of the invention, the globally unique ID, as shown by the Domain 1503c, identifies the Subscription entry 1513 in terms recognized by a specific standard, such as an X.500 Distinguished Name (DN). The Subscription entry 1513 may also be accessed via an aliased identity, such as the IMSI 323, the MSISDN 325, the PublicId 327, and the PrivateId 329, as discussed here.

Figure 15B:
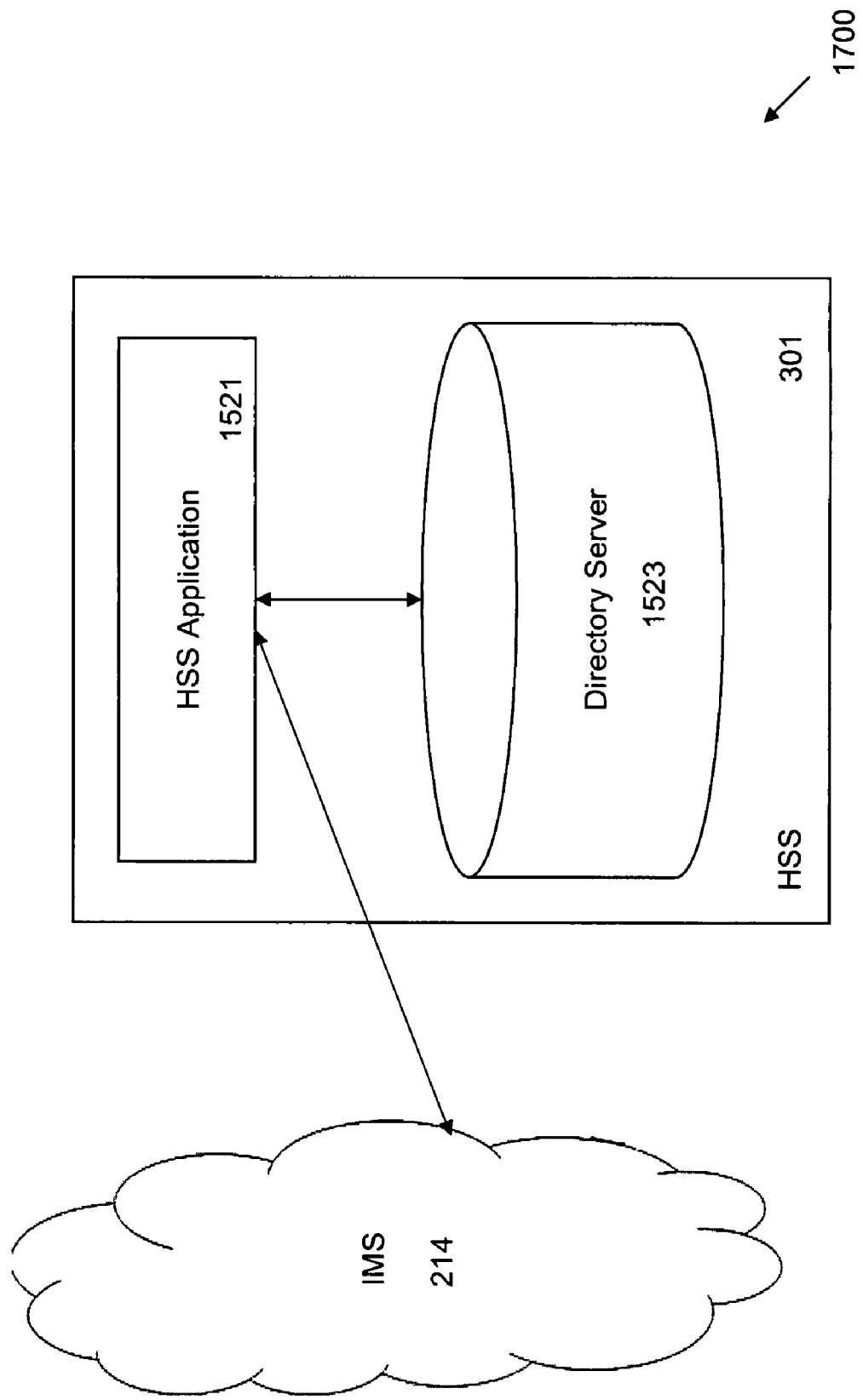
FIG. 15B is a block diagram depicting an HSS architecture, such as the HSS 301 of the CN 206 shown in FIG. 3, according to an embodiment of the invention.

FIG. 15B is a block diagram depicting an HSS architecture, such as the HSS 301 of the CN 206 shown in FIG. 3, according to an embodiment of the invention.

The HSS 301 may comprise multiple servers, each of which includes an HSS application 1521 integrated with a Directory Server (DS) platform 1523, according to an embodiment of the invention. The Directory Server platform 1523 comprises at least one DSA and a DUA, such as the DS platform shown in FIG. 7A. Of course, the DS platform 1523 may comprise more or fewer DSAs than shown in FIG. 7A and in FIG. 7B. The HSS 301 may include a TCP/IP interface to query and update data on the DS platform 1523 using standard communications protocols, such as DAP and LDAP. The TCP/IP interface may also be used, for example, to provision the database when a new subscriber joins the IMS domain 214. The Directory Server platform 1523 is thus responsible for tasks such as data replication and synchronization, backing up the data, providing automatic failure detection and disaster recovery.

The HSS application 1521 facilitates processing of subscriber transactions and signaling traffic from the various domains on the Core Network, such as the IMS Domain 214. In an embodiment of the invention, the HSS application 1521 typically receives a message from a given domain formatted according to a recognized protocol, such as a message formatted according to the Diameter protocol from the IMS Domain 214. The Diameter message may, for example, request the repository data in the Directory Server 1523 for data related to a particular subscriber.

The HSS 301 typically stores and uses two main types of data. Firstly, the HSS 301 includes provisioning data—data related to subscribers and the available services. The stored provisioning data typically includes conventional subscriber data, such as the identity of the CSCF 321 in the IMS domain 214 where the subscription is registered, current barring status, and service profile data. Secondly, the HSS 301 includes configuration and control data—data related to the general operation of HSS 301 services and the HSS 301 system itself respectively. The HSS 301 configuration data stored in the Directory Server 1523 includes the following: IMS Remote Entity Rules, Required Server Capabilities, and AS Permissions.

Accordingly, an embodiment of the invention herein provides an improved HSS that assists CSPs in implementing a flexible network infrastructure that can implement technologies such as IMS, Unlicensed Mobile Access (UMA), and other IP services. In some embodiments of the invention, the improved HSS is compatible with other vendor's HLR platforms, configured to minimize network disruption, provides support for multiple concurrent network access methods, and provide service bundling flexibility over a greater number of subscribers. Additionally, the improved HSS allows CSPs to easily implement new services, consolidate and refine business processes, and reduce operational costs.

Co-Hosted HSS/HLR and Co-Located HSS/HLR

Figure 16B:
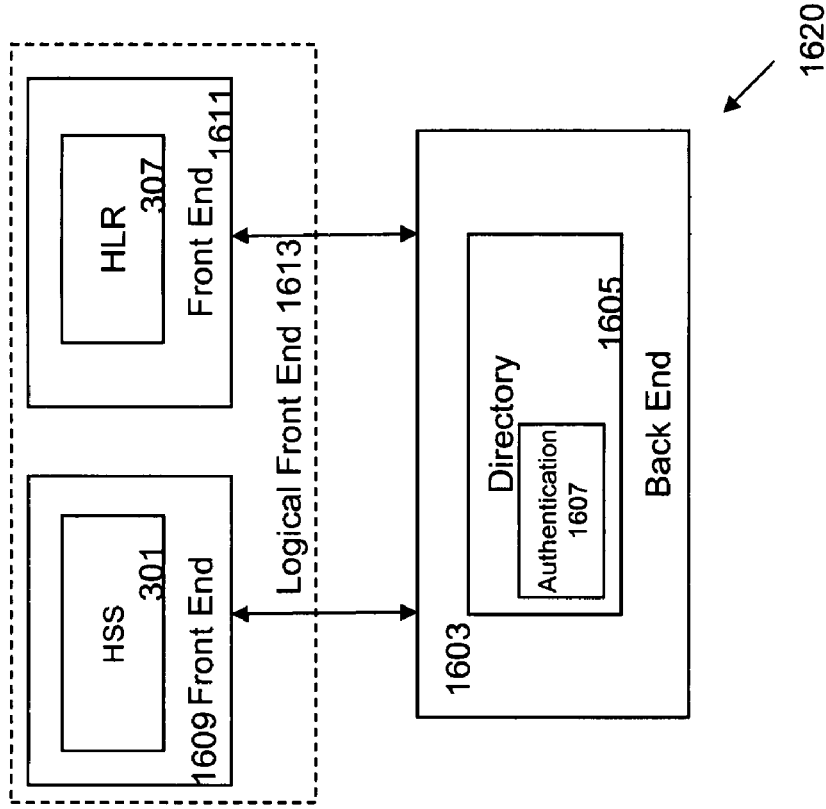
FIG. 16A and FIG. 16B are block diagrams respectively depicting a co-hosted system 1600 and a co-located system 1620 for the HSS 301 and the HLR 307, according to an embodiment of the invention.
Figure 16A:
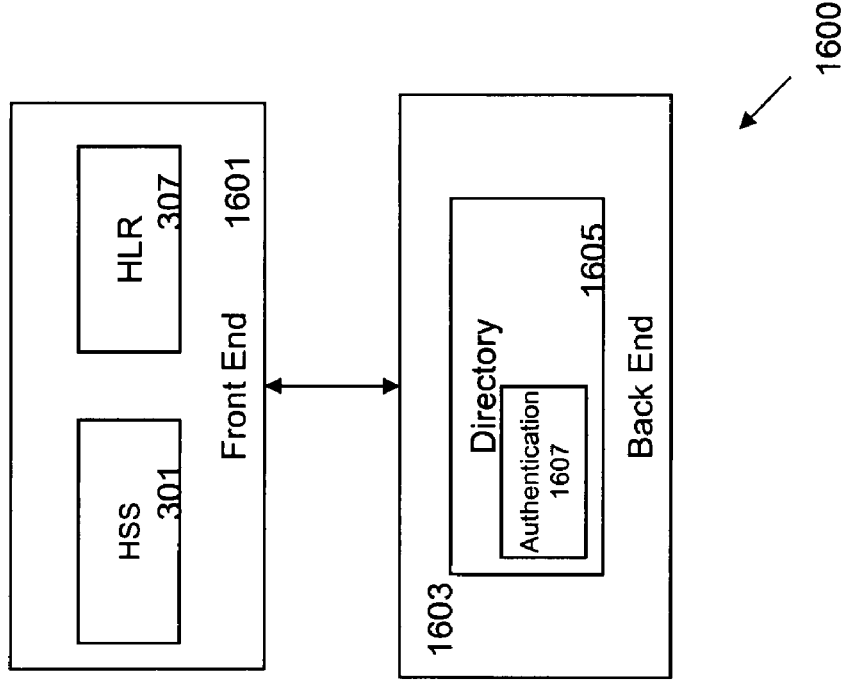

FIG. 16A and FIG. 16B are block diagrams respectively depicting a co-hosted system 1600 and a co-located system 1620 for the HSS 301 and the HLR 307, according to an embodiment of the invention. In both the co-hosted system 1600 and the co-located system 1620, the HLR 307 and HSS 301 share a Directory 1605 located on a backend server 1603. The Directory 1605 comprises a directory implemented in one or more DSAs, such as the DSA 702 shown in FIG. 7B, according to an embodiment of the invention.

Embodiments of the invention may provide a single logical HSS and HLR. The HSS 301 and the HLR 307 shown in FIG. 16A and FIG. 16B effectively provide a single logical HSS and HLR combination, as will be discussed. As CSPs combine new services and employ IP switching, the HLR 307 may become a focal point for further enhancements to their CSP's networks. Additionally, the HSS 301 may assist the CSP improve its relationship with its subscribers. Consequently, the single logical HSS and HLR here may improve upon conventional networks.

When the HSS 301 and the HLR 307 are installed on a single server computer, the installation is termed as "co-hosted HSS/HLR installation." As shown in FIG. 16A, the HSS 301 and the HLR 307 are both located on front-end server 1601. The HSS 301 and HLR 307 share a Directory 1605 installed in the back-end server 1603.

In an embodiment of the invention, the front-end server 1601 may have a distributed architecture, such that the HSS 301 and HLR 307 are deployed on multiple servers 1609, 1611 that together constitute a logical front-end server 1613. As shown in FIG. 16B, when HSS 301 and HLR 307 are installed on separate front-end servers 1609, 1611 but share a common Directory 1605 installed in the back-end server 1603, the installation is termed as "co-located HSS/HLR installation." Thus, the HSS 301 and HLR 307 share Directory 1605 installed in the back-end server 1603.

If HSS 301 does not share the Directory 1605 with the HLR 307, the installation is termed a "standalone HSS." In such installations, the HLR data typically resides on a remote HLR data repository. A standalone HSS is not illustrated herein, but such an architecture is known in the art.

A mobile domain subscriber that has the HLR data on either a co-hosted system 1600 or a co-located system 1620 is called a "homed subscriber." A mobile domain subscriber that has the HLR data on a remote HLR data repository is called an "un-homed subscriber."

UMS Mode

The HSS 301 interacts with the HLR 307 to provide various services for subscribers in the IMS Domain 214, the PS domain 212, and the CS domain 210, as previously discussed. This is termed as User Mobility Server (UMS) Mode of operation of the HSS 301.

The UMS Mode allows smooth HSS operations for both co-hosted systems 1600 and co-located systems 1620, as well as for a standalone HSS. UMS Mode also allows smooth operations if some subscribers on the co-hosted system 1600 or the co-located system 1620 happen to be un-homed for whatever reason. Whether a given subscriber is considered "homed" or not is determined by whether HLR data is available for that subscriber on the directory 1605 in the backend 1603, according to an embodiment of the invention. In other words, a typical process is to attempt a read of HLR data. If such the read completes, then the subscriber is "homed." Otherwise, the subscriber is un-homed.

In the UMS Mode, the HSS 301 operates in three scenarios. In Scenario I, the HSS 301 interacts with a remote HLR 307, which is a mode that is generally well accommodated by conventional approaches. In Scenario II, the HSS 301 interacts with data from the HLR 307 in the co-hosted system 1600. In Scenario III, the HSS 301 interacts with data from the HLR 307 in the co-located system 1620.

The Mobile Application Part (MAP) interface between the HLR 307 and HSS 301 enables the UMS Mode. The MAP interface facilitates retrieving data, such as authentication vectors, re-synchronizing authentication sequence numbers, and/or retrieving user state and location information in the CS domain 210 and the PS domain 212.

The MAP interface, which is known in the art, provides communications between an HSS and a remote HLR. Thus, the remote HLR is contacted by the HSS, when required, using the MAP interface 1609. For example, in such configurations, the HSS performs a MAP Send Authentication Info (SAI) operation on the remote HLR in order to retrieve authentication vectors and re-synchronizing sequence numbers. In such configurations, the HSS performs a MAP Any Time Interrogation (ATI) operation on the remote HLR in order to retrieve CS domain/PS domain user state and location information.

MAP messages from the HSS are conventionally routed to the remote HLR using the subscriber's IMSI or MSISDN. For the PrivateID of an un-homed subscriber, and the corresponding IMSI is stored in the HSS data. This IMSI is used to contact the remote HLR on receipt of a Cx-MAR message. For the Public ID of a homed or un-homed subscriber, the corresponding MSISDN is stored in the HSS data. This MSISDN is used to contact the remote HLR on receipt of a Sh-UDR. According to an embodiment of the invention, a mapping may be made between the PrivateID of the subscriber and the IMSI. Thus, the mapping effectively allows the IMSI to perform operations on the HLR 301 and the HSS 307.

However, the subscribers are effectively homed in both the co-hosted system 1600 and the co-located system 1620. Thus, SAI and ATI are not required for the co-hosted system 1600 and the co-located system 1620, and there is no necessity for duplicating the data used by the HSS 301 and the HLR 307. For both the co-hosted system 1600 and the co-located system 1620, authentication data 1607 is stored in the Directory 1605 in a manner that it can be used by both the HSS 301 and the HLR 307. Consequently, the authentication data 1607 does not need to be duplicated to serve each of these applications. In other words, the SAI and ATI processes do not need to be performed in a system configured as shown in FIG. 16A and FIG. 16B. Accordingly, overall performance of the telecommunication network can be provided by simply turning off the UMS Mode. Thus, the authentication data 1607 may be shared between the HSS 301 and the HLR 307, according to an embodiment of the invention.

In an embodiment of the invention, a network management system, such as the Network Management System 412, can set the UMS Mode on the HSS 301 to operate in an ON mode or an OFF mode for a given combination of HSS and HLR. The UMS Mode can be switched ON or OFF, such as by setting a "self data only" flag to TRUE (i.e., "there is no HLR") or FALSE (i.e., "there is an HLR"). If the UMS Mode is OFF, then SAI and ATI, for example would not be used by the HSS 301 to contact the HLR 307. When set to OFF, the authentication state may be accessible to both the HSS 301 and the HLR 307 by simply accessing the Directory 1605.

Figure 16C:
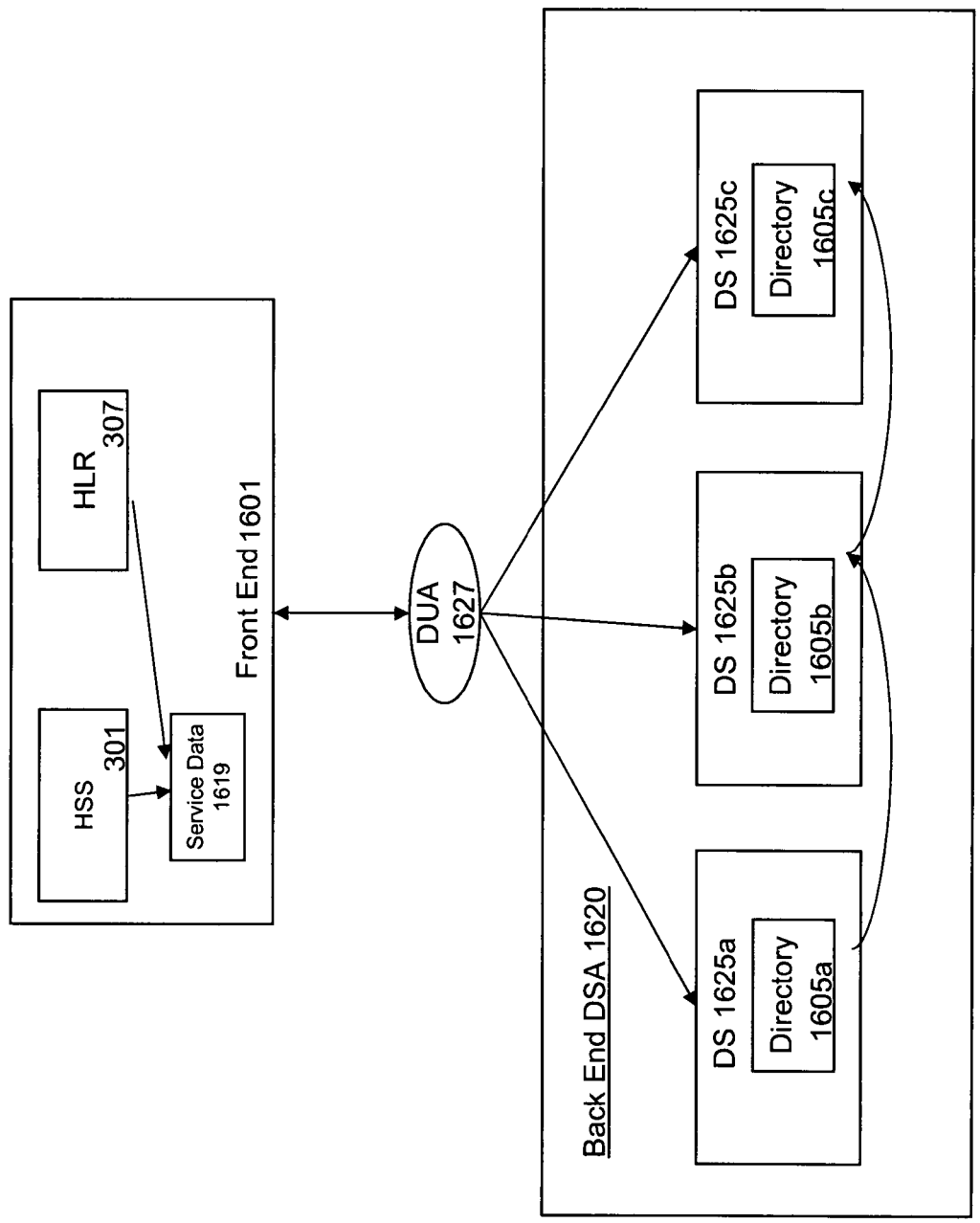
FIG. 16C illustrates a front end 1601 that has been configured to hold service data 1619 for applications such as the HSS 301 and the HLR 307, according to an embodiment of the invention.

FIG. 16C illustrates a front end 1601 that has been configured to hold service data 1619 for applications such as the HSS 301 and the HLR 307, according to an embodiment of the invention.

The data held in a directory, such as the directory 1605, typically comprises a mix of subscriber data and the service data 1619. The service data 1619, such as the non-subscriber specific authentication data 1607 and the UMS Mode flag, may be separated from the subscriber data and placed close to the applications (e.g., the HSS 301 and the HLR 307) that make frequent use of such data, according to an embodiment of the invention. By moving the service data 1619 to the Front End 1601, then access of the non-subscriber specific authentication data 1607 and the UMS Mode flag by applications such as the HSS 301 and the HLR 307 is nearly instantaneous, according to an embodiment of the invention.

The service data 1619 typically includes items such as the UMS mode flag, and the authentication schemes. According to an embodiment of the invention, the authentication schemes may alias to other authentication schemes. Thus, this approach may use aliases handled from within the HSS 301, according to an embodiment of the invention. The mapping discussed above been the PrivateID and the IMSI can also be performed when the service data 1619 has been moved to the front end 1601, according to an embodiment of the invention.

The Back End DSA otherwise operates as the Back End 1603 shown in FIG. 16A and like the DSA 702 shown in FIG. 7A, according to an embodiment of the invention. Likewise, the DS 1625*a*-DS 1625*c* operate similarly to the DSs 706 shown in FIG. 7A. The DUA 1627 operates in a manner similar to the DUA 704 shown in FIG. 7A, according to an embodiment of the invention.

Static Entries for Indirect Methods

Figure 17:
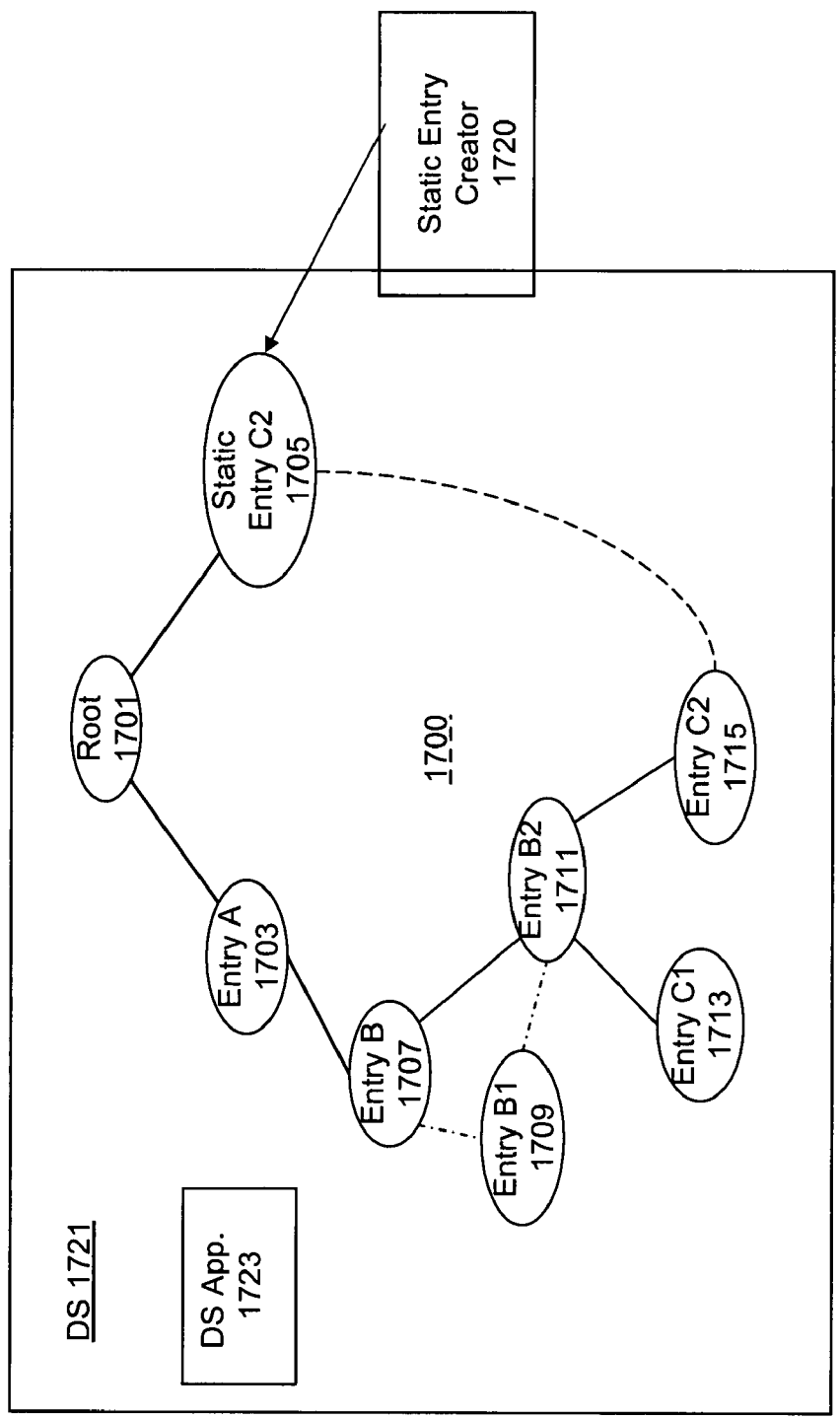
FIG. 17 is a block diagram depicting a hierarchy of data stored in a Directory 1700 facilitating static access to entries, according to an embodiment of the invention.

FIG. 17 is a block diagram depicting a hierarchy of data stored in a Directory 1700 facilitating static access to entries, according to an embodiment of the invention. The Directory 1700 may be stored in one or more directory servers 1721, configured such as the DS 706 shown in FIG. 7A. The DS 1721 may operate within a DSA, such as the DSA 702 shown in FIG. 7A. Similarly, operations on the Directory 1700 may be received and processed by a directory server application 1723 that operates similar to the directory server application software 707 shown in FIG. 7A. The components operating on the Directory 1700 engage computerized components within the directory server to process actions, e.g., via a CPU.

A requesting entity (e.g., an application such as the HSS 301 or the HLR 307), invokes one or more methods on the entries 1703-1715 present in the Directory 1700 to perform various functions. The requesting entity could represent any entity capable of making a request to the directory 1700, such as a client application or an end user. The methods encapsulate application knowledge about data inter-relationships within the schema of the Directory 1700, and provide simple interfaces, such as provisioning systems. Representative methods could be methods for: adding a subscriber, adding a subscriber service, such as an HSS service for an existing subscriber, and/or modifying subscriber service settings, such as modifying call forwarding settings.

By invoking the indirect methods, such as the entries 1703-1715, an external application can operate on data in the Directory 1700 without having specific knowledge of the directory's structure. This can be particularly useful in directories whose schemas are subject to frequent change and/or for legacy programs that have been designed to work with a particular schema. While the examples provided here related to a telecommunications deployment, this approach would be applicable to many settings in which an application needs to perform tasks in a directory but does not, or cannot, know the actual structure of the directory, according to an embodiment of the invention.

The application, such as the HSS 301 or the HLR 307, invokes a method associated with an entry, such the entry 1703, using a distinguished name (DN) of the entry. The DN reflects the real or adapted tree of entries that forms the ancestors of the entry on which the method is invoked. For example, the DN of the entry 1707 is "Root.EntryA.EntryB" since Root 1701 and Entry 1703 are ancestors of the entry 1707 in the Directory 1700. Such a method is, hereinafter referred to as a "Real Method." The use of Real Methods in directory structures is known in the art.

Because the DN reflects the real or adapted tree entry names comprised of various ancestors, the DN can become problematic when the schema of the Directory 1700 changes for any reason. Such changes can affect the naming of entries and hence can alter the names of entries on which the provisioning methods need to run. This impacts the provisioning system, forcing software changes to cope with the schema naming changes. For example, assume the schema changes such that entry 1709 is added to the Directory 1700 between the entry 1707 and the entry 1711, and assume further that the connection between the entry 1707 and the entry 1711 is removed. Thus, the DN of the entry 1711 changes from "Root.EntryA.EntryB.EntryB.2" to "Root.EntryA.EntryB.EntryB1.EntryB2."

According to an embodiment of the invention, a Real Method may be associated with a "Indirect Method." The Indirect Method is a method that belongs to a system entry, such as the Root 1701. The system entry is common to all applications, and does not need to change when changes occur in the schema. Therefore, the system entry is "static," and the Indirect Method may be invoked using the static system entry. In an embodiment of the invention, the Indirect Method resides at the point where the application connects to the Directory 1700. For example, entry 1705 represents a "Static Entry C.2." Thus, an application may use an appropriate protocol (e.g., LDAP extended operations) to invoke the entry 1705 (i.e., the method represented by the entry 1705) in order to invoke the method represented by the entry 1715, regardless of changes to the schema that might change the DN of the entry 1715. In other words, the application calls a method of the entry 1715. An application that needs to call a method of a static entry (e.g., the entry 1715) needs to know that entry's DN. Thus, the entry's name (e.g., its DN) should be a name that will not need to change.

The Indirect Method is supplied through an API interface with some RDN information, such as a subscriber identity, for example, and includes the remainder of the DN construction information in its internal implementation. This allows the Indirect Method to reconstruct the DN of the entry on which the Real Method is to be invoked. This functionality may be implemented in one of two ways:

The DN reconstruction may be "hard-coded," i.e., the form of the DN is embodied in software logic in the static entry, such as the Static Entry C2 1705, and/or The DN reconstruction may be "soft-coded," for example, using a template DN held as configurable service data, into which the specific RDN information supplied through the API is substituted by the static entry, such as the Static Entry C2 1705. This configurable service data would typically be held within the directory itself, similarly to the way that the directory schema is held.

Thus, the Indirect Method includes information to identify the DN of the entry on which the Real Method is to be invoked—but the Indirect Method hides from external applications from interface changes caused to the schema of the Directory 1700.

When the directory schema is changed in a manner that affects the location of entries where the Real Method is located, the Indirect Method needs to be updated to reflect this, according to an embodiment of the invention. If the Indirect Method is implemented in the soft-coded manner described above, then all that is needed is to configure a new template DN. It is in some circumstances highly desirable (e.g., for online migrations of data) for the Indirect Method to support both forms of DN, at least for the duration of the migration.

Because the Indirect Method resides at the point where applications connect to Directory Server (e.g., the Static Entry C2 705), no additional inter-DSA communication is needed for the access path between the application and the Indirect Method, according to an embodiment of the invention. While a single entry per application with multiple application-specific methods is often the most elegant approach, it is possible to use a static entry with multiple applications. This means that the connection point can be located precisely at the DSA, such as the DSA 702 shown in FIG. 7A, where external applications using the method connect. Accordingly, the performance overheads of the approach are thus minimal. External applications accessing Indirect Methods would need to connect to the root DSA.

The Indirect Methods present an interface to applications that includes sufficient information to allow the Indirect Method to derive the current name of the entry on which the real method needs to be run. Thus, the system overheads associated with schema restructuring are avoided through use of Indirect Methods.

The static entries that perform the indirect methods, such as the Static Entry C2 1705, can be constructed at almost any time in the Directory 1700 using a Static Entry Creator 1720, according to an embodiment of the invention. Of course, creation of these entries and methods is a task typically performed during system install/software upgrade. This task typically involves installing an extended schema that defines the new or changed application object classes and method definitions, along with installation of the shared libraries that include the method code. Thus, this task is fundamentally a software installation activity, and would be performed using standard software installation techniques (e.g., using UNIX, package or rpm files, with associated or included shell scripts, configuration files, database load files, binaries, etc). The Static Entry Creator 1720 can build a static entry, link it into the Directory 17, and equip the static entry to reconstruct the DN of the entry on which the Real Method can be invoked, using either the hard-coded or soft-coded approaches described above. The Static Entry Creator 1720 can also include an operator interface that simplifies the task of creating static entries.

Timer Mechanism

An improved timer mechanism may be applied in a variety of situations, such as when the events relating to the creation, modification or deletion of timers may be received by different processing nodes and/or when the expiry of the timer is so important that it needs to be a highly available event (e.g., more available than is typically possible in an individual processing node).

Accordingly, an embodiment of the invention provides a high-performance replicated data store configured to hold timers, so that they can potentially be accessed in a variety of ways, such as by time or by Application ID. Of course, a given embodiment of the timer mechanism might allow timers to be accessed in just a single way, e.g., by expiration time. Accordingly, embodiments of the invention allow requesting entities (e.g., applications) on multiple nodes processing events which require creation, modification or deletion of timers to do so via a mechanism, such as an Application ID. Accordingly, the requesting entity could represent any entity, such as a client application or an end user, that needed a timer for a given event.

Using a replicated data store allows timers to persist even if individual processing nodes fail, according to an embodiment of the invention. Additionally, the timers can be accessed by time, according to an embodiment of the invention, such that expiry processing can be performed by any available processing node that can access the replicated data store.

A high performance database and real time replication mechanism merely provides a possible implementation framework for an embodiment of the invention, capable of handling large numbers of timer events per second. Thus, the timer mechanism may be applied to both sophisticated and simple implementations.

Figure 18A:
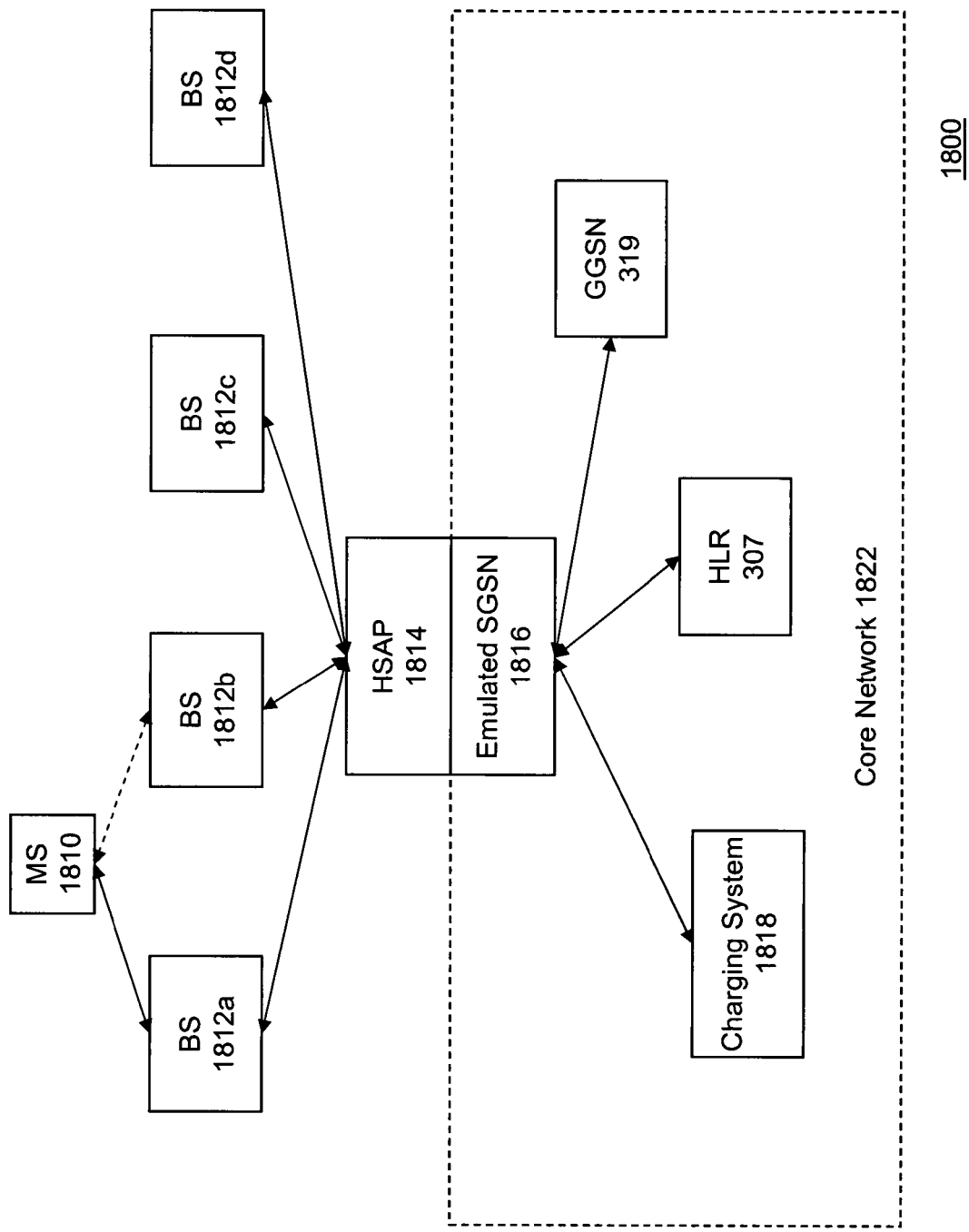
FIG. 18A illustrates a communications network 1800 using a high-speed access point (HSAP) that may possibly benefit from an improved timing mechanism, according to an embodiment of the invention.

FIG. 18A illustrates a communications network 1800 using a high-speed access point (HSAP) that may possibly benefit from an improved timing mechanism, according to an embodiment of the invention. The timer mechanism disclosed herein is applicable to a variety of environments, and the communications network 1800 described here provides just one such environment that could benefit from an improved timing mechanism.

In the network 1800, as a mobile subscriber 1810 travels, the responsibility for maintaining his call connection eventually passes from base station 1812*a* to base station 1812*b*. The base stations 1812*a*-1812*d* communicate various subscriber information and services via a high speed access point (HSAP) 1814. The network 1800 may be configured to support, for example, base stations 1812*a*-1812*d* from various manufacturers in a small office setting so as to provide a wireless LAN with a mobile roaming capability.

The HSAP 1814 may communicate with base stations 1812*a*-1812*d* using an AAA protocol, such as the Cx protocol, which is used in 3GPP-compliant IMS networks to communicate between an I-CSCF/S-CSCF and an HSS, such as the CSCF 321 and the HSS 301 shown in FIG. 3. These protocols are known in the art and defined by standards, such as RFC 3588, 3GPP TS 29.228 and 3GPP TS 29.229.

In the configuration shown in FIG. 18A, the HSAP 1814 effectively resides at the edge of a core network 1812 and includes Emulated SGSN 1816, an emulator for the SGSN 317 shown in FIG. 3. Thus, the HSAP 1814 and the Emulated SGSN 1816 can effectively make the entire network 1800 act and behave as a conventional telecommunications network. Thus, the network 1800 operates in a similar manner to the mobile communications network 204 shown in FIG. 2.

The HSAP 1814 can use the Emulated SGSN 1816 to communicate with the HLR 307 using a conventional MAP interface. The MAP interface provides an application layer for the various nodes in the Core Network 1822 to communicate with each other in order to provide services to mobile phone subscribers. The core network 1812 may include more than one HLR, and the Emulated SGSN may be configured to communicate with the HLRs in the core network 1812.

The HSAP 1814 using the Emulated SGSN 1816 may also include a Charging Data Function (CDF) that aggregates charging events reported by the base stations (BS 1812) into Charging Data Records (CDR), and forwards these towards a Charging System 1818, according to an embodiment of the invention. A CDR is a formatted collection of information about a chargeable event (e.g., time of call set-up, duration of the call, amount of data transferred, etc) for use in billing and accounting. If the CSP supplies subscribers with itemized bills, CDR are used to construct the line items in the subscriber's bill.

In this non-standard network configuration, it is possible that the HSAP 1814 might not provide the Charging System 1818 with important CDR-related events, such as an "end call event" and the "mid-call event." Both of these events, which are known in the art, are helpful in determining a given subscriber's charges, especially when the subscriber is charged based, in at least some part, on a call's duration.

Figure 18B:
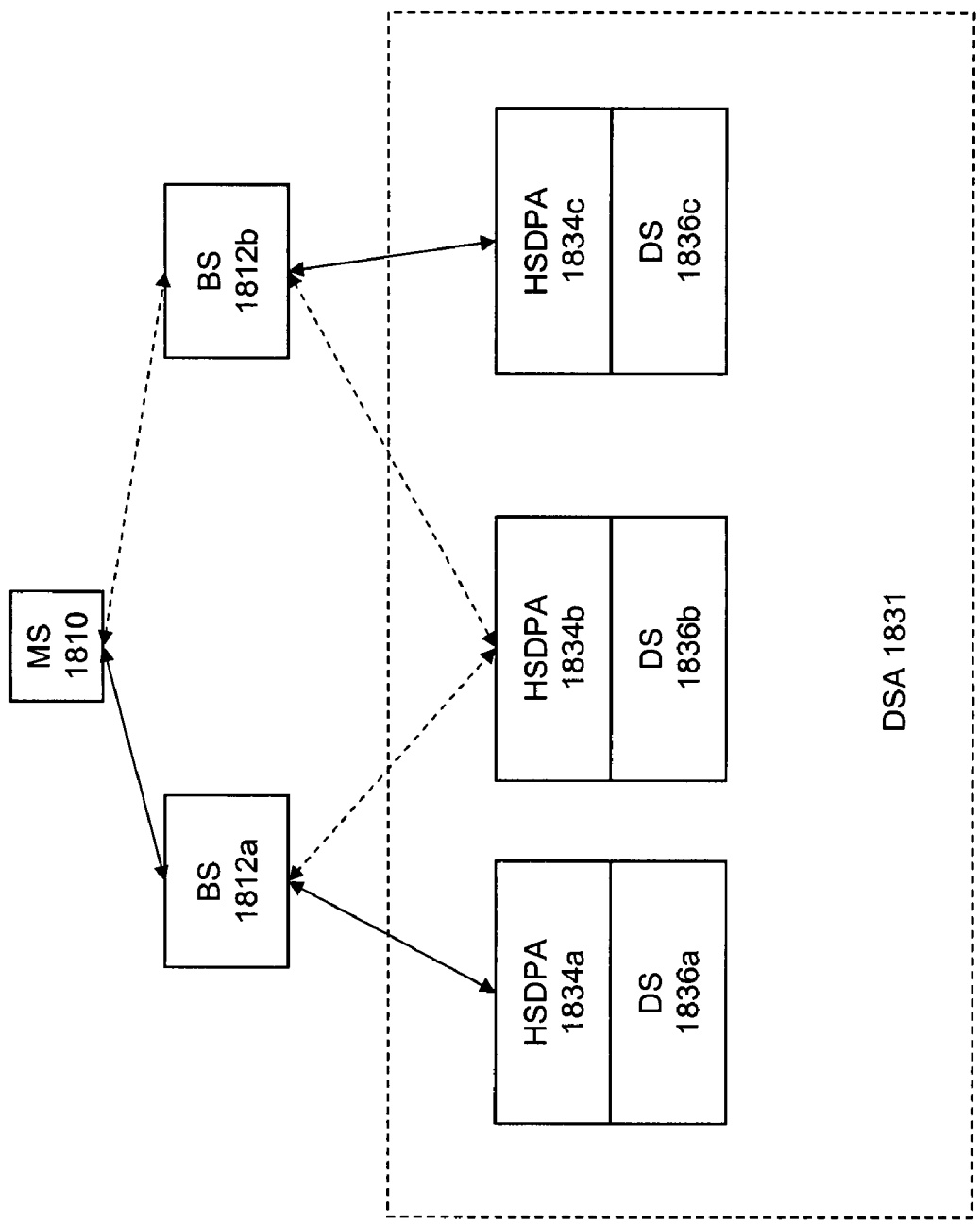
FIG. 18B provides a physical view of the communications network 1800 shown in FIG. 18A that may benefit from an improved timing mechanism, according to an embodiment of the invention.

FIG. 18B provides a physical view of the communications network 1800 shown in FIG. 18A that may benefit from an improved timing mechanism, according to an embodiment of the invention. As mentioned above, the network 1800 may be configured in a manner to support a wireless LAN that provides a mobile roaming capability. Assume that the network's base stations, such as BS 1812*a* and BS 1812*b*, have been configured to support communications via the High-Speed Downlink Packet Access (HSDPA) protocol. Sometimes known as High-Speed Downlink Protocol Access, HSDPA is a 3G mobile telephony protocol in the HSPA family and allows high data transfer speeds. HSDPA achieves an increase in the data transfer speeds by defining a new W-CDMA or TD-CDMA channel, a high-speed downlink shared channel (HS-DSCH), that is used for downlink communications to the mobile station. HSDPA is known in the art.

Assume that BS 1812*a*-1812*b* communicate with a DSA 1831. The DSA 1831 may be formed like the DSA 702 shown in FIG. 7A. The DSA 1831 may operate on the data associated with an HSDPA node 1834*a* in conjunction a DS node 1836*a*. The DS node 1836*a* may operate in a manner similar to the DS 706*a* shown in FIG. 7A Thus, the HSDPA node 1834*a* and the DS node 1836*a* together provide a physical layer for the tasks performed by the logical layer shown in FIG. 18A, according to an embodiment of the invention.

As shown, the DSA 1831 may also be formed from multiple HSDPA nodes 1834a-1834c, with each HSDPA node 1834a-1834c having an associated DS node 1836a-1836c. The DSA 1831 may comprise more or fewer HSDPA nodes and DS nodes than shown. Additionally, the HSDPA and DS nodes do not necessarily need to be paired with each other, although in many networks such pairings will be desirable.

The network may comprise more base stations than just BS 1812a-1812b. Each base station communicates with a primary HSDPA node and, as needed, a secondary HSDPA node. For example, as shown, the BS 1812a has the HSDPA 1834a as its primary HSDPA node and the HSDPA 1834b as its secondary HSDPA node, as shown by the solid and dashed lines. Similarly, the BS 1812b has the HSDPA 1834c as its primary HSDPA node and the HSDPA 1834b as its secondary HSDPA node, as shown by the solid and dashed lines.

In this network configuration, the base station, such as BS 1812a, should typically maintain continuously running Diameter communications in order for records, such as the CDRs, to be maintained properly. Not surprisingly, it can sometimes be difficult to keep a Diameter session running continuously. Consequently, problems arise with maintaining a consistent set of CDRs.

As the MS 1810 roams, the base stations 1812a, 1812b in the network might not all share the same HSDPA node. Thus, the network includes a handoff procedure between the base stations that allows calls to continue uninterrupted.

However, charging events associated with the call may be reported to different HDSPA nodes depending whether the MS 1810 is at base station 1812a or 1812b. A solution to this problem is to store charging events relating to a subscriber in a common subscriber database accessible by all the HSDPA nodes. This may either form part of DSA 1831 or be contained within one or more separate back end DSAs.

Unfortunately, even this solution has problems because the associated guard timer for a given call on a given DS might not receive the "end call event" for various reasons. A guard timer is a conventional timer used in telephony to make sure that charging events associated with a given call are not lost by the network. It is possible for certain key events, such as the end call event, to be lost with respect to a call, which might give the appearance that the call had never been placed or that the call was of a substantially shorter or longer duration than the call's actual length. For example, the "end call event" represents the end of a call (when one party disconnects), which may be important information in a CDR since many calls are charged by CSPs based on the length of the subscriber's call and/or the total time length represented by the subscriber's calls in a given time interval, such as month. Thus, there is a need to hand off timers along with other call information from HSDPA node to HSDPA node or to somehow make sure that this information is provided to the appropriate back end processing.

Consequently, an embodiment of the invention comprises a distributed timer mechanism that can be applied as a guard timer for a network such as the one described here. Embodiments of this timer do not necessarily require high accuracy, and in some embodiments, the guard timer may be configurable, such as from 10 seconds to 60 seconds.

FIG. 18C shows a Subscriber entry 1841 from a directory, such as a directory maintained by the DSA 1831, according to an embodiment of the invention. The Subscriber entry 1841 includes a Charging entry 1843. The Charging entry 1843 includes a Charging Event entry 1845 and a Guard Timer entry 1847.

So, for example, in an embodiment of the invention applied to a telecommunication network, the data maintained by the DSs 1836 in the DSA 1831 represents an HSDPA node for each timer tick of a pseudo guard timer. Similarly, the data represents each "mid-call event" for an HSDPA node for the subscriber and his associated "media session." The mid-call event typically represents a requirement of the charging standards, to ensure that regular entries are maintained in the CDR for calls in progress. The mid-call event does not necessarily reflect a change of state in the call, although it could. Mid-call events are typically generated quite frequently and may assist in determining an ending for a call if an end-call event is not recorded. Consequently, the mid-call event can assist the billing system in properly charge for long-running calls that span multiple charging periods. Calling events, such as mid-call events and end-call events, should be received regularly by the HSAP 1814 in accordance with established telecommunication standards, and the HSAP 1814 therefore should run a guard timer to ensure that they are indeed received promptly.

FIG. 18D shows a Timer 1850 having a Timer entry 1851 in a directory maintained by the DSA 1831, according to an embodiment of the invention. The Guard Timer entry 1847 shown in FIG. 18C provides a time that can be used to "move" a Subscriber CD Guard Timer entry 1848a-d associated with the Charging Data record 1843 through the pseudo timer "ticks" maintained by the Timer 1851. Thus, the Timer entry 1851 provides a dynamic timer tree, according to an embodiment of the invention.

The Timer entry 1851 maintains a set of timer "tick" entries 1855a-1855d. These tick entries represents different times within the Timer 1851. The call events may reside in the timer from a beginning time ("Now+XX") to an ending time ("Now"). Thus, Subscriber CD Guard Timer 1848d may first be associated with the guard timer's maximum time duration, represented here by a Now+XX entry 1855d. For example, the entry 1855d could represent 60 seconds from the Now time and would thus be named "Now+60".

Here, the guard timer represents the maximum duration for which an expected mid-call or end-call event can be delayed before remedial action is taken, for example the generation of an abnormal CDR record.

If the client application receives an appropriate response (e.g., a mid-call event), then the client application may delete the currently running timer and start another timer, if necessary. In other words, whenever a new mid-call event is received, the Subscriber CD Guard Timer 1848a-d should be deleted and replaced with a new timer at "Now+60". Whenever the end-call event is received the current Subscriber CD Guard Timer simply needs to be deleted.

Until a mid-call event or end-call is received, the given Subscriber CD Guard Timer 1848a-d then advances through the timer, eventually arriving at the Now entry 1855a, according to an embodiment of the invention. When the client application interrogates the Now entry 1855a, the client application may find any records, such as Subscriber CD Guard Timer 1848a, that have expired without having received a mid-call event or an end-call event. The client application can then perform the appropriate remedial action in accordance with charging standards.

In order to allow all these actions to be performed successfully, in an embodiment of the invention, the following entry naming principles should be adopted:

Timer 1851: named according to the DSA in which it and the subscriber 1841 reside.

Subscriber CD Guard Timer 1848a-d: named according to the subscriber identity and the Charging Data 1843 record ID Guard Timer 1847: named according to the Timer 1851 and the Now+XX record 1855a-d at which the Subscriber CD Guard Timer 1848a-d is currently located.

In the embodiment of the invention shown in FIG. 18D, the timer 1851 has been set with a granularity of 10 seconds, which is why the tick entry names advance in increments of 10, such as the Now+10 tick entry 1855b. However, the granularity of the tick entries could be set at another time level, such as 1 second or 20 seconds, depending on the timing requirements. The cutoff for the timer 1851 (e.g., the length of time represented by the timer) could be just about any length, with less accurate results (e.g., longer times) equating to lower terms of service for the CSP, e.g., a timer with a granularity of 10 seconds and a duration of 2 minutes is less accurate than a timer with a granularity of 1 second and a duration of 30 seconds. The timer entry 1851 could be configured for greater or lesser granularity by having more or fewer entries for different times, according to an embodiment of the invention.

Thus, an application, such as the primary the HSDPA node 1834a, should periodically search its "now" timer slot, which should contain only records for Guard Timers that should pop. Alternatively, a timer mechanism could be constructed to notify an application of calls in the "now" timer slot. Any events located at the "now" slot 1855a represent timers that have expired, and thus need to be processed appropriately (e.g., by adding an abnormal mid-call event to the CDR) then deleted. In other words, the application, such the application for the HSDPA node 1834a is looking to pick up guard lost charging events.

Processing events, such as mid-call or end-call events, typically requires the deletion and possible re-insertion of the timing records. If the naming principles set out above are followed, the application does not need to scan through all the timers that are still running, but may instead search for them by name as the mid- and end-call events come in. The remaining operations, such as determining whether the call is still connected, may be handled by the simple mechanisms of deleting and possibly re-inserting timer records and/or providing an end call event for a call to the charging system 1818.

The timer 1851 can process a stream of events related to a particular subscriber, group of subscribers, or a particular set of subscriber servers. If for any reason, the regular flow of events is interrupted, then the timer 1851 can assist in identifying that the interruption has occurred and assist in beginning any special processing that needs to occur, according to an embodiment of the invention.

Figure 18E:
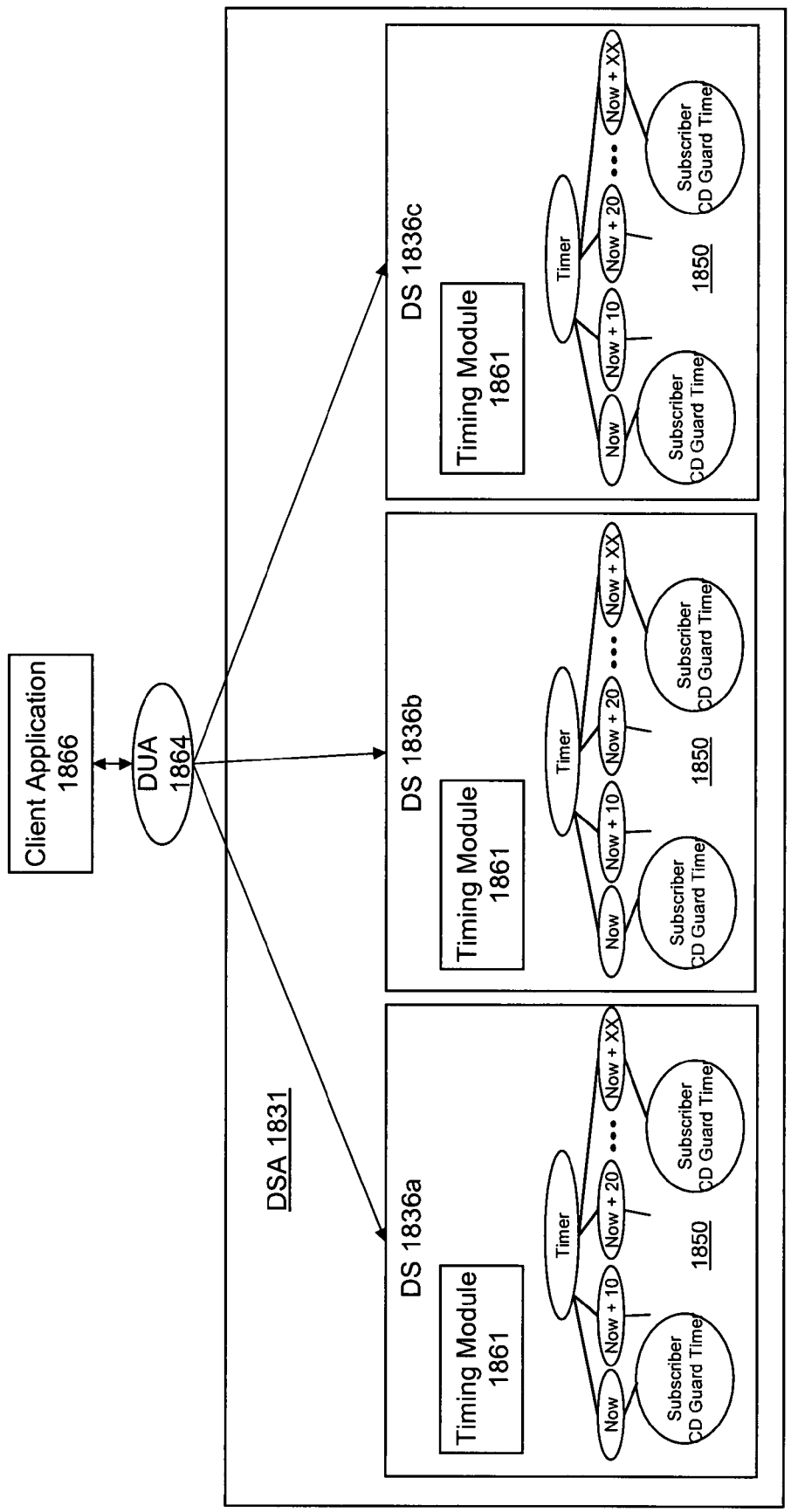
FIG. 18E illustrates a distributed timing mechanism implemented on the DSA 1831 shown in FIG. 18B, according to an embodiment of the invention.

FIG. 18E illustrates a distributed timing mechanism implemented on the DSA 1831 shown in FIG. 18B, according to an embodiment of the invention. As previously discussed, this distributed timing mechanism could be employed for timing any event and is not necessarily limited to timing events related to telecommunications systems.

The DSA 1831 resembles the DSA 702 shown in FIG. 7A. Similarly, the DS 1836 resembles the DS 706, and the DUA 1864 operates similar to the DUA 704 shown in FIG. 7A. The client application 1866 could be any client application, or other requesting entity, but in the timing mechanism described herein for mobile telecommunications would most likely be the entity responsible for maintaining timing events, such as the application associated with the HSAP 1814, according to an embodiment of the invention.

Each DS 1836 maintains a copy of the Timer 1850 shown in FIG. 18D. Consequently, any of the DSes can process incoming events. Typically, any of the DSes 1836 can process incoming read/search events, with a single primary DS (e.g., the DS 1836a) being responsible for additions/deletions to the Timer 1850. The primary DS 1836 may also be responsible for contacting the client application 1866, (e.g., when an entry reaches the "Now" position without a new event having been processed), according to an embodiment of the invention. Thus, the timing module 1861 may be configured to communicate timing events and related information to other timing modules 1861 on other DSs. For example, just one timing module 1861 needs to communicate timing results to the requesting entity (e.g., client application), although all of the timing stores may be accessible to the requesting entity, according to an embodiment of the invention. Thus, the distributed timing modules 1861 may be configured such that just one timing module notifies the requesting entity of the requested event if the specified event time occurs, according to an embodiment of the invention.

Each DS 1836 may include a timing module 1861 to assist with processing of the timer 1850, according to an embodiment of the invention. The timing module 1861 may assist, for example, in making sure that the timing records are kept up to date. The timing module 1861 may also assist in processing actual time outs in the Timer 1850 by examining expired time records and forwarding indications of an expired timer to the client application 1866 for appropriate guard time-out processing, according to an embodiment of the invention. The timing module 1861 may also delete expired time records from the timer 1850.

Of course, more than a single DSA 1831 may be employed in handling event streams related to timers. For some applications, one may wish to deploy each instance of an application to have its event streams handled by a local DSA, e.g., an instance of the HSAP 1814 located in Japan might want to have a local DSA handle its timers rather than have a remote DSA (e.g., one in the UK) handle those same timers, according to an embodiment of the invention. Additionally, one may also want to partition subscriber groups such that there is a DSA assigned to a particular group of subscribers. In such an embodiment, the primary DS 1836 effectively handles the timers for calls related to this group of subscribers.

Similar to the discussion herein related to DSAs, should any particular DS 1836 lose communication or otherwise become unreachable, the other DSes in the DSA can carry on the timing processing. Thus, the timing mechanism may be quite robust. Insertions and deletions to the Timer 1850 may be replicated automatically across multiple DSes 1836 using a two-phase commit mechanism, according to an embodiment of the invention.

Embodiments of the timer mechanism can be applied to many distributed applications where external events cannot be guaranteed to come to a single local node. Likewise, as discussed, the Timer entry 1851 can reside on multiple data stores, such that in the event of the failure of one particular data store, such as the directory stored on the DS 1836a, then accurate timing can still continue using the data store from another device, such as the directory stored on the DS 1836b.

In an embodiment of the invention, the components of the invention comprise software based upon a collection of distinct tasks written in the "C" computer language. The software could, however, be written in a plethora of other computing languages. The tasks within the software communicate with each other via a combination of queues and shared memory. For example, the directory server 706a communicates with the other directory servers 706b and 706c in the DSA 702, as well as other directory servers in remote DSAs, via a TCP/IP link, according to an embodiment of the invention. The components of the invention could also be based in hardware and/or combinations of hardware and software.

While specific embodiments of the invention have been illustrated and described, it will be clear that the invention is not limited to these embodiments only. Numerous modifications, changes, variations, substitutions and equivalents will be apparent to those skilled in the art without departing from the spirit and scope of the invention as described in the claims. In general, in the following claims, the terms used should not be construed to limit the invention to the specific embodiments disclosed in the specification, but should be construed to include all systems and methods that operate under the claims set forth hereinbelow. Thus, it is intended that the invention covers the modifications and variations of this invention provided they come within the scope of the appended claims and their equivalents.

I claim:

1. A system for improved communication of subscriber profile data in a communications network having a distributed subscriber profile data repository, comprising:
a plurality of event forwarders associated with a data repository containing subscriber profile data such that the data repository comprises a portion of the distributed subscriber profile data repository, wherein each event forwarder is configured to monitor access requests for subscriber profile data in its data repository, determine if an access request response time exceeds a performance threshold and send a subscriber profile data transfer indicator to a transfer manager for each access request that exceeds the performance threshold;
a transfer manager configured to receive from the plurality of event forwarders subscriber profile data transfer indicators and determine for each subscriber profile data transfer indicator if a set of subscriber profile data should be transferred from a first data repository associated with an event forwarder who transmitted the subscriber profile data transfer indicator to a second data repository associated with the access request; and
a transfer controller configured to control movement of the set of subscriber profile data from the first data repository to the second data repository which is geographically closer to the subscriber.

2. The system of claim 1 wherein the second data repository is hosted on a directory server, and wherein following the transfer of the set of subscriber profile data to the second data repository, the directory server receives and processes all local access requests to subscriber profile data contained in the transferred set of subscriber profile data.

3. The system of claim 1 wherein the transfer manager is further configured to deny the transfer of the set of subscriber profile data if the first data repository and the second data repository reside in geographically adjacent service areas.

4. The system of claim 1 wherein the transfer manager is further configured to deny the transfer of the set of subscriber profile data if communication latency is below a minimum target threshold.

5. The system of claim 1 wherein the transfer manager is further configured to prevent thrashing between the first data repository and the second data repository caused by frequent attempts to transfer the set of subscriber profile data between the first data repository and the second data repository and frequent attempts to transfer the set of subscriber profile data from the second data repository to the first data repository.

6. The system of claim 1 wherein the transfer manager determines if the set of subscriber profile data should be transferred from the first data repository to the second data repository by examining configuration data, wherein the configuration data comprises a list of data repositories that are allowed to participate in a subscriber profile data transfer.

7. The system of claim 6 wherein the configuration data further comprises restrictions on transfer of specific sets of subscriber profile data in the distributed data repository.

8. The system of claim 6 wherein the configuration data further comprises restrictions on at least one of a time of day pertaining to transfer of subscriber profile data, a maximum size of subscriber profile data eligible for transfer, and ranges of data values in subscriber profile data eligible for transfer.

9. The system of claim 6 wherein the configuration data further comprises restrictions related to required security for transfer of subscriber profile data.

10. The system of claim 1 wherein the event forwarder measures response times against configuration data.

11. The system of claim 10 wherein the configuration data includes a pre-configured quality of service profile.

12. The system of claim 10 wherein the event forwarder resides at a point of data repository access associated with a directory server that contains the first data repository.

13. The system of claim 12 wherein the event forwarder resides in a directory system agent that comprises the directory server and a plurality of other directory servers such that the directory server and the plurality of other directory servers each include a substantially similar data repository and have been configured for interoperability of the processing of data requests related to subscriber profile data contained in the substantially similar data repositories.

14. The system of claim 1 wherein the performance threshold resides in a configuration file and wherein the event forwarder is configured to find and examine the configuration file.

15. The system of claim 14 wherein the performance threshold comprises at least one of latency and unpredictability.

16. The system of claim 1 wherein the transfer manager is further configured to examine a configuration data file to determine if the set of subscriber profile data should be transferred to the second data repository.

17. The system of claim 16 wherein the configuration data includes at least one pre-configured quality of service information and performance profiles.

18. The system of claim 1 wherein the transfer manager resides on a different directory server than a directory server holding the data repository.

19. The system of claim 1 wherein the first data repository and the second data repository are configured as directories.

20. The system of claim 19 wherein the first data repository and the second data repository are configured as in-memory directories.

21. The system of claim 1 wherein the transfer controller is further configured to determine that the set of subscriber profile data has been moved from the first data repository to the second data repository without error.

22. The system of claim 1 wherein the transfer controller is further configured to use conventional protocols in performing the transfer.

23. The system of claim 1 wherein the transfer controller resides on a different directory server than a directory server holding the first data repository.

24. The system of claim 1 wherein the distributed data repository also comprises service data, and wherein a portion of the event forwarders have service data in their respective data repositories and are further configured to monitor access requests to service data in their respective repositories, determine if an access request response exceeds a performance threshold and send a service data transfer indicator to the transfer manager for each access request response that exceeds the performance threshold, wherein the transfer manager is further configured to receive from the portion of event forwarders service data transfer indicators and determine if a set of service data should be transferred from a third data repository associated with an event forwarder who transmitted the service data transfer indicator to a fourth data repository more closely associated with the access request that generated the service data transfer indicator and wherein the transfer controller is further configured to control movement of service data from the first data repository to the second data repository.

25. The system of claim 24 in which the service data pertains to one of a home subscriber server application or a home locator service application deployed in a telecommunications network.

26. The system of claim 1 wherein the set of subscriber profile data comprises one of a subscriber profile, a portion of a subscriber profile, a plurality of subscriber profiles, and portions of subscriber profiles from a plurality of subscriber profiles.

27. The system of claim 26 wherein a first portion of a subscriber profile resides in a second data repository following processing of a subscriber profile data transfer indicator and wherein a second portion of a subscriber profile resides in a third data repository following processing of another subscriber profile data transfer indicator.

28. A method for improved communication of subscriber profile data in a communications network having a distributed subscriber profile data repository, comprising:
monitoring access requests for subscriber profile data in a plurality of data repositories, wherein each data repository represents a portion of the subscriber profile data in the distributed data repository, and wherein each data repository is monitored by an event forwarder of a plurality of event forwarders;
determining if an access request response time for a set of subscriber profile data exceeds a performance threshold by an event forwarder associated with a first data repository of the plurality of data repositories, wherein the event forwarder sends a subscriber profile data transfer indicator to a transfer manager if the access request response time exceeds the performance threshold;
receiving by a transfer manager the subscriber profile data transfer indicator and determining if the set of subscriber profile data should be transferred from the first data repository to a second data repository of the plurality of data repositories, wherein the second data repository is associated with the access request; and
moving the set of subscriber profile data from the first data repository to the second data repository under the supervision of a transfer controller when the transfer manager determines that the first set of subscriber profile data should be transferred from the first data repository to the second data repository which is geographically closer to the subscriber.

29. The method of claim 28 wherein the second data repository is hosted on a directory server, the method further comprising:
receiving and processing all local access requests to subscriber profile data contained in the transferred set of subscriber profile data in the directory server following the transfer of the set of subscriber profile data to the second data repository.

30. The method of claim 28, further comprising:
denying the transfer of the set of subscriber profile data by the transfer manager if the first data repository and the second data repository reside in geographically adjacent service areas.

31. The method of claim 28, further comprising:
denying the transfer of the set of subscriber profile data by the transfer manager if communication latency is below a minimum target threshold.

32. The method of claim 28, further comprising:
preventing thrashing between the first data repository and the second data repository by the transfer manager wherein the trashing is caused by frequent attempts to transfer the set of subscriber profile data between the first data repository and the second data repository and frequent attempts to transfer the set of subscriber profile data from the second data repository to the first data repository.

33. The method of claim 28, further comprising:
determining by the transfer manager if the set of subscriber profile data should be transferred from the first data repository to the second data repository by examining configuration data, wherein the configuration data comprises a list of data repositories that are allowed to participate in a subscriber profile data transfer.

34. The method of claim 33 wherein the configuration data further comprises restrictions on transfer of specific sets of subscriber profile data in the distributed data repository.

35. The method of claim 33 wherein the configuration data further comprises restrictions on at least one of a time of day pertaining to transfer of subscriber profile data, a maximum size of subscriber profile data eligible for transfer, and ranges of data values in subscriber profile data eligible for transfer.

36. The method of claim 33 wherein the configuration data further comprises restrictions related to required security for transfer of subscriber profile data.

37. The method of claim 28, further comprising:
measuring response times against configuration data by the event forwarder.

38. The method of claim 37 wherein the configuration data includes a pre-configured quality of service profile.

39. The method of claim 37 wherein the event forwarder resides at a point of data repository access associated with a directory server that contains the first data repository.

40. The method of claim 39 wherein the event forwarder resides in a directory system agent that comprises the directory server and a plurality of other directory servers such that the directory server and the plurality of other directory servers each including a substantially similar data repository and have been configured for interoperability of the processing of data requests related to subscriber profile data contained in the substantially similar data repositories.

41. The method of claim 28, further comprising:
examining the performance threshold in a configuration file by the event forwarder.

42. The method of claim 41 wherein the performance threshold comprises at least one of latency and unpredictability.

43. The method of claim 28, further comprising:
determining by the transfer manager if the set of subscriber profile data should be transferred to the second data repository by examining a configuration data file.

44. The method of claim 43 wherein the configuration data includes at least one pre-configured quality of service information and performance profiles.

45. The method of claim 28 wherein the transfer manager resides on a different directory server than a directory server holding the data repository.

46. The method of claim 28 wherein the first data repository and the second data repository are configured as directories.

47. The method of claim 46 wherein the first data repository and the second data repository are configured as in-memory directories.

48. The method of claim 28, further comprising:
determining by the transfer controller that the set of subscriber profile data has been moved from the first data repository to the second data repository without error.

49. The method of claim 28 wherein the transfer controller is further configured to use conventional protocols in performing the transfer.

50. The method of claim 28 wherein the transfer controller resides on a different directory server than a directory server holding the first data repository.

51. The method of claim 28 wherein the distributed data repository also comprises service data, and wherein a portion of the event forwarders have service data in their respective data repositories, the method further comprising:
monitoring access requests to a set of service data in a third data repository by an event forwarder of the portion of event forwarders;
determining by the event forwarder of the portion of event forwarders if an access request response time for the set of service data exceeds a performance threshold and sending a service data transfer indicator to the transfer manager if the access request response time exceeds the performance threshold,
receiving by the transfer manager the service data transfer indicator and determining if the set of service data should be transferred from the third data repository to a fourth data repository associated with the access request that generated the service data transfer indicator; and
transferring under supervision of the transfer controller the set of service data to from the third data repository to the fourth data repository if the transfer manager determines that the set of service data should be transferred from the third data repository to the fourth data repository.

52. The method of claim 51 in which the service data pertains to one of a home subscriber server application or a home locator service application deployed in a telecommunications network.

53. The method of claim 28 wherein the set of subscriber profile data comprises one of a subscriber profile, a portion of a subscriber profile, a plurality of subscriber profiles, and portions of subscriber profiles from a plurality of subscriber profiles.

54. The system of claim 53 wherein a first portion of a subscriber profile resides in a second data repository following processing of a subscriber profile data transfer indicator and wherein a second portion of a subscriber profile resides in a third data repository following processing of another subscriber profile data transfer indicator.

* * * * *